US010669913B2

(12) United States Patent
Yamashita et al.

(10) Patent No.: US 10,669,913 B2
(45) Date of Patent: Jun. 2, 2020

(54) ENGINE APPARATUS

(71) Applicant: YANMAR CO., LTD., Osaka-shi, Osaka (JP)

(72) Inventors: Eiji Yamashita, Osaka (JP); Yosuke Seiyama, Osaka (JP)

(73) Assignee: YANMAR CO., LTD., Osaka (JP)

(*) Notice: Subject to any disclaimer, the term of this patent is extended or adjusted under 35 U.S.C. 154(b) by 190 days.

(21) Appl. No.: 15/488,664

(22) Filed: Apr. 17, 2017

(65) Prior Publication Data

US 2017/0218822 A1    Aug. 3, 2017

Related U.S. Application Data

(63) Continuation of application No. PCT/JP2015/077303, filed on Sep. 28, 2015.

(30) Foreign Application Priority Data

Oct. 15, 2014 (JP) ................. 2014-211146
Oct. 15, 2014 (JP) ................. 2014-211147
(Continued)

(51) Int. Cl.
*F01N 3/24* (2006.01)
*F01M 1/10* (2006.01)
(Continued)

(52) U.S. Cl.
CPC .............. *F01N 3/24* (2013.01); *B60K 13/04* (2013.01); *F01M 1/10* (2013.01); *F01M 9/10* (2013.01);
(Continued)

(58) Field of Classification Search
CPC ........ F01N 3/24; F01N 13/10; F01N 13/1805; F01N 3/021; F01N 2340/00; B60K 13/04
(Continued)

(56) References Cited

U.S. PATENT DOCUMENTS 2,311,303 A    2/1943    Collins
2011/0167807 A1*    7/2011    Mitsuda ............... F01N 3/0211
60/311
(Continued)

FOREIGN PATENT DOCUMENTS

EP    2351917 A1    8/2011
EP    3009334 A1    4/2016
(Continued)

OTHER PUBLICATIONS

European Search Report dated Nov. 10, 2017 issued in corresponding European Application No. 151175.8.
(Continued)

*Primary Examiner* — Lindsay M Low
*Assistant Examiner* — Omar Morales
(74) *Attorney, Agent, or Firm* — Norton Rose Fulbright US LLP

(57) ABSTRACT

An engine apparatus includes an engine, an exhaust gas purification device, an outlet side bracket, and an inlet side bracket. The exhaust gas purification device is mounted above a cylinder head to extend along an axis of an output shaft of the engine. The inlet side bracket is configured to couple an exhaust gas inlet side of the exhaust gas purification device to the cylinder head. The inlet side bracket includes a first bracket, a second bracket, and a third bracket. The first bracket is configured to be secured to a surface of the cylinder head intersecting the axis of the output shaft and includes a wide width. The second bracket includes a proximal end portion and a distal end portion. The third bracket is configured to be coupled to an end surface of the exhaust gas purification device and the distal end portion of the second bracket.

20 Claims, 33 Drawing Sheets

(30) Foreign Application Priority Data

Oct. 15, 2014 (JP) .................................. 2014-211148
Oct. 15, 2014 (JP) .................................. 2014-211149

(51) Int. Cl.
| | |
|---|---|
| *F01M 11/03* | (2006.01) |
| *F02B 77/00* | (2006.01) |
| *F01N 3/021* | (2006.01) |
| *F02M 35/16* | (2006.01) |
| *F02B 67/00* | (2006.01) |
| *F01M 9/10* | (2006.01) |
| *B60K 13/04* | (2006.01) |
| *F01N 13/18* | (2010.01) |
| *F02B 67/06* | (2006.01) |
| *F01N 13/10* | (2010.01) |
| *F01P 5/02* | (2006.01) |
| *F01P 5/10* | (2006.01) |
| *F02M 35/104* | (2006.01) |

(52) U.S. Cl.
CPC ............ *F01M 9/108* (2013.01); *F01M 11/03* (2013.01); *F01N 3/021* (2013.01); *F01N 13/10* (2013.01); *F01N 13/18* (2013.01); *F01N 13/1805* (2013.01); *F01P 5/02* (2013.01); *F01P 5/10* (2013.01); *F02B 67/00* (2013.01); *F02B 67/06* (2013.01); *F02B 77/00* (2013.01); *F02M 35/104* (2013.01); *F02M 35/16* (2013.01); *B60Y 2200/221* (2013.01); *F01N 2340/00* (2013.01); *F01N 2450/20* (2013.01); *F01N 2450/24* (2013.01); *F01N 2470/18* (2013.01); *F01N 2590/08* (2013.01); *Y02T 10/20* (2013.01)

(58) Field of Classification Search
USPC ...................................................... 123/41.44
See application file for complete search history.

(56) References Cited

U.S. PATENT DOCUMENTS

| | | |
|---|---|---|
| 2011/0167808 A1 | 7/2011 | Kosaka et al. |
| 2012/0124979 A1* | 5/2012 | Noma ................. B66F 9/07595 |
| | | 60/311 |
| 2013/0213726 A1 | 8/2013 | Okada |
| 2013/0277129 A1 | 10/2013 | Sakai et al. |
| 2013/0305688 A1 | 11/2013 | Kosaka et al. |
| 2014/0290220 A1 | 10/2014 | Ozaki et al. |
| 2014/0366516 A1* | 12/2014 | Mitsuda ................. F01N 13/08 |
| | | 60/320 |
| 2015/0053185 A1 | 2/2015 | Hibino et al. |
| 2015/0198086 A1 | 7/2015 | Fukuyoshi et al. |
| 2016/0096426 A1 | 4/2016 | Kurokawa |
| 2017/0009635 A1 | 1/2017 | Mitsuda |

FOREIGN PATENT DOCUMENTS

| | | |
|---|---|---|
| EP | 3121420 A1 | 1/2017 |
| JP | S60-145237 U | 9/1985 |
| JP | H06-073305 U | 10/1994 |
| JP | 2599573 U | 9/1999 |
| JP | 2002-242641 A | 8/2002 |
| JP | 2005-083231 A | 3/2005 |
| JP | 2008-031955 A | 2/2008 |
| JP | 2010-203393 A | 9/2010 |
| JP | 2010-216389 A | 9/2010 |
| JP | 2011-163339 A | 8/2011 |
| JP | 2012-97413 A | 5/2012 |
| JP | 2013-227730 A | 11/2013 |
| JP | 2014-025404 A | 2/2014 |
| JP | 2014-66215 A | 4/2014 |
| JP | 2014-145266 A | 8/2014 |
| WO | 2013/145514 A1 | 10/2013 |
| WO | 2014007373 A1 | 1/2014 |
| WO | 2014/155703 A1 | 10/2014 |
| WO | 2016/060026 A1 | 4/2016 |

OTHER PUBLICATIONS

Korean Office Action dated May 29, 2018 issued in corresponding Korean Application No. 10-2017-7010025.

* cited by examiner

ENGINE APPARATUS

CROSS-REFERENCE TO RELATED APPLICATIONS

The present application is a continuation application of International Application No. PCT/JP2015/077303, filed Sep. 28, 2015, which claims priority to Japanese Patent Application No. 2014-211146, filed Oct. 15, 2014, Japanese Patent Application No. 2014-211147, filed Oct. 15, 2014, Japanese Patent Application No. 2014-211148, filed Oct. 15, 2014 and Japanese Patent Application No. 2014-211149, filed Oct. 15, 2014. The contents of these applications are incorporated herein by reference in their entirety.

BACKGROUND OF THE INVENTION

The invention of the present application relates to an engine apparatus.

As higher-level emission regulations have been applied to diesel engines (hereinafter, simply referred to as engines), agricultural vehicles and construction and engineering machines that include an engine are required to include an exhaust gas purification device that removes air pollutants in exhaust gas. Diesel particulate filters (hereinafter, referred to as the DPF) that collect, for example, particulate matter in exhaust gas (for example, refer to Japanese Unexamined Patent Application Publication No. 2008-31955) are known exhaust gas purification devices.

SUMMARY OF THE INVENTION

Japanese Unexamined Patent Application Publication No. 2008-31955 discloses a configuration of a tractor. The tractor includes an engine on the front section of a traveling body. A DPF is located on either left or right side of an exhaust manifold above the engine. The DPF extends in the fore-and-aft direction of the engine. The DPF and the engine are covered with a hood. According to the tractor disclosed in Japanese Unexamined Patent Application Publication No. 2008-31955, the hood has a cross-section that is like an inverted U-shape. Thus, the left and right corners of the hood bulge outward. The DPF is located inside the left and right corners, that is, in the left and right inner corners of the hood. As described above, with the configuration disclosed in patent Japanese Unexamined Patent Application Publication No. 2008-31955, since the left and right corners of the hood bulge outward in view of a mounting space of the DPF, the forward view of an operator seated in an operator's seat of the traveling body, in particular, view ahead of the left and right corners of the hood is sacrificed.

If the DPF is mounted apart from the engine, the temperature of exhaust gas supplied from the engine to the DPF is decreased, and regeneration of a soot filter, or a like member, of the DPF is likely to be incomplete. Unfortunately, a special method is required to increase the temperature of the exhaust gas in the DPF to regenerate the soot filter, or the like member.

If the DPF is mounted close to the engine, decrease in the temperature of the exhaust gas supplied from the engine to the DPF is reduced, and the temperature of the exhaust gas in the DPF is easily maintained at a high temperature. Since the support structure of the DPF, however, is not easily simplified, the workability in mounting the DPF or shock proof cannot be improved. Increase in the size of the engine not only requires a design change in the work vehicle due to an insufficient engine mounting space in the work vehicle, but also causes inconvenience for the operator.

Accordingly, it is an object of the invention of the present application to provide an engine apparatus that has been improved taking into consideration the above-described current status.

According to one aspect of the invention of the present application, the engine apparatus includes an engine, an exhaust gas purification device, an outlet side bracket, and an inlet side bracket. The engine includes a cylinder head, an exhaust manifold, and an output shaft. The cylinder head includes a first side. The exhaust manifold is on the first side of the cylinder head. The output shaft includes an axis. The exhaust gas purification device includes an exhaust gas inlet side and an exhaust gas outlet side. The exhaust gas purification device is mounted above the cylinder head to extend along the axis of the output shaft of the engine. The exhaust gas purification device is configured to purify exhaust gas from the exhaust manifold. The outlet side bracket is configured to couple the exhaust gas outlet side of the exhaust gas purification device to the cylinder head. The inlet side bracket is configured to couple the exhaust gas inlet side of the exhaust gas purification device to the cylinder head. The inlet side bracket includes a first bracket, a second bracket, and a third bracket. The first bracket is configured to be secured to a surface of the cylinder head intersecting the axis of the output shaft and includes a wide width. The second bracket includes a proximal end portion and a distal end portion. The proximal end portion is configured to be coupled to an upper end of the first bracket. The distal end portion is bent sideways with respect to the proximal end portion. The third bracket is configured to be coupled to an end surface of the exhaust gas purification device and the distal end portion of the second bracket.

The engine apparatus includes an engine, an exhaust gas purification device, an outlet side bracket, and an inlet side bracket. The engine includes a cylinder head, an exhaust manifold, and an output shaft. The cylinder head includes a first side. The exhaust manifold is on the first side of the cylinder head. The output shaft includes an axis. The exhaust gas purification device includes an exhaust gas inlet side and an exhaust gas outlet side. The exhaust gas purification device is mounted above the cylinder head to extend along the axis of the output shaft of the engine. The exhaust gas purification device is configured to purify exhaust gas from the exhaust manifold. The outlet side bracket is configured to couple the exhaust gas outlet side of the exhaust gas purification device to the cylinder head. The inlet side bracket is configured to couple the exhaust gas inlet side of the exhaust gas purification device to the cylinder head. The inlet side bracket includes a first bracket, a second bracket, and a third bracket. The first bracket is configured to be secured to a surface of the cylinder head intersecting the axis of the output shaft and includes a wide width. The second bracket includes a proximal end portion and a distal end portion. The proximal end portion is configured to be coupled to an upper end of the first bracket. The distal end portion is bent sideways with respect to the proximal end portion. The third bracket is configured to be coupled to an end surface of the exhaust gas purification device and the distal end portion of the second bracket. Thus, the exhaust gas purification device is easily prevented from vibrating in a direction intersecting the axis of the output shaft of the engine. The exhaust gas purification device that is coupled by the inlet side bracket and the outlet side bracket is easily supported while preventing vibration. The support rigidity of the exhaust gas purification device is further improved.

In the present invention, the outlet side bracket of the engine apparatus may include a fourth bracket and a fifth bracket. The fourth bracket may include a proximal end portion and a distal end portion. The proximal end portion may be configured to be coupled to an upper surface of an intake manifold on a second side of the cylinder head. The distal end portion may be bent above the cylinder head. The fifth bracket may include a proximal end portion and a distal end portion. The proximal end portion may be configured to be coupled to the first side of the cylinder head. The distal end portion may be bent and configured to be coupled to the distal end portion of the fourth bracket. The outlet side bracket may be configured to be coupled to a coupling flange of the exhaust gas purification device. Since the exhaust gas purification device is configured to be supported by the outlet side bracket, which is coupled to both sides of the cylinder head, the support rigidity of the exhaust gas purification device is further improved. The outlet side bracket is configured to extend over the cylinder head. Thus, when the exhaust gas purification device is mounted or removed, the outlet side bracket receives the exhaust gas outlet side of the exhaust gas purification device. This improves workability in assembly and disassembly.

In the present invention, the above-described engine apparatus may further include an exhaust connecting pipe. The exhaust connecting pipe may include a hollow portion and an exhaust gas outlet. The hollow portion may be configured to supply exhaust gas from the exhaust manifold to the exhaust gas purification device. The exhaust gas outlet may be at an upper section of the exhaust connecting pipe. The exhaust gas outlet may be configured to be coupled to an exhaust gas inlet of the exhaust gas purification device. The exhaust connecting pipe may be configured to be secured to the exhaust manifold so that the exhaust gas inlet side of the exhaust gas purification device is supported by the engine via the exhaust connecting pipe together with the inlet side bracket. Since the inlet side bracket and the exhaust connecting pipe are configured to support the exhaust gas inlet side of the exhaust gas purification device from both sides, the support rigidity of the exhaust gas purification device is further improved. This achieves a simple structure in which exhaust gas is introduced to the exhaust gas purification device while the temperature of the exhaust gas of the engine is maintained high.

In the present invention, the above-described engine apparatus may further include an intake manifold and an intake connecting pipe. The intake manifold and the exhaust manifold may be distributed on both sides of the cylinder head. The intake connecting pipe may include a hollow portion configured to supply fresh air to the intake manifold. The intake connecting pipe may be configured to tilt toward the cylinder head as the intake connecting pipe extends upward from the intake manifold. Since the intake connecting pipe, which extends upward, is configured to be tilted toward the cylinder head, the configuration above the engine is made compact. Thus, the engine apparatus is configured in conformance with the shape of the hood of the work vehicle that has a curved upper surface.

In the present invention, the above-described engine apparatus may include an exhaust gas purification device and an exhaust connecting pipe. The exhaust gas purification device may be located above the cylinder head to extend along the axis of the output shaft of the engine. The exhaust connecting pipe may include a hollow portion configured to supply exhaust gas from the exhaust manifold to the exhaust gas purification device. The exhaust connecting pipe may be configured to tilt toward the cylinder head as the exhaust connecting pipe extends upward. The exhaust connecting pipe may be configured to be coupled to an exhaust gas inlet of the exhaust gas purification device to support the exhaust gas purification device.

In the present invention, the exhaust gas inlet side and the exhaust gas outlet side of the exhaust gas purification device of the engine apparatus may be coupled to the cylinder head with an inlet side bracket and an outlet side bracket. The proximal end of the inlet side bracket may be coupled to a surface of the cylinder head intersecting the axis of the output shaft, and both ends of the outlet side bracket, which extends over the cylinder head, may be coupled to both sides of the cylinder head. An upward-facing mounting surface of the exhaust connecting pipe and a mounting surface of the inlet side bracket may form a V-shaped pressure-receiving surface.

In the present invention, the above-described engine apparatus may include a cylinder block, an oil pan, a support bracket, and an oil filter. The cylinder block may be configured to be mounted on and coupled to a traveling body and configured to be covered with a hood. The cylinder block may include a lower surface. The oil pan may be on the lower surface of the cylinder block and configured to store lubricant. The support bracket may include a first end surface, a second end surface, and a hollow portion for permitting lubricant to pass through the support bracket. The oil filter may be disposed on a side surface of the cylinder block via the support bracket. The oil filter may be configured to filter lubricant from the oil pan. The first end surface of the support bracket may be configured to be coupled to the cylinder block at a lower section of the support bracket, and the oil filter may be configured to be coupled to the second end surface of the support bracket at an upper section of the support bracket so that the oil filter is disposed above the traveling body. Thus, lubricant is supplied to the oil filter through the support bracket, and the oil filter is disposed without interfering with the traveling body. Since the oil filter is located at a position above the traveling body, when the hood is opened, the oil filter is easily replaced.

The support bracket may also include a coupling port coupled to an external pipe that circulates lubricant to an external device. The support bracket may be configured to divide lubricant from the external pipe lubricant from the oil filter in the support bracket. Since the support bracket functions as a dividing passage from the oil filter, a single component serves a plurality of functions, and the number of the components of the engine apparatus is reduced. The external device may be a forced induction device. The external pipe may be a circulation passage that circulates lubricant to be supplied to the forced induction device from the support bracket. When the forced induction device is provided to increase the engine output, lubricant is efficiently circulated to the forced induction device. The components including the forced induction device are compactly mounted in the apparatus.

In the present invention, the engine apparatus may include a cylinder block, a flywheel, and a flywheel housing. The cylinder block may include end surfaces. The end surfaces of the cylinder block may be secured to a traveling body of a traveling vehicle via a front engine mount. The flywheel may be disposed on one of the end surfaces of the cylinder block intersecting the axis of the engine output shaft. The flywheel housing may include a width and a height and may cover the flywheel. The flywheel housing may be configured such that the width is narrower than the height. The engine apparatus may be configured to be covered with a hood. Since the width of the flywheel housing is narrow, the engine apparatus is mounted on a traveling body that has a narrow width while preventing interference by the flywheel housing. This prevents the flywheel housing from colliding with the traveling body having a different vibration system and thus prevents failure or breakage of the engine apparatus.

The flywheel housing may also include an outline in which left and right parts of a circle are cut off and in which a seat projects from an upper section. The seat on the upper section may be configured to be coupled to the traveling body via a rear engine mount. This configuration not only allows the flywheel housing to be mountable on a traveling body having a narrow width, but also forms a seat that can be coupled to the traveling body. Thus, coupling the flywheel housing having a high rigidity to the traveling body reinforces for the rigidity achieved by the support structure of the engine apparatus.

The engine apparatus may further include a cylinder head, a cooling fan, an exhaust gas purification device, a coolant pump, and a thermostat cover. The cylinder head may be disposed above the cylinder block. The cooling fan may be disposed on an end surface of the cylinder head further from the flywheel. The exhaust gas purification device may be disposed above the cylinder head to extend along the axis of the output shaft of the engine. The coolant pump may be between the cooling fan and the cylinder head. The thermostat cover may be above the coolant pump. The thermostat cover may include a coolant inlet. The coolant inlet may face sideways of the cylinder head below the exhaust gas purification device. The cooling fan is located above the traveling body, and the cooling fan and the coolant pump are arranged to be coaxial. Thus, the engine components are compactly arranged, and the size of the engine apparatus is reduced. The engine apparatus is thus mountable on a traveling vehicle that has a limited engine compartment shape.

With the embodiment of the invention of the present application, the exhaust gas purification device is easily prevented from vibrating in a direction intersecting the axis of the output shaft of the engine. The exhaust gas purification device that is coupled by the inlet side bracket and the outlet side bracket is easily supported while preventing vibration. The support rigidity of the exhaust gas purification device is further improved.

With the embodiment of the invention of the present application, since the exhaust gas purification device is configured to be supported by the outlet side bracket, which is coupled to both sides of the cylinder head, the support rigidity of the exhaust gas purification device is further improved. The outlet side bracket is configured to extend over the cylinder head. Thus, when the exhaust gas purification device is mounted or removed, the outlet side bracket receives the exhaust gas outlet side of the exhaust gas purification device. This improves workability in assembly and disassembly.

With the embodiment of the invention of the present application, since the inlet side bracket and the exhaust connecting pipe are configured to support the exhaust gas inlet side of the exhaust gas purification device from both sides, the support rigidity of the exhaust gas purification device is further improved. This achieves a simple structure in which exhaust gas is introduced to the exhaust gas purification device while the temperature of the exhaust gas of the engine is maintained high.

With the embodiment of the invention of the present application, since the intake connecting pipe, which extends upward, is configured to be tilted toward the cylinder head, the configuration above the engine is made compact. Thus, the engine apparatus is configured in conformance with the shape of the hood of the work vehicle that has a curved upper surface.

With the embodiment of the invention of the present application, since the exhaust connecting pipe, which extends upward, is configured to be tilted toward the cylinder head, the configuration above the engine is made compact. Thus, the engine apparatus is configured in conformance with the shape of the hood of the work vehicle that has a curved upper surface. Since the exhaust gas purification device can be located above the cylinder head, the exhaust gas purification device is supported by, for example, the engine apparatus with a high rigidity.

With the embodiment of the invention of the present application, the outlet side bracket is configured to extend over the cylinder head. An upward-facing mounting surface of the exhaust connecting pipe and a mounting surface of the inlet side bracket form a V-shaped pressure-receiving surface. Thus, when the exhaust gas purification device is mounted or removed, the inlet side bracket and the outlet side bracket receive the exhaust gas outlet side of the exhaust gas purification device. This improves workability in assembly and disassembly.

With the embodiment of the invention of the present application, lubricant is supplied to the oil filter through the support bracket, and the oil filter is disposed without interfering with the traveling body. Since the oil filter is located at a position above the traveling body, when the hood is opened, the oil filter is easily replaced.

With the embodiment of the invention of the present application, the support bracket includes a coupling port coupled to an external pipe that circulates lubricant to an external device. The support bracket is configured to divide lubricant from the external pipe lubricant from the oil filter in the support bracket. Since the support bracket functions as a dividing passage from the oil filter, a single component serves a plurality of functions, and the number of the components of the engine apparatus is reduced.

With the embodiment of the invention of the present application, the external device is a forced induction device. The external pipe is a circulation passage that circulates lubricant to be supplied to the forced induction device from the support bracket. When the forced induction device is provided to increase the engine output, lubricant is efficiently circulated to the forced induction device. The components including the forced induction device are compactly mounted in the apparatus.

With the embodiment of the invention of the present application, since the width of the flywheel housing is narrow, the engine apparatus is mounted on a traveling body that has a narrow width while preventing interference by the flywheel housing. This prevents the flywheel housing from colliding with the traveling body having a different vibration system and thus prevents failure or breakage of the engine apparatus.

With the embodiment of the invention of the present application, lubricant is supplied to the oil filter through the support bracket, and the oil filter is disposed without interfering with the traveling body. Since the oil filter is located at a position above the traveling body, when the hood is opened, the oil filter is easily replaced.

With the embodiment of the invention of the present application, the configuration not only allows the flywheel housing to be mountable on a traveling body having a narrow width, but also includes a seat that can be coupled to the traveling body. Thus, coupling the flywheel housing having a high rigidity to the traveling body reinforces for the rigidity achieved by the support structure of the engine apparatus.

With the embodiment of the invention of the present application, the cooling fan is located above the traveling body, and the cooling fan and the coolant pump are arranged to be coaxial. Thus, the engine components are compactly arranged, and the size of the engine apparatus is reduced. The engine apparatus is thus mountable on a traveling vehicle that has a limited engine compartment shape.

DESCRIPTION OF THE EMBODIMENTS

Figure 1:
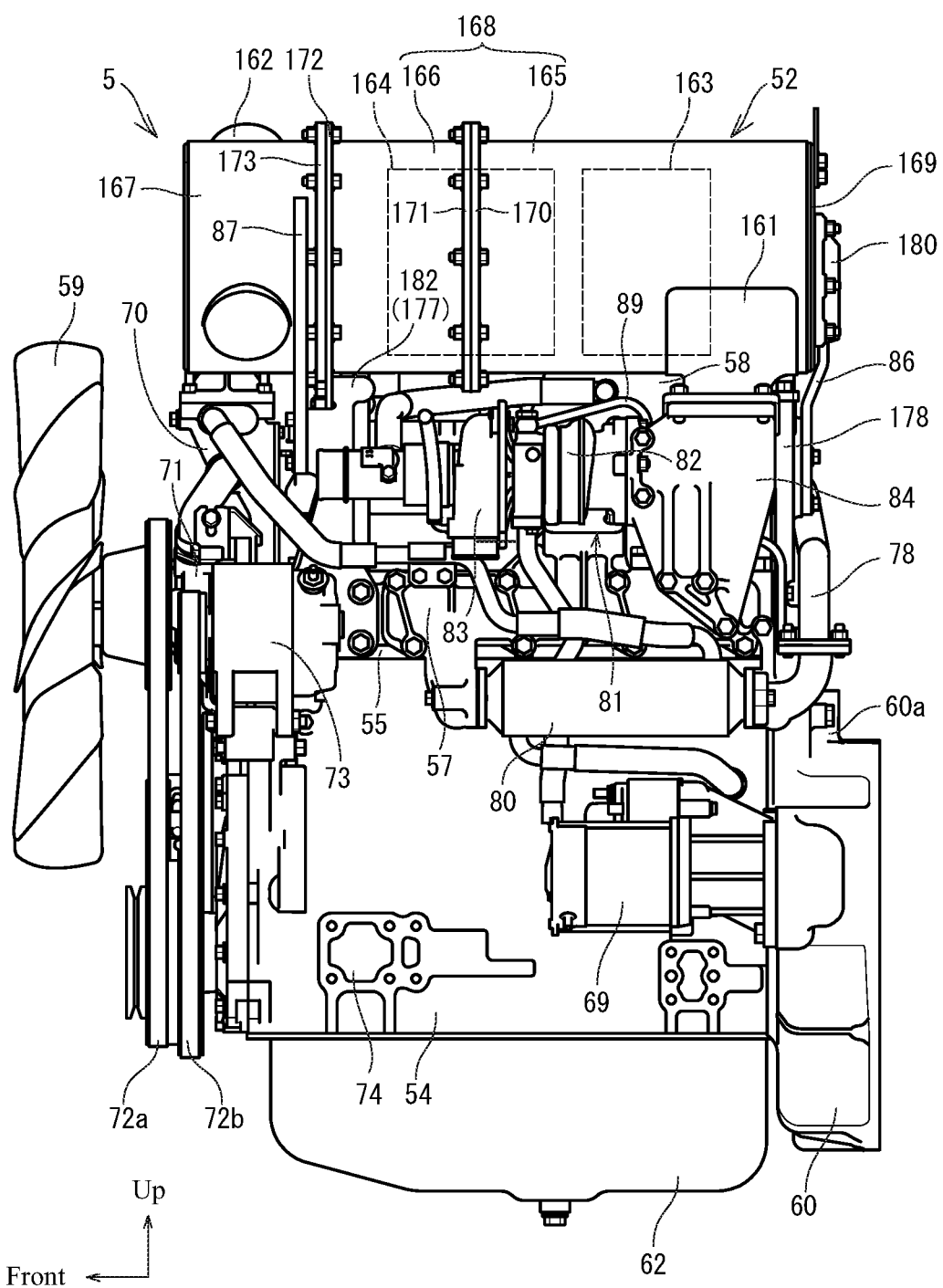
FIG. 1 is a left side view of a diesel engine according to the invention of the present application.
Figure 2:
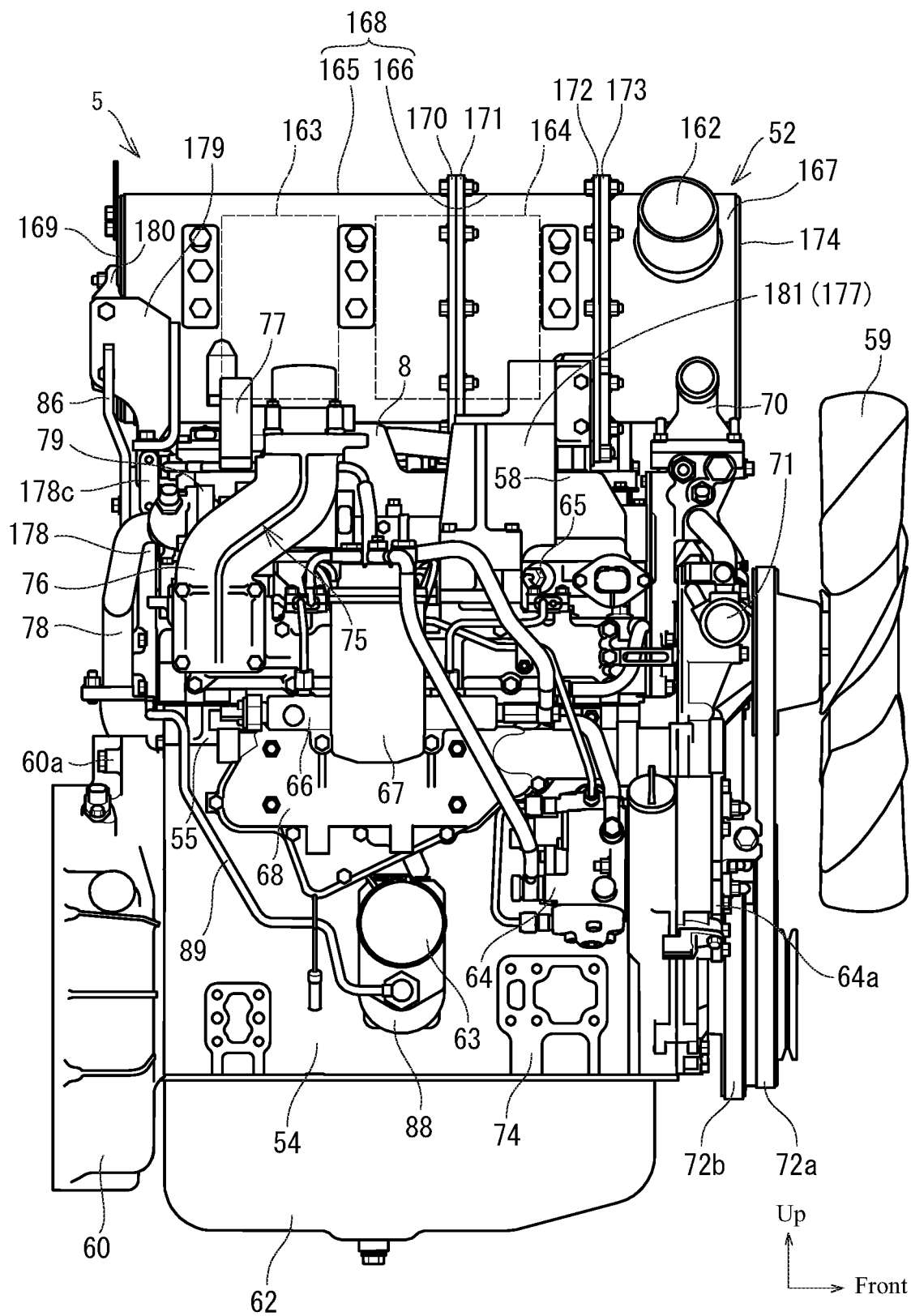
FIG. 2 is a right side view of the diesel engine.
Figure 3:
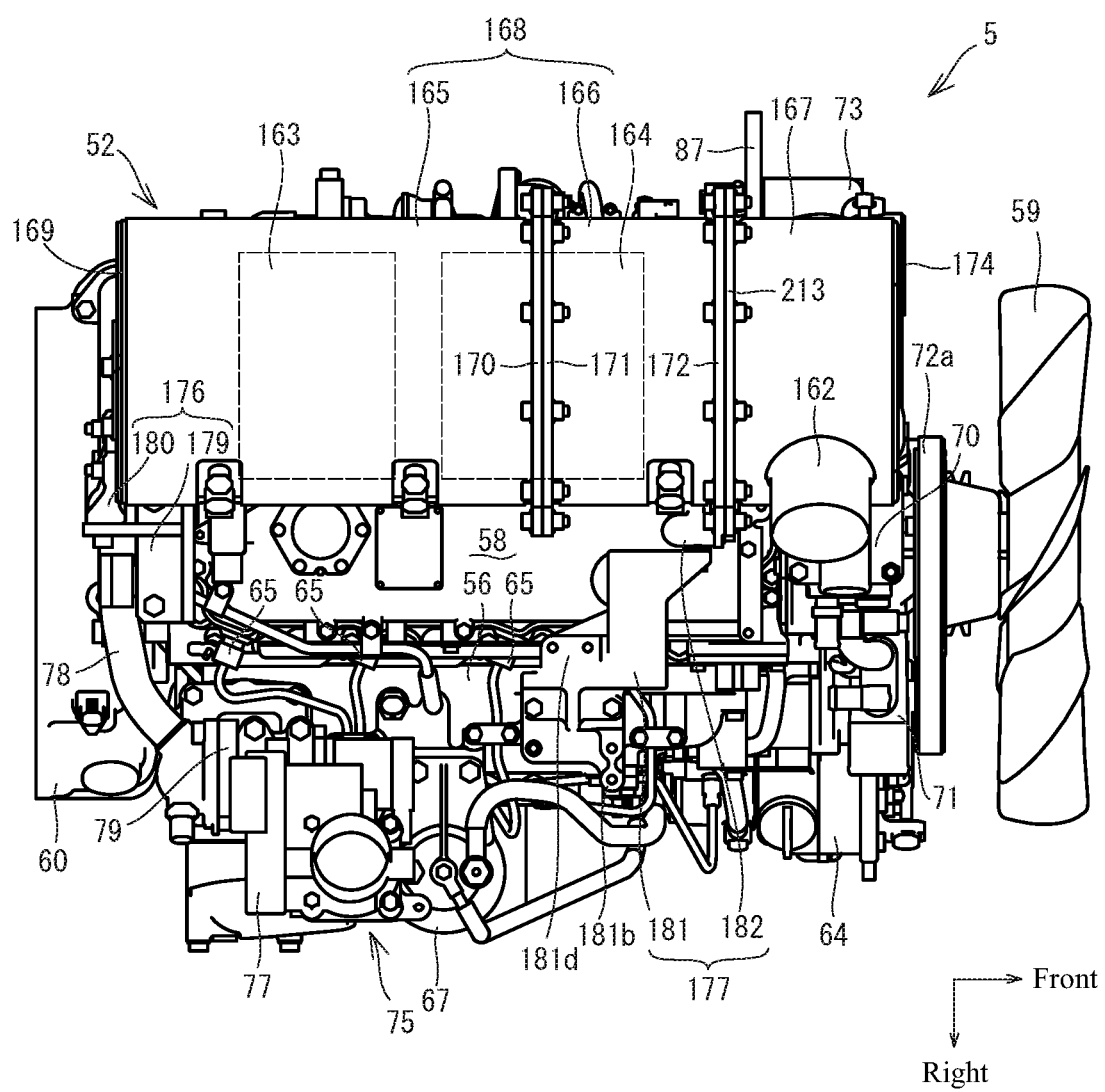
FIG. 3 is a plan view of the diesel engine.
Figure 4:
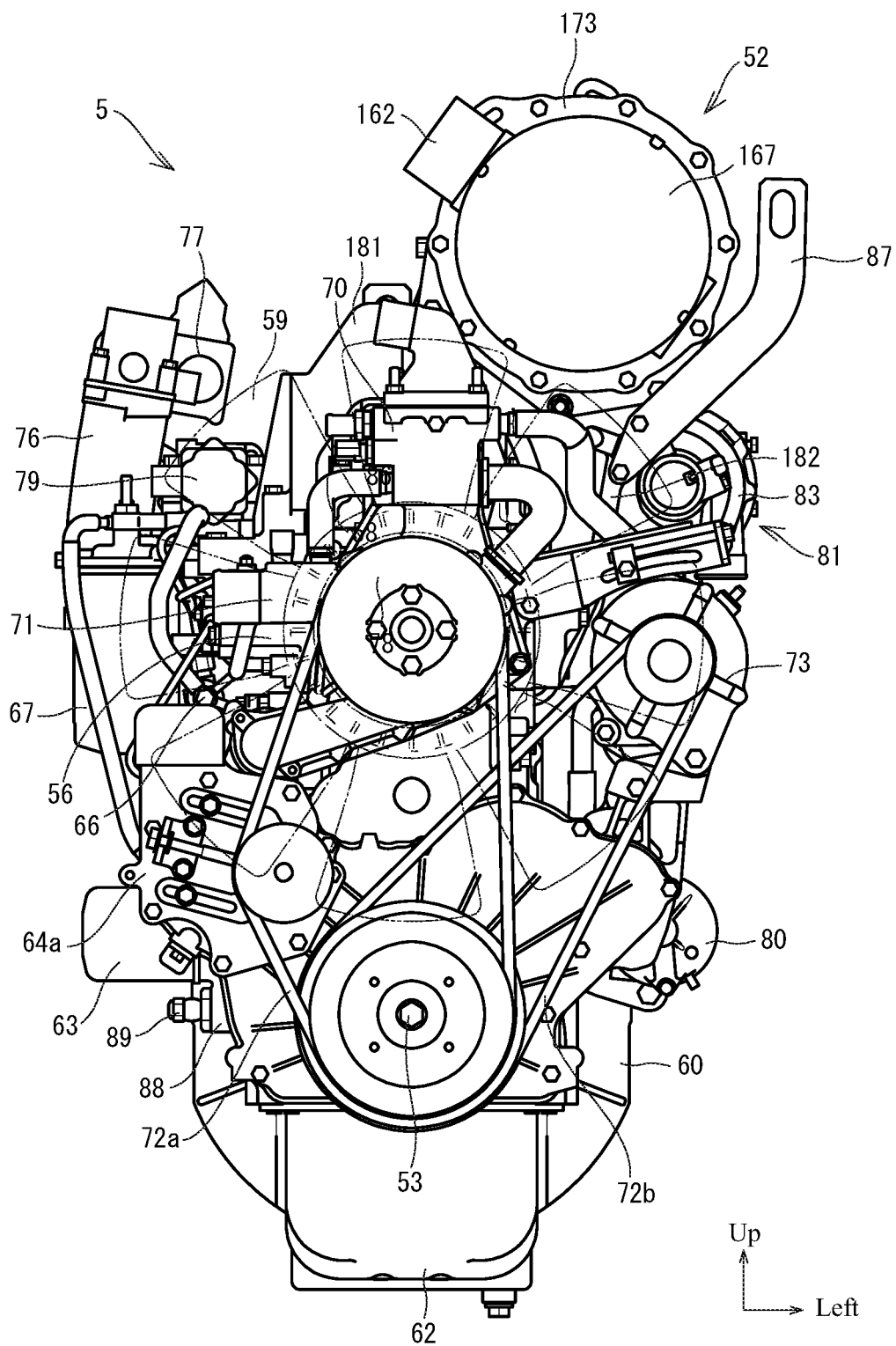
FIG. 4 is a front view of the diesel engine.
Figure 5:
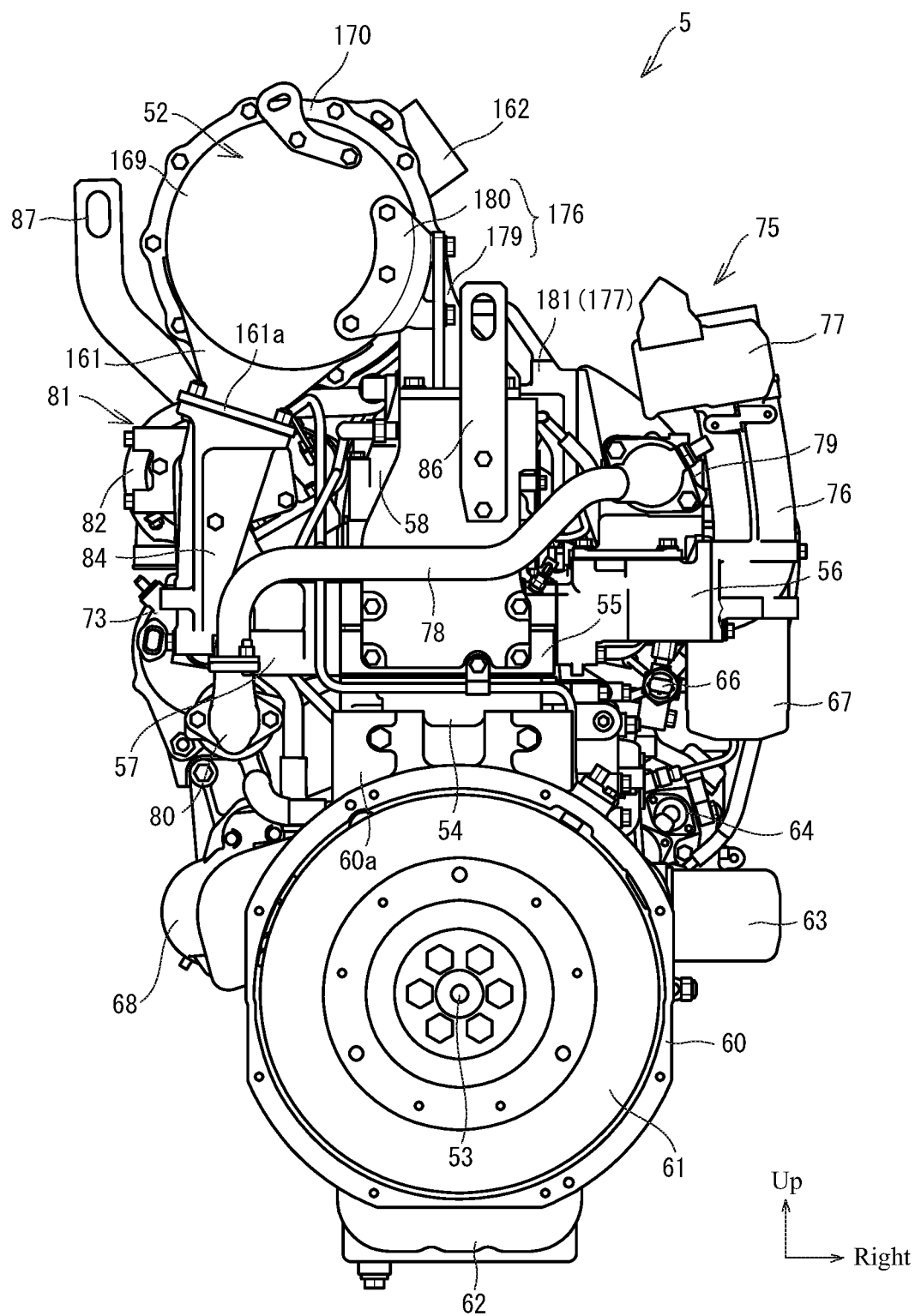
FIG. 5 is a rear view of the diesel engine.
Figure 6:
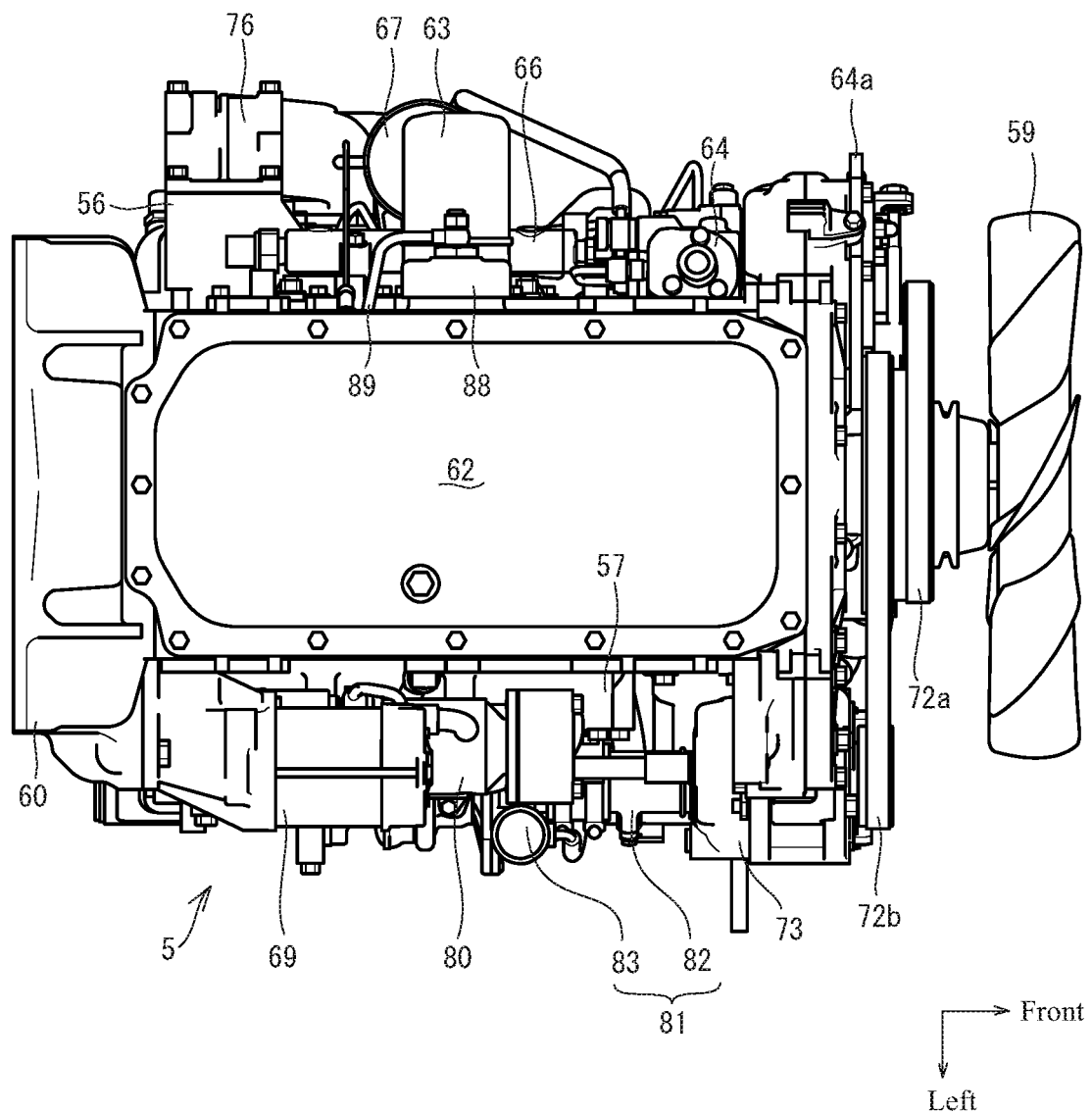
FIG. 6 is a bottom view of the diesel engine.
Figure 7:
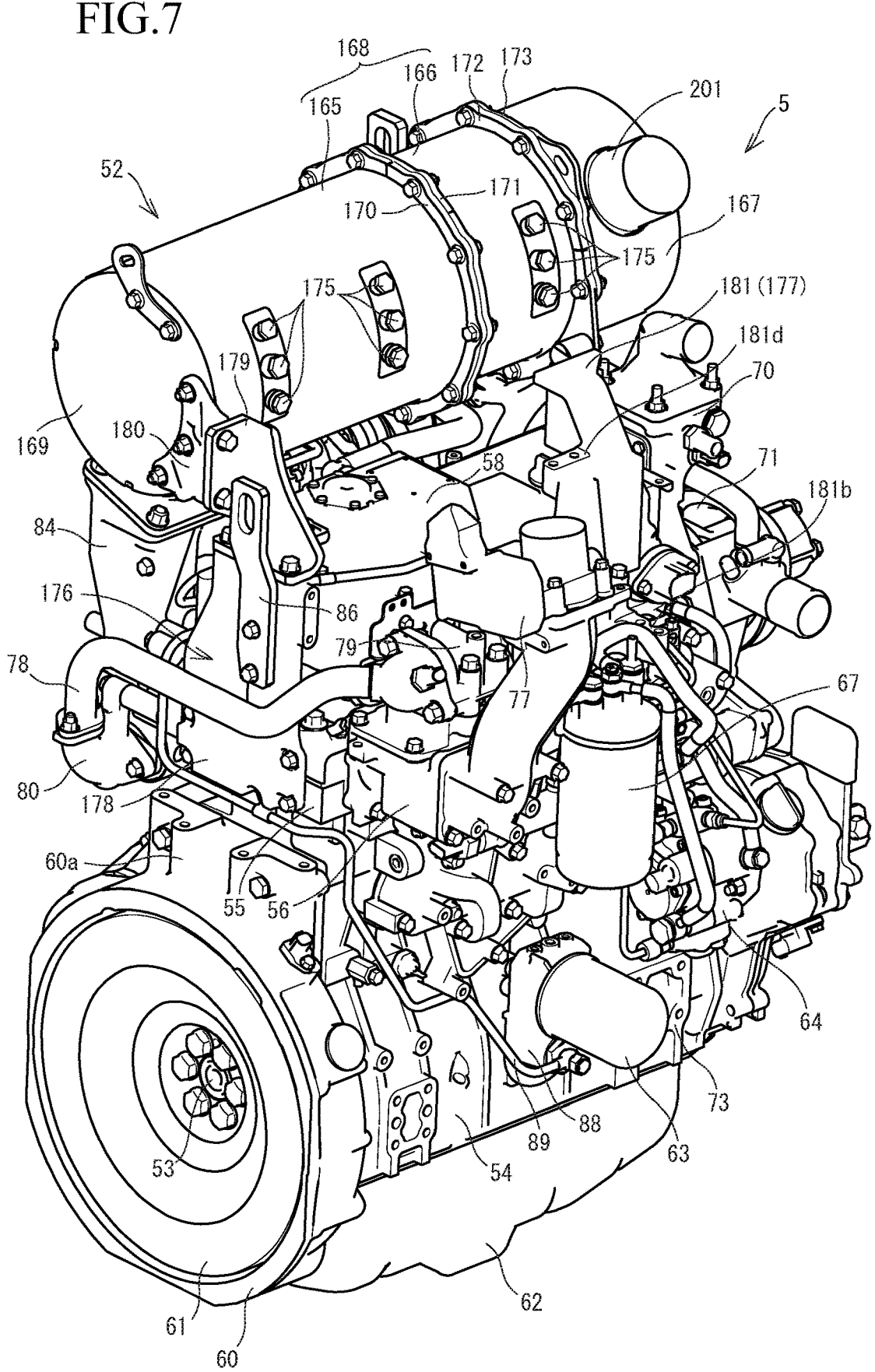
FIG. 7 is a rear perspective view of the diesel engine.
Figure 8:
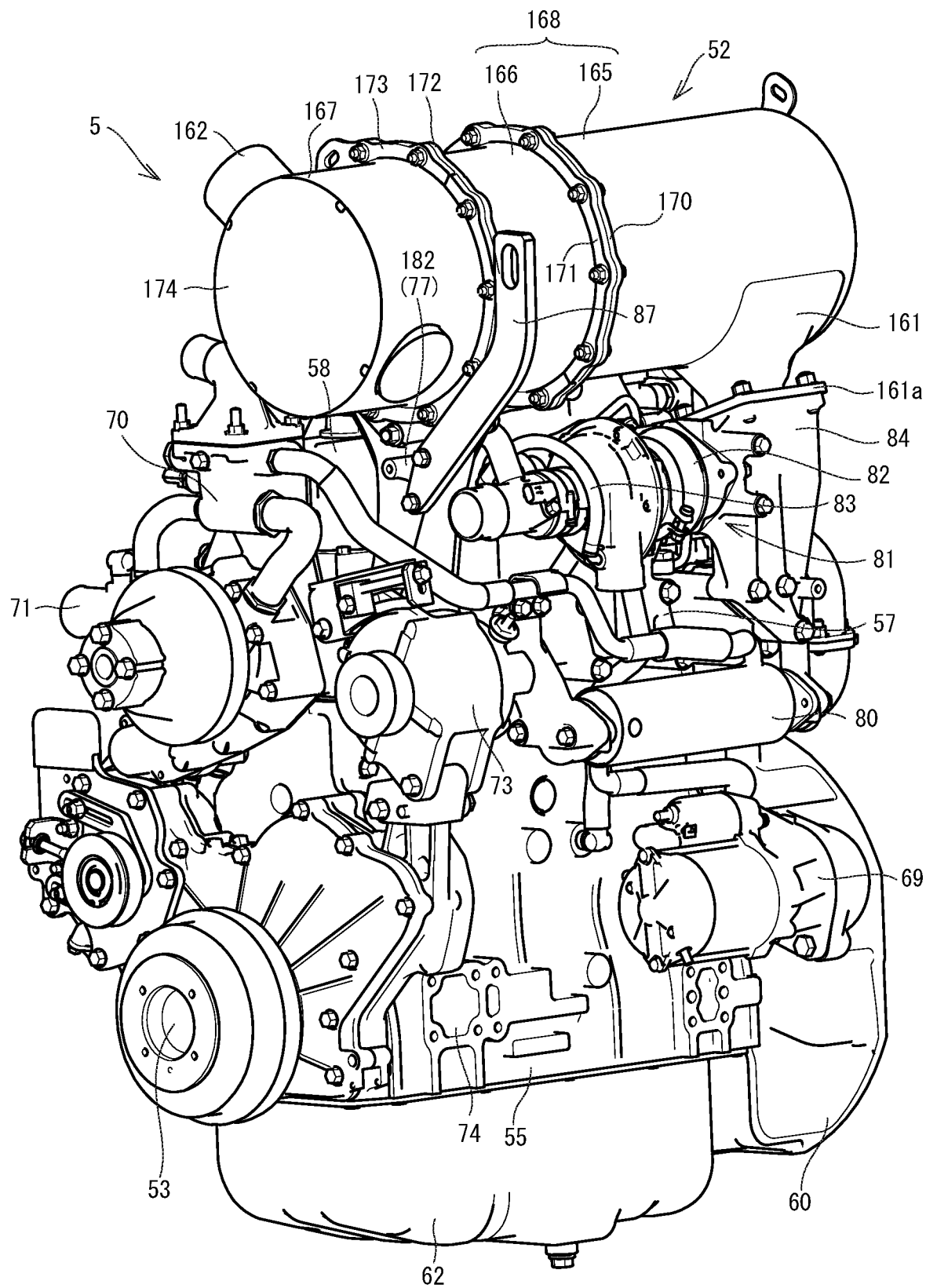
FIG. 8 is a front perspective view of the diesel engine.
Figure 9:
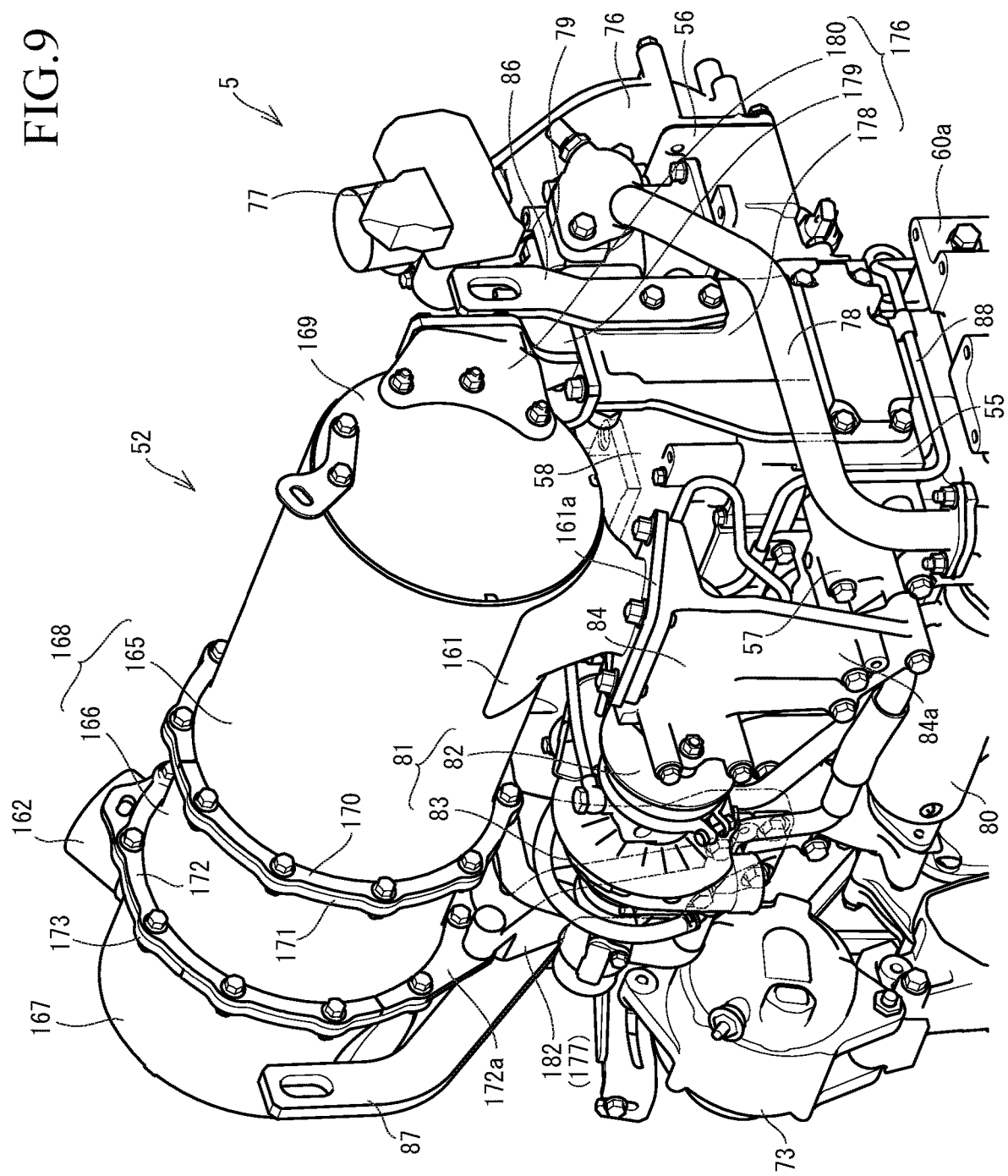
FIG. 9 is a partial perspective view of the diesel engine.
Figure 10:
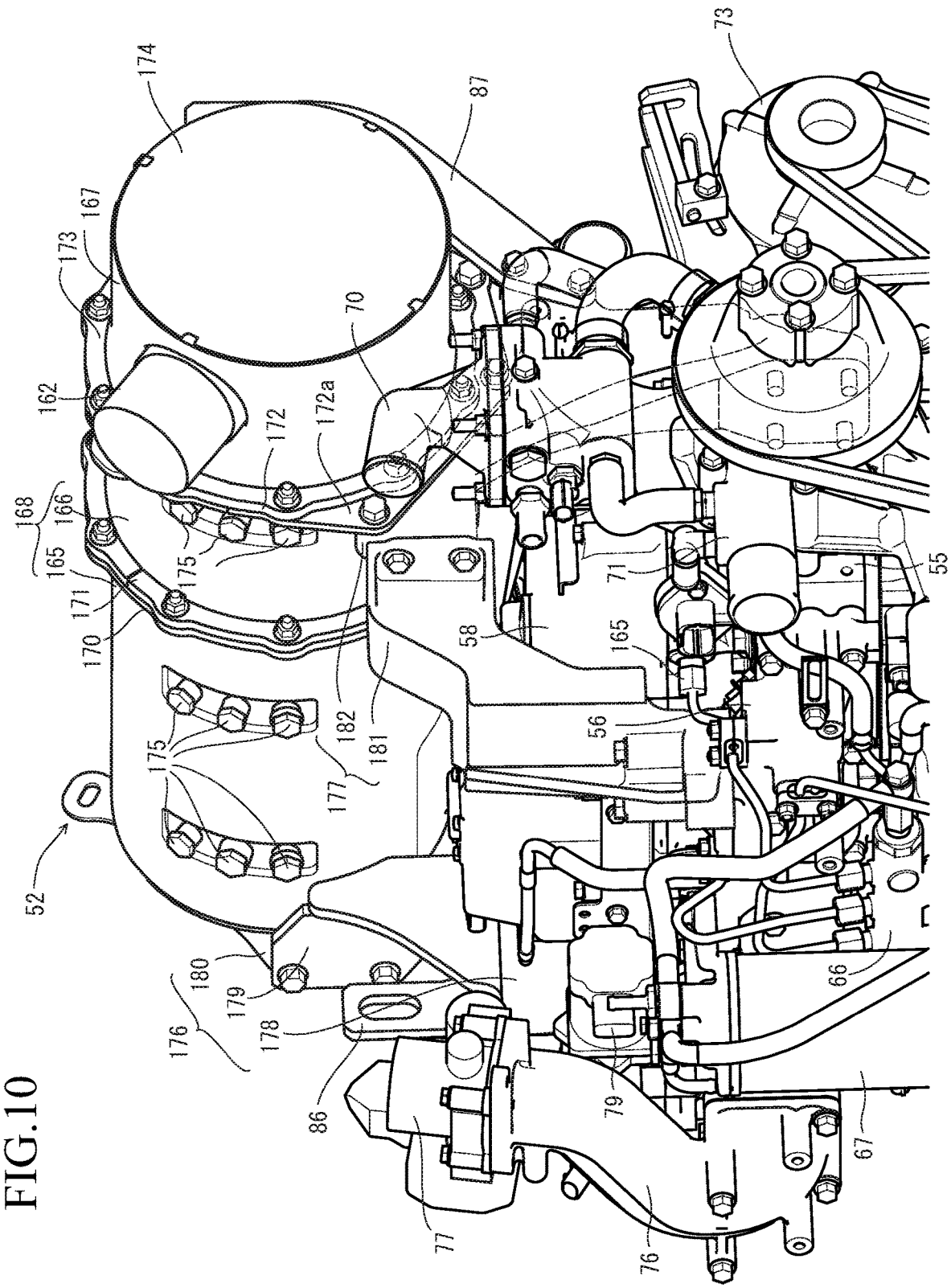
FIG. 10 is a partial perspective view of the diesel engine.

Hereinafter, an embodiment of the present invention will be described with reference to the drawings. First, a schematic configuration of a common rail diesel engine 5 according to this embodiment will be described with reference to FIGS. 1 to 10. In the following description, both sides of an output shaft 53 (both sides with the output shaft 53 located in between) will be referred to as left and right, a section where a cooling fan 59 is located is referred to as a front side, a section where a flywheel 61 is located is referred to as a rear side, a section where an exhaust manifold 57 is located is referred to as a left side, and a section where an intake manifold 56 is located is referred to as a right side. For convenience of description, these are used as a reference for the positional relationship in four directions and the vertical direction in the diesel engine 5.

As illustrated in FIGS. 1 to 8, an engine mounted on a work vehicle such as a tractor includes a continuously regenerating exhaust gas purification device (diesel particulate filter (DPF)) 52. The engine is the diesel engine 5 in this embodiment. The exhaust gas purification device 52 removes particulate matter (PM) in exhaust gas discharged from the diesel engine 5 and reduces carbon monoxide (CO) and hydrocarbon (HC) in the exhaust gas.

The diesel engine 5 includes a cylinder block 54. The cylinder block 54 embeds an output shaft 53 (crankshaft) and pistons (not shown). A cylinder head 55 is mounted on the cylinder block 54. The intake manifold 56 is located on the right side surface of the cylinder head 55. The exhaust manifold 57 is located on the left side surface of the cylinder head 55. That is, the intake manifold 56 and the exhaust manifold 57 are distributed on both side surfaces of the diesel engine 5 along the output shaft 53. A head cover 58 is located on the upper surface of the cylinder head 55. A cooling fan 59 is provided on a side surface of the diesel engine 5 that intersects the output shaft 53, more specifically, on the front surface of the cylinder block 54. Rotational power is transmitted to the cooling fan 59 from the front end of the output shaft 53 via a cooling fan V-belt 72a.

A flywheel housing 60 is provided on the rear surface of the cylinder block 54. The flywheel housing 60 houses a flywheel 61. The flywheel 61 is supported on the rear end of the output shaft 53. Motive power of the diesel engine 5 is transmitted to the operation parts of the work vehicle via the output shaft 53. An oil pan 62 is located on the lower surface of the cylinder block 54. Lubricant in the oil pan 62 is supplied to lubrication parts of the diesel engine 5 via an oil filter 63. The oil filter 63 is located on the right side surface of the cylinder block 54. The oil filter 63 is secured to the right side surface of the cylinder block 54 via an oil filter support member 88.

A fuel supply pump 64 for supplying fuel is secured above the oil filter 63 (below the intake manifold 56) on the right side surface of the cylinder block 54. The diesel engine 5 includes injectors 65 with electromagnetically controlled fuel injection valves for four cylinders. The injectors 65 are coupled to a fuel tank 11 via the fuel supply pump 64, a cylindrical common rail 66, and a fuel filter 67. The fuel tank 11 is mounted on the work vehicle (see FIGS. 19 to 21). An oil cooler 68 is located on the right side surface of the cylinder block 54 at a position vertically sandwiched between the common rail 66 and the oil filter 63.

Fuel in the fuel tank 11 is fed under pressure from the fuel supply pump 64 to the common rail 66 via the fuel filter 67, and the pressurized fuel is stored in the common rail 66. The pressurized fuel in the common rail 66 is injected from the injectors 65 into the cylinders of the diesel engine 5 by controlling opening and closing of the fuel injection valves of the injectors 65. An engine starter 69 is provided in the flywheel housing 60. A pinion gear of the engine starter 69 is engaged with a ring gear of the flywheel 61. When starting the diesel engine 5, the ring gear of the flywheel 61 is rotated by rotational force of the starter 69 so that the output shaft 53 starts rotating (or cranked).

A coolant pump 71 for coolant lubrication is located in front of the cylinder head 55 (close to the cooling fan 59) to be coaxial with a fan axis of the cooling fan 59. The coolant pump 71 is configured to be driven by rotation of the engine output shaft 53 together with the cooling fan 59. The work vehicle includes a radiator 235 (see FIGS. 22 and 26). The coolant in the radiator 235 is supplied to the coolant pump 71 via a thermostat case 70. The thermostat case 70 is located above the coolant pump 71. When the coolant pump 71 is driven, the coolant is supplied to a water-cooling jacket (not shown) formed in the cylinder head 55 and the cylinder block 54 to cool the diesel engine 5. The coolant that has contributed to cooling of the diesel engine 5 is returned to the radiator 235. Due to the positional relationship, the coolant pump 71 opposes the cooling fan 59. Thus, the cool air from the cooling fan 59 contacts the coolant pump 71.

A generator that generates electric power by power of the diesel engine 5 is provided on the left side of the diesel engine 5, or more specifically, leftward of the coolant pump 71. The generator is an alternator 73 in this embodiment. Rotational power is transmitted to the cooling fan 59 and the coolant pump 71 from the front end of the output shaft 53 via the cooling fan V-belt 72a. Rotational power is also transmitted from the front end of the output shaft 53 to the alternator 73 via an alternator V-belt 72b. When the coolant pump 71 is driven, the coolant in the radiator 235 (FIGS. 22 and 26), which is mounted on the work vehicle, is supplied to the cylinder block 54 and the cylinder head 55 to cool the diesel engine 5.

Figure 19:
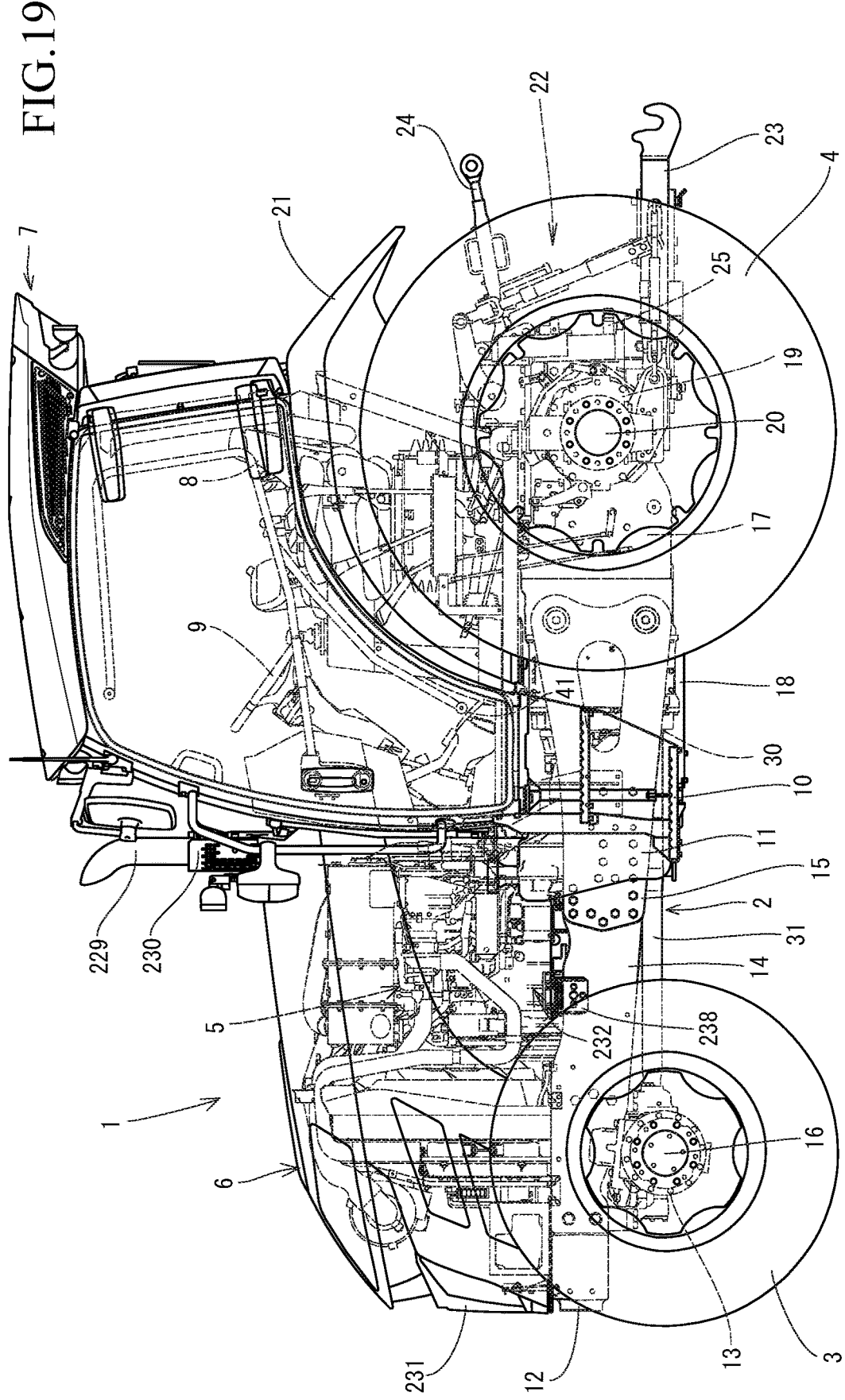
FIG. 19 is a left side view of a work vehicle on which the diesel engine is mounted.
Figure 20:
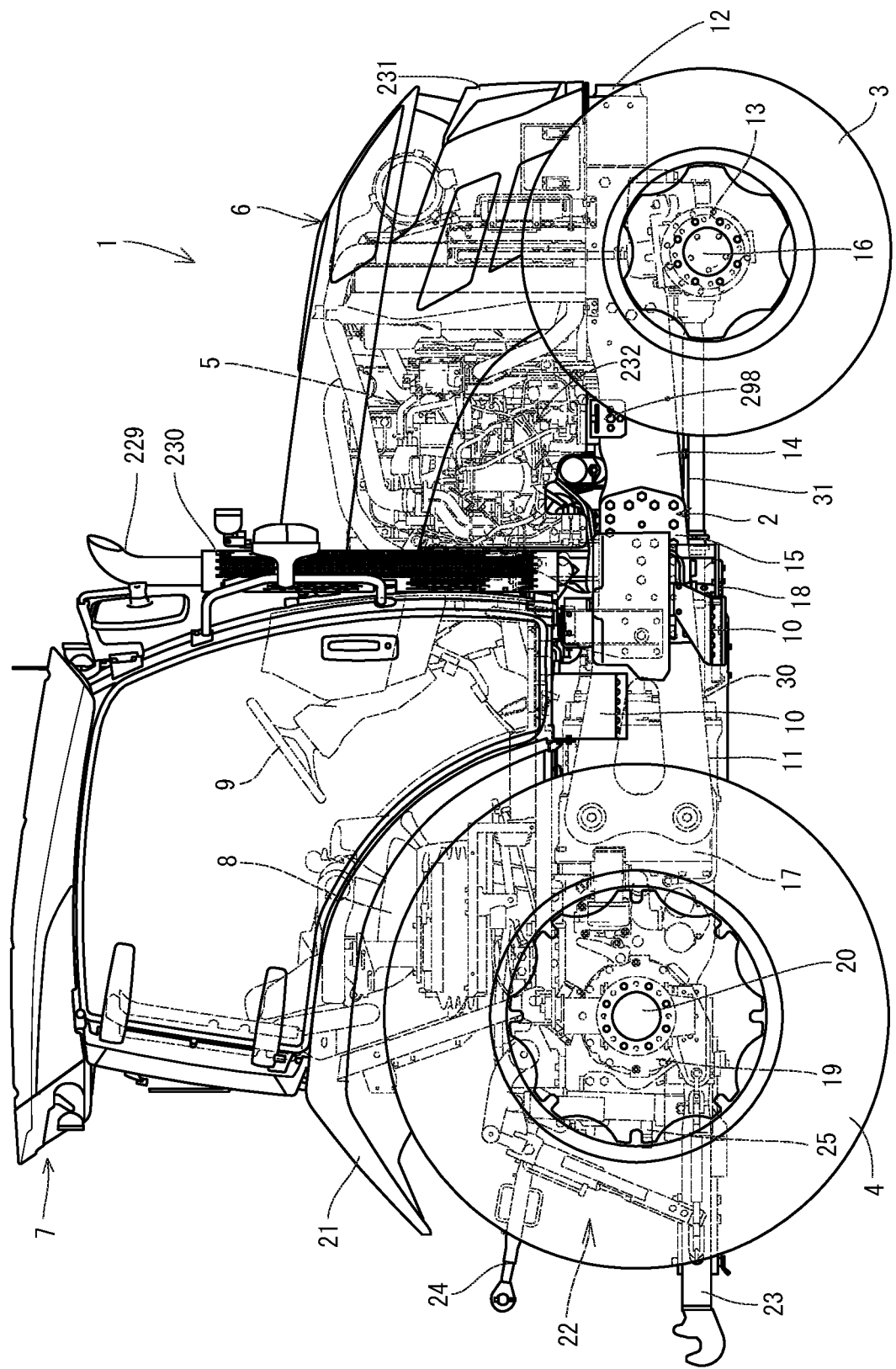
FIG. 20 is a right side view of the work vehicle.
Figure 21:
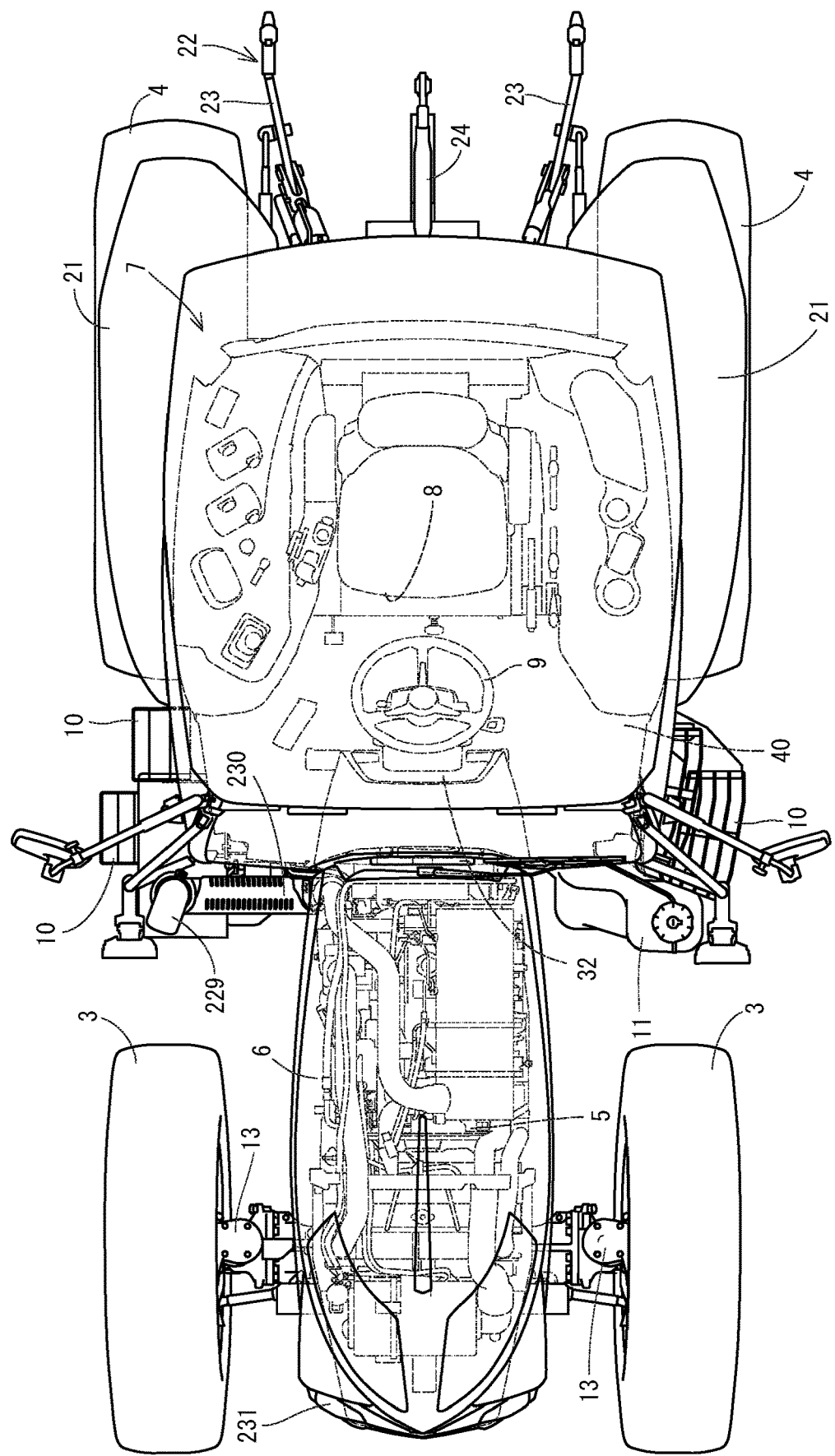
FIG. 21 is a plan view of the work vehicle.

An engine mount fitting 74 is provided on each of left and right side surfaces of the cylinder block 54. A front engine mount 238 (see FIGS. 19 and 20) can be bolted to each engine mount fitting 74. The front engine mount 238 includes an anti-vibration rubber. The work vehicle includes a pair of left and right engine frames 14 (FIGS. 19 to 21). In this embodiment, the engine mount fittings 74 of the cylinder block 54 are each bolted to the associated engine frame 14 via the associated engine mount 238 such that the cylinder block 54 is sandwiched between the engine frames 14. With this configuration, the engine frames 14 of the work vehicle support the front part of the diesel engine 5.

An intake connecting pipe 76 is coupled to the right side inlet portion of the intake manifold 56. Fresh air (external air) is supplied to the intake connecting pipe 76. An intake throttle member 77 is provided at the intake-air inlet side (upstream side) of the intake connecting pipe 76. A recirculation exhaust gas pipe 78 is coupled to the top inlet portion of the intake manifold 56 via an EGR valve member 79. Some of exhaust gas (EGR gas) of the diesel engine 5 is supplied to the recirculation exhaust gas pipe 78. In the intake manifold 56, the intake-air outlet side (downstream side) of the intake connecting pipe 76 and the coupling portion (rear portion) between the intake manifold 56 and an EGR valve member 79 configure a body case of an exhaust gas recirculation (EGR) apparatus 75. That is, the intake-air introduction side of the intake manifold 56 configures the EGR body case.

The EGR apparatus (exhaust gas recirculation apparatus) 75 is located mainly on the right side of the diesel engine 5, and more specifically, rightward of the cylinder head 55 and mixes some of the exhaust gas of the diesel engine 5 (EGR gas) with fresh air to supply the mixture to the intake manifold 56. The apparatus (exhaust gas recirculation apparatus) 75 includes the EGR body case configured by part of the intake manifold 56, the intake connecting pipe 76, which communicates with the intake manifold 56, the intake throttle member 77, which is located in the intake connecting pipe 76, the recirculation exhaust gas pipe 78, which is coupled to the exhaust manifold 57 via an EGR cooler 80, and the EGR valve member 79, which connects the intake manifold 56 to the recirculation exhaust gas pipe 80.

The intake throttle member 77 is coupled to the intake-air introduction side of the intake manifold 56 via the intake connecting pipe 76. The outlet of the recirculation exhaust gas pipe 78 is also coupled to the intake-air introduction side of the intake manifold 56 via the EGR valve member 79. The inlet of the recirculation exhaust gas pipe 78 is coupled to the exhaust manifold 57 via the EGR cooler 80. The amount of EGR gas supplied to the intake-air introduction side of the intake manifold 56 is adjusted by adjusting the opening degree of the EGR valve in the EGR valve member 79.

With the above-described configuration, while fresh air is supplied to the intake-air introduction side of the intake manifold 56 via the intake connecting pipe 76 and the intake throttle member 77, the EGR gas is supplied to the intake-air introduction side of the intake manifold 56 from the exhaust manifold 57. The fresh air from the outside and the EGR gas from the exhaust manifold 57 are mixed in the intake-air introduction side of the intake manifold 56. Some of the exhaust gas discharged to the exhaust manifold 57 from the diesel engine 5 is circulated from the intake manifold 56 to the diesel engine 5. This reduces the highest combustion temperature during high load operation and the discharge amount of NOx (nitrogen oxides) from the diesel engine 5.

A turbocharger 81 is located leftward of the cylinder head 55 above the exhaust manifold 57. The turbocharger 81 includes a turbine case 82 and a compressor case 83. The turbine case 82 embeds a turbine wheel. The compressor case 83 embeds a blower wheel. The exhaust introduction side of the turbine case 82 is coupled to the outlet of the exhaust manifold 57. The exhaust discharge side of the turbine case 82 is coupled to the exhaust introduction side of the exhaust gas purification device 52 via an exhaust connecting pipe 84. That is, the exhaust gas that has been discharged from the cylinders of the diesel engine 5 to the exhaust manifold 7 is released to the outside via, for example, the turbocharger 81 and the exhaust gas purification device 52.

Figure 22:
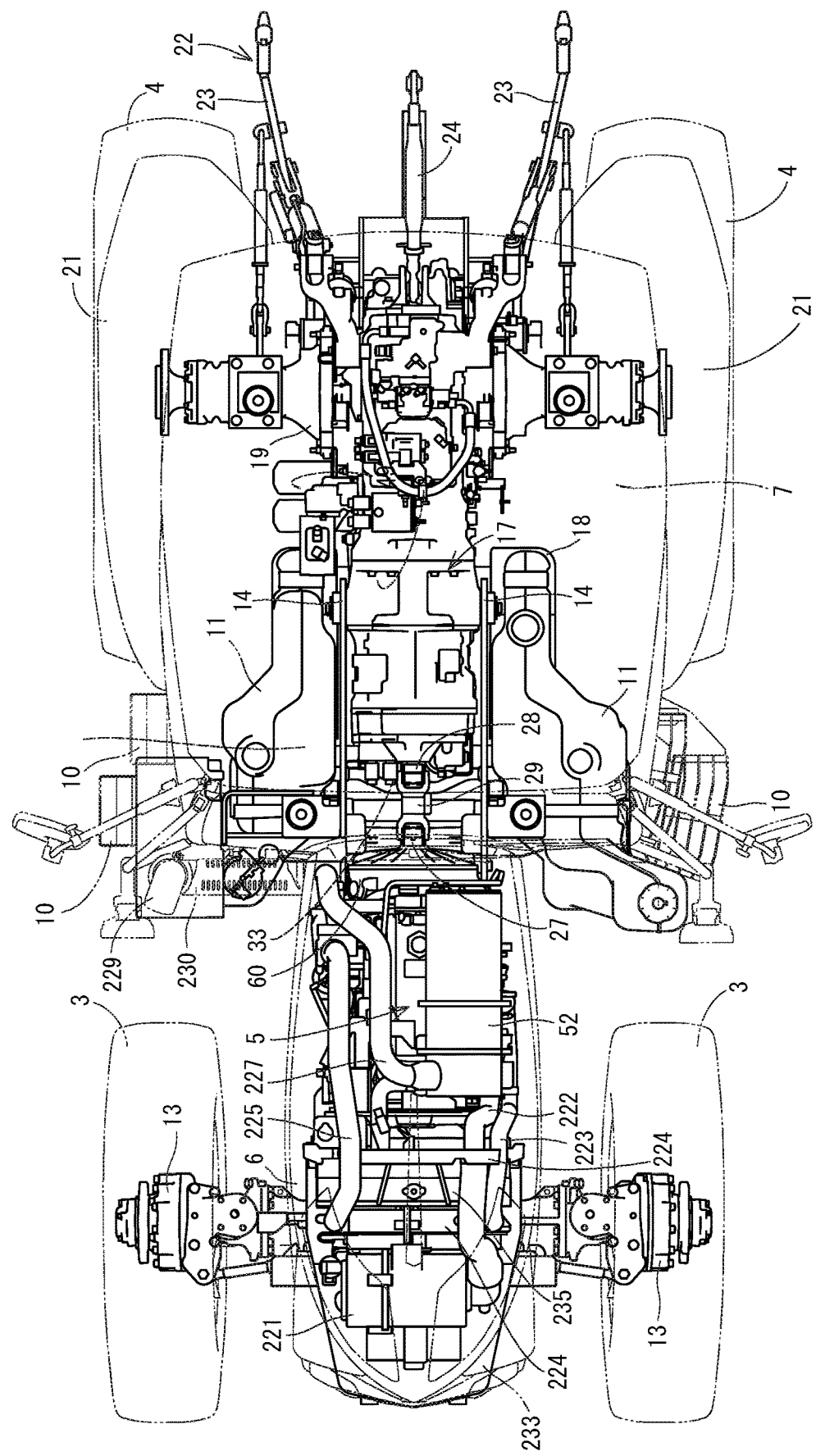
FIG. 22 is a plan view of the traveling body of the work vehicle.
Figure 26:
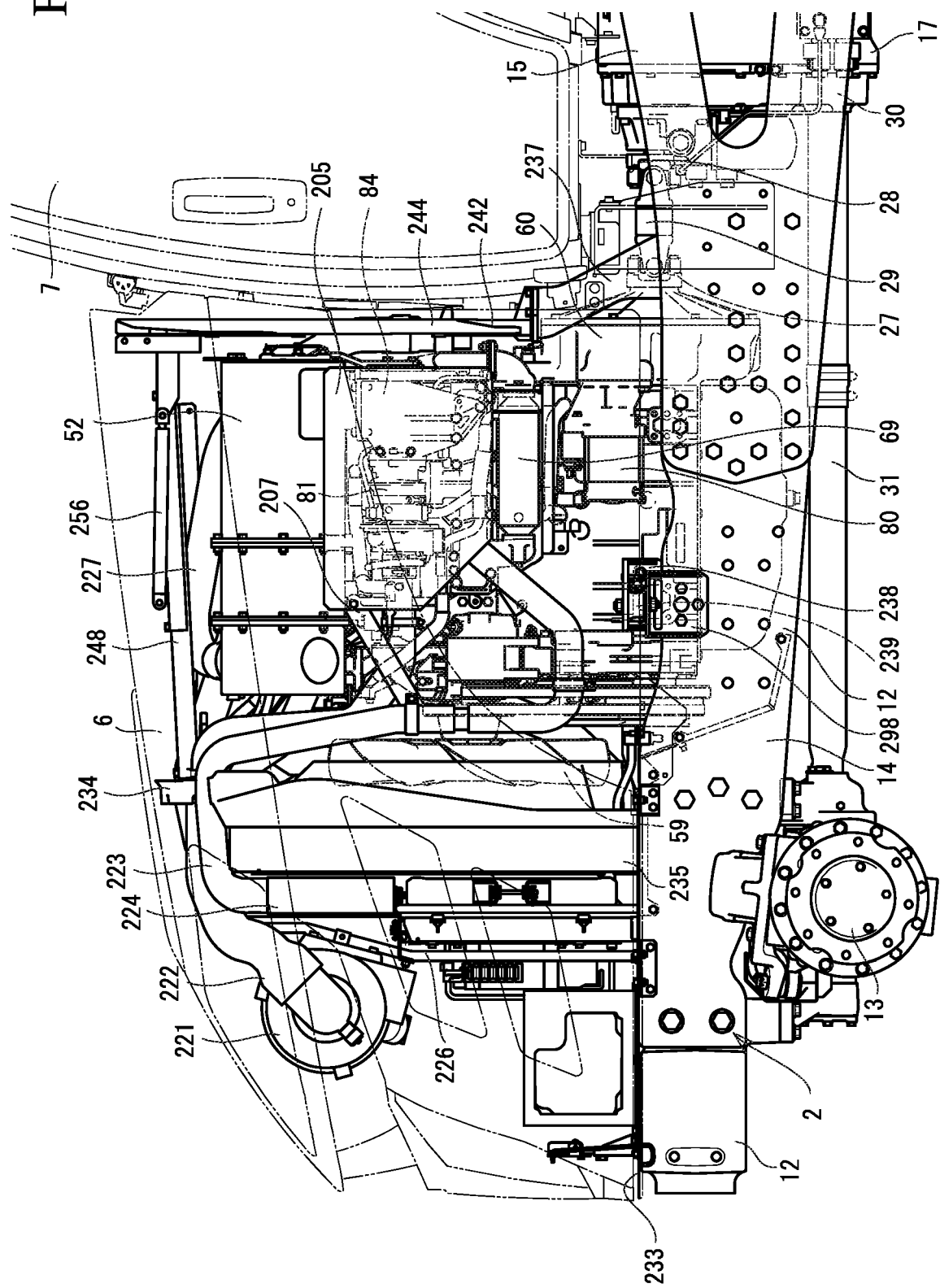
FIG. 26 is a left side enlarged view of the work vehicle illustrating the configuration in the engine compartment.

The intake-air introduction side of the compressor case 83 is coupled to the intake-air discharge side of an air cleaner 221 (see FIGS. 22 and 26) via a supply pipe 222 (see FIGS. 22 and 26). The intake-air discharge side of the compressor case 83 is coupled to the intake-air introduction side of an intercooler 224 (see FIGS. 22 and 26) via an upstream relay pipe 223 (see FIGS. 22 and 26). The intake-air discharge side of the intercooler 224 (see FIGS. 22 and 27) is coupled to the intake throttle member 77 via a downstream relay pipe 225 (see FIGS. 22 and 27). That is, the fresh air (external air) from which dust has been removed by the air cleaner 221 is sent from the compressor case 83 to the EGR apparatus 75 via the intercooler 224 and then supplied to the cylinders of the diesel engine 5.

The exhaust gas purification device 52 is located on the top side of the diesel engine 5 above the exhaust manifold 57 and the turbocharger 81, that is, leftward of the cylinder head 55 and above the exhaust manifold 57 and the turbocharger 81. In this case, the position of the exhaust gas purification device 52 is set such that the longitudinal direction of the exhaust gas purification device 52 extends parallel to the output shaft 53 of the diesel engine 5.

Next, a configuration of the exhaust gas purification device (diesel particulate filter (DPF)) 52 will be described with reference to the previous drawings and FIGS. 9 to 16. The DPF 52 is for collecting, for example, particulate matter (PM) in exhaust gas. The DPF 52 is configured to be approximately cylindrical and to extend parallel to the output shaft (crankshaft) 53 of the diesel engine 5 in the fore-and-aft direction. The DPF 52 is located above the cylinder head 55 of the diesel engine 5. An exhaust gas inlet pipe 161 (exhaust gas introduction side) and an exhaust gas outlet pipe 162 (exhaust gas discharge side) are distributed to the front and the rear of the diesel engine 5 on both ends (one end in the exhaust gas moving direction and the other end in the exhaust gas moving direction) of the DPF 52.

The DPF 52 is configured to accommodate, for example, a diesel oxidation catalyst 163 and a soot filter 164 arranged in series. The diesel oxidation catalyst 163 is made of, for example, platinum. The soot filter 164 has a honeycomb structure. In the above-described configuration, nitrogen dioxide (NO2) generated by oxidation in the diesel oxidation catalyst 163 is taken into the soot filter 164. The particulate matter contained in the exhaust gas of the diesel engine 5 is collected by the soot filter 164 and continuously oxidized and removed by the nitrogen dioxide (NO2). Thus, in addition to the removal of the particulate matter (PM) in the exhaust gas of the diesel engine 5, the content of carbon monoxide (CO) and hydrocarbon (HC) in the exhaust gas of the engine 1 is reduced. The diesel oxidation catalyst 39 and the soot filter 40 correspond to a gas purification filter accommodated in a purification housing 38.

The DPF 52 includes an upstream case (first case) 165, an intermediate case (second case) 166, and a downstream case (third case) 167. The exhaust gas inlet pipe 161 is provided on the outer circumferential surface of the upstream case 165. The intermediate case 166 is coupled to the upstream case 165. The exhaust outlet pipe 162 is inserted in the downstream case 167 from the outer circumferential surface. The upstream case 165 and the intermediate case 166 are arranged in series and coupled to each other to form a gas purification housing 168. The gas purification housing 168 is made of heat-resistant metal material. The gas purification housing 168 accommodates the diesel oxidation catalyst 163 and the soot filter 164 via a cylindrical inner case (not shown). The downstream case 167 includes an inner case (not shown) having multiple silencing holes. The space between the downstream case 167 and the inner case is filled with a silencing material made of ceramic fiber to form a silencer.

One end of the upstream case 165 that is an upstream end in the exhaust gas moving direction is covered with an upstream lid 169. The other end of the upstream case 165 that is a downstream end in the exhaust gas moving direction is open. The upstream case 165 has a cylindrical shape with the downstream end in the exhaust gas moving direction open. The intermediate case 166 has a cylindrical shape with both ends open. One end of the downstream case 167 that is an upstream end in the exhaust gas moving direction is open. The other end of the downstream case 167 that is a downstream end in the exhaust gas moving direction is covered with a downstream lid 174. The downstream case 167 has a cylindrical shape with the upstream end in the exhaust gas moving direction open. A tailpipe 229 (see FIGS. 22 and 32) is coupled to the exhaust gas outlet pipe 162, which is located on the outer circumferential surface of the downstream case 167, via an exhaust pipe 227 (see FIGS. 22 and 32). Exhaust gas is discharged to the outside from the exhaust gas outlet pipe 162 via the exhaust pipe 227 and the tailpipe 229.

Coupling portions of the upstream case 165 and the intermediate case 166 are coupled by sandwiching the coupling portions from both sides in the exhaust gas moving direction with a pair of thick plate-like sandwich flanges 170, 171. That is, a joining flange located at a downstream open edge of the upstream case 165 and a joining flange located at an upstream open edge of the intermediate case 166 are sandwiched by the sandwich flanges 170, 171 to couple the downstream end of the upstream case 165 to the upstream end of the intermediate case 166. This configures the gas purification housing 168. At this time, tightening the sandwich flanges 170, 171 with bolts detachably couples the upstream case 165 to the intermediate case 166. Coupling portions of the intermediate case 166 and the downstream case 167 are coupled by sandwiching the coupling portions from both sides in the exhaust gas moving direction with a pair of thick plate-like sandwich flanges 172, 173. Tightening the central sandwich flanges 170, 171 with bolts detachably couples the upstream case 165 to the intermediate case 166.

The exhaust gas inlet pipe 161 is provided on the outer circumferential portion at the exhaust introduction side (exhaust inlet side) of the upstream case 165. The exhaust introduction side of the exhaust gas inlet pipe 161 communicates with the exhaust discharge side of the turbine case 82 via an exhaust relay passage, which is the exhaust connecting pipe 84 in this embodiment. The exhaust connecting pipe 84 is approximately L-shaped as viewed from the side. The exhaust connecting pipe 84 includes an exhaust introduction side at the front and is coupled to the exhaust discharge side of the turbine case 82. The exhaust connecting pipe 84 also includes the exhaust discharge side at the upper section and is coupled to the exhaust gas inlet pipe 161 of the DPF 52. The exhaust connecting pipe 84 includes a coupling support portion 84a, which extends downward from the outer circumferential surface. The lower end of the coupling support portion 84a is coupled to the left side surface of the exhaust manifold 57. That is, the exhaust connecting pipe 84 is secured to the diesel engine 5 by fastening the exhaust connecting pipe 84 to the exhaust manifold 57 and the turbocharger 81 with bolts.

Sensor bosses 175 are located on the outer circumferential surface of the gas purification housing 168. The sensor bosses 175 are coupled to temperature sensors 186, 187 (see FIGS. 32 and 33) and sensor pipes 188, 189 (see FIG. 27). In this embodiment, the upstream case 165 accommodates the oxidation catalyst 163 and the upstream section of the soot filter 164. The intermediate case 165 accommodates the downstream section of the soot filter 164. The sensor boss 175 that is coupled to an upstream temperature sensor 186 is provided on the outer circumferential surface of the upstream case 165 at a position upstream of the oxidation catalyst 163 in the exhaust gas moving direction. The sensor boss 175 that is coupled to a downstream temperature sensor 187 and an upstream sensor pipe 188 is provided at a position between the oxidation catalyst 163 and the soot filter 164. The sensor boss 175 that is coupled to a downstream sensor pipe 189 is provided on the outer circumferential surface of the intermediate case 166 at a position downstream of the soot filter 164 in the exhaust gas moving direction.

Next, a configuration for mounting the exhaust gas purification device 52 to the diesel engine 5 will be described with reference to FIGS. 9 to 18. The diesel engine 5 includes a housing support that supports and secures the exhaust gas purification device 52 (gas purification housing 168). The housing support includes an inlet side bracket 176 and an outlet side bracket 177. The inlet side bracket 176 and the outlet side bracket 177 have a great width in a direction that intersects the output shaft 53 of the diesel engine 5. The inlet side bracket 176 and the outlet side bracket 177 are detachably coupled to the cylinder head 55 of the diesel engine 5 directly or via the intake manifold 56 or the exhaust manifold 57. The inlet side bracket 176 and the outlet side bracket 177 are distributed and stand upright on the front and the rear of the cylinder head 55 and on both sides of the output shaft 53. The inlet side bracket 176 is located at the rear of the cylinder head 55 and supports the exhaust introduction side of the gas purification housing 168. The outlet side bracket 177 is located at the front of the cylinder head 55 and supports the exhaust discharge side of the gas purification housing 168.

The inlet side bracket 176 is located at the rear of the cylinder head 55 (above the flywheel housing 60). The inlet side bracket 176 includes a securing bracket (first bracket) 178. The lower edge of the securing bracket 178 is bolted to the rear surface of the cylinder head 55. A relay bracket 179 is bolted to the upper end of the securing bracket 178. The proximal end of an extended bracket (third bracket) 180 is bolted to the middle of the relay bracket (second bracket) 179. The distal end of the extended bracket 180 is fastened to the upstream lid 169 of the gas purification housing 168 with bolts and nuts.

The outlet side bracket 177 is located at the front of the cylinder head 55 (close to the cooling fan 59). The outlet side bracket 177 of this embodiment is separated into an outlet side first bracket (fourth bracket) 181 and an outlet side second bracket (fifth bracket) 182. The outlet side first bracket 181 is an approximately L-shaped member that extends upward from the right side of the cylinder head 55 and bends to the left side above the cylinder head 55. The outlet side second bracket 182 is an approximately L-shaped member that extends upward from the left side of the cylinder head 55 and bends to the right side above the cylinder head 55. Thus, the outlet side bracket 177 has an approximately inverted U shape in front of the cylinder head 55 and is secured to extend over the cylinder head 55 at a position rearward of the thermostat case 70.

The lower end surface (proximal end) of the outlet side first bracket 181 is bolted to the upper surface of the intake manifold 56. The upper left end (distal end) of the outlet side first bracket 181 is bolted to the upper right end (distal end) of the outlet side second bracket 182. The lower right end (proximal end) of the outlet side second bracket 182 is bolted to the left side front portion of the cylinder head 55. The outlet side second bracket 182 includes an upper end curved surface (U-shaped pressure-receiving surface) 182a at the upper end (distal end) of the outlet side second bracket 182. The upper end curved surface 182a receives the outer circumferential surface of the gas purification housing 168 and is bolted to a bracket fastening portion 172a. The bracket fastening portion 172a is formed at the lower section of the sandwich flange (outlet sandwich flange) 172 of the gas purification housing 168.

As is clear from the above description, the exhaust gas purification device 52 of this embodiment is detachably coupled to the cylinder head 55, the intake manifold 56, and the exhaust manifold 57 of the engine 5 via the housing support above the diesel engine 5. The housing support includes the exhaust connecting pipe 84, the inlet side bracket 176, and the outlet side bracket 177. The inlet side bracket 176 and the exhaust connecting pipe 84, which are located upstream in the exhaust gas moving direction (exhaust introduction side), are distributed to the cylinder head 55 and the exhaust manifold 57. The outlet side bracket 177 (the outlet side first bracket 181 and the outlet side second bracket 182), which is located downstream in the exhaust gas moving direction (exhaust discharge side), is distributed to the cylinder head 55 and the intake manifold 56. Thus, the exhaust gas purification device 52 is supported at four points.

This configuration supports the exhaust gas purification device 52, which is one of the components of the engine 5, with high rigidity and prevents damage on the exhaust gas purification device 52 that is caused by, for example, vibration. In particular, in this embodiment, since the lower end of the inlet side bracket 176 and the outlet side second bracket 182 are fastened to the cylinder head 55, a mounting reference position of the exhaust gas purification device 52 with respect to the engine 5 is set with high accuracy. Thus, even the exhaust gas purification device 52, which is heavier than an after-treatment device such as a muffler, is appropriately mounted on a predetermined position.

Figure 11:
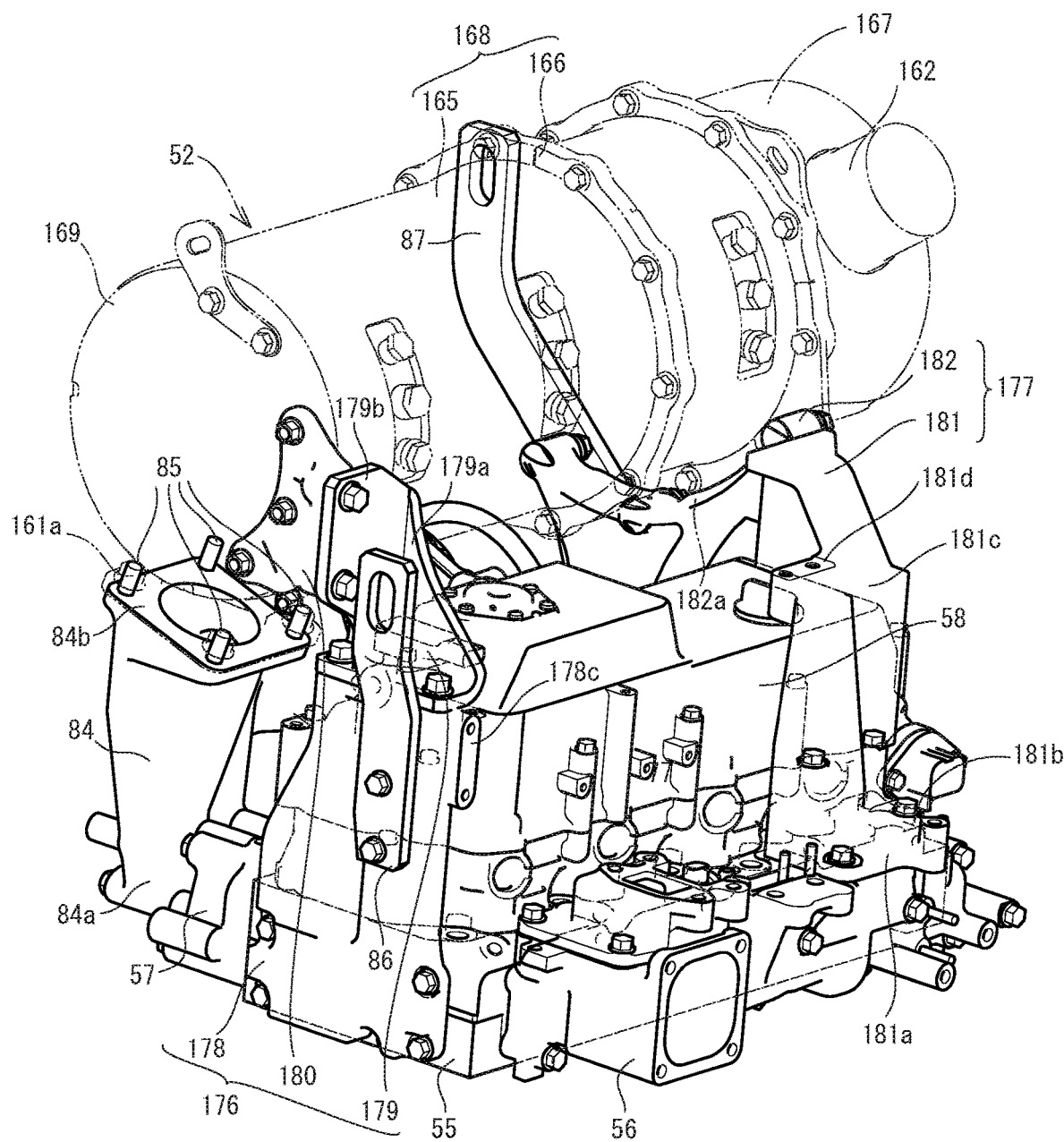
FIG. 11 illustrates a support structure of the DPF.
Figure 13:
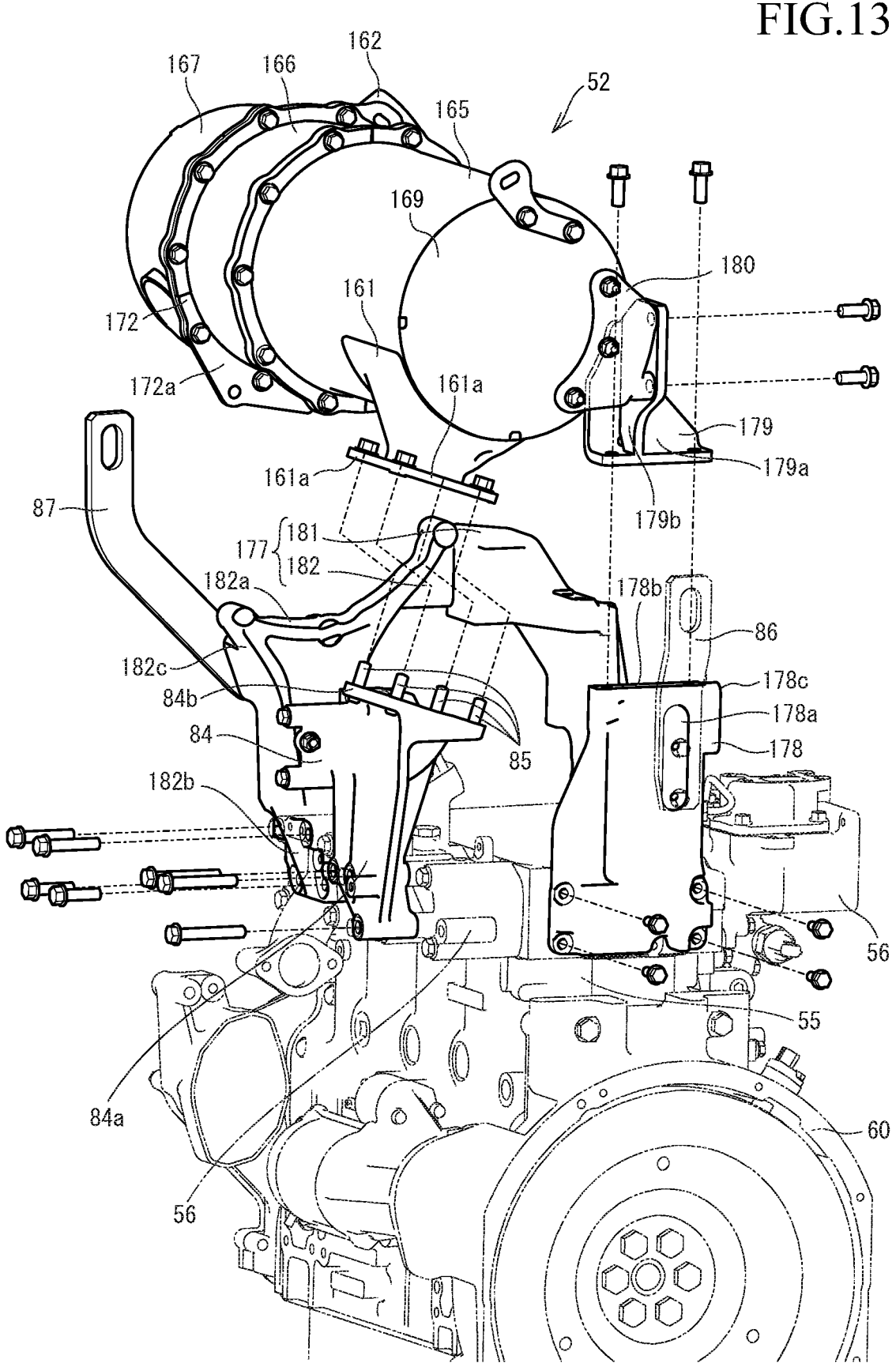
FIG. 13 is an exploded perspective view of the support brackets as viewed from the exhaust inlet side of the DPF.
Figure 15:
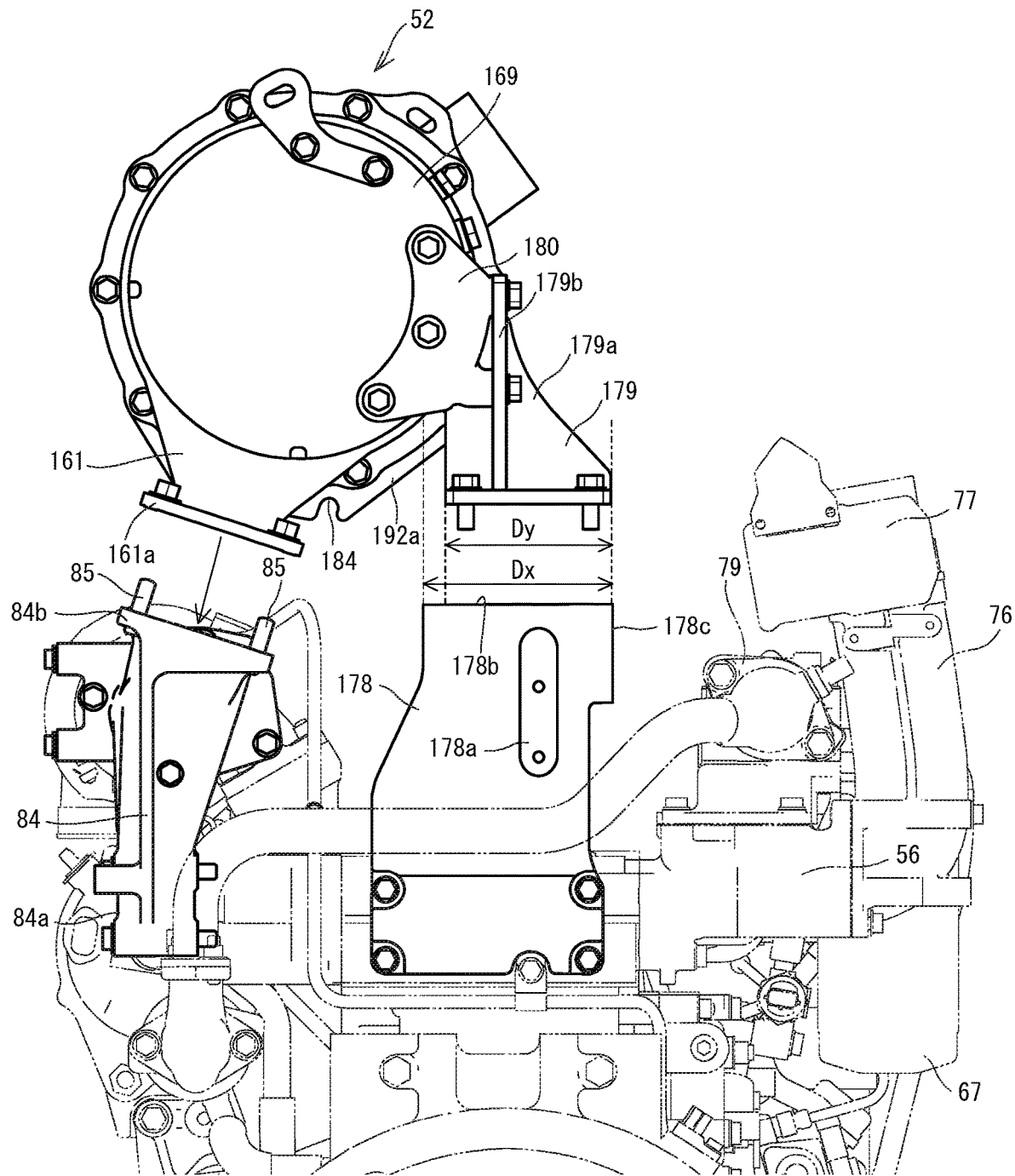
FIG. 15 is a rear view of the DPF and one of the support brackets illustrating the relationship between the DPF and the support bracket.

As illustrated in FIGS. 11, 13, and 15, the securing bracket 178 is a plate-like member that has a great width in a direction intersecting the exhaust gas moving direction of the DPF 52 (the output shaft 53 of the diesel engine 5). The section of the securing bracket 178 lower than the recirculation exhaust gas pipe 78 is bolted to the cylinder head 55. That is, the recirculation exhaust gas pipe 78, which is coupled to the EGR cooler 80, detours behind the securing bracket 178 and is coupled to the intake throttle member 77. The securing bracket 178 includes a front component coupling portion (first component coupling portion) 178a, which includes bolt holes at a section above the recirculation exhaust gas pipe 78. A hanging fixture 86 is detachably bolted to the front component coupling portion 178a.

The securing bracket 178 further includes a bracket coupling portion 178b. The bracket coupling portion 178b is located on the upper surface of the upper end portion and includes bolt holes. The relay bracket 179 is detachably bolted to the bracket coupling portion 178b. The securing bracket 178 also includes a side component coupling portion (second component coupling portion) 178c. The side component coupling portion 178c is located on the right side of the upper end portion and includes bolt holes. A component securing bracket (exhaust pipe securing bracket) 210 (see FIGS. 31 and 32) for securing an external component such as the exhaust pipe 227 (see FIGS. 31 and 32) is bolted to the side component coupling portion 178c.

As illustrated in FIGS. 11, 13, and 15, the bottom surface at the lower end portion of the relay bracket 179 is abut against the upper surface at the upper end portion of the securing bracket 178. In this state, the relay bracket 179 is bolted to the securing bracket 178. The relay bracket 179 includes a base plate 179a and a coupling plate 179b. The base plate 179a extends upward from the lower end portion secured to the bracket coupling portion 178b of the securing bracket 178. The coupling plate 179b stands upright at the rear of the plate 179a. The coupling plate 179b is welded to the base plate 179a. The coupling plate 179b of the relay bracket 179 includes fore-and-aft position adjusting bolt holes elongated in the fore-and-aft direction. Mounting bolts that are loosely inserted through the position adjusting bolt holes from the right are screwed to the right side surface of the extended bracket 180 so that the relay bracket 179 is securely coupled to the extended bracket 180. The extended bracket 180 is configured such that the coupling portion that is coupled to the relay bracket 179 stands upright at the rear of the fixed portion that is fixed to the upstream lid 169 of the gas purification housing 168.

The mounting position of the extended bracket 180, which is secured to the gas purification housing 168, in the fore-and-aft direction is adjustable with respect to the relay bracket 179, which is secured to the securing bracket 178, in a range corresponding to the dimension in which the mounting bolts move forward and rearward in the fore-and-aft position adjusting bolt holes of the relay bracket 179. Thus, the mounting position of the DPF 52 in the fore-and-aft direction (exhaust gas moving direction) is adjustable with respect to the securing bracket 178, which is secured to the cylinder head 55, by adjusting the position of the mounting bolts in the fore-and-aft position adjusting bolt holes of the relay bracket 179.

At the inlet side of the gas purification housing 168, as described above, the lower end of the coupling support portion 84a of the exhaust connecting pipe 84, which communicates with the exhaust gas inlet pipe 161, is bolted to the exhaust manifold 57. That is, the exhaust connecting pipe 84 is configured to be the housing support that supports the inlet side of the gas purification housing 168 together with the inlet side bracket 176. Thus, the exhaust gas inlet side of the DPF 52 is supported with a high rigidity by the inlet side bracket 176, which is coupled to each of the rear surface of the cylinder head 55 and the upstream lid 169, and the exhaust connecting pipe 84 coupled to each of the left side of the exhaust manifold 57 and the exhaust gas inlet pipe 161.

Furthermore, as illustrated in FIGS. 9, 11, 13, and 15, embedded bolts 85 are provided on an upward-facing mounting surface 84b of the exhaust connecting pipe 84. Fore-and-aft position adjusting bolt holes that are elongated in the fore-and-aft direction are formed in an inlet flange 161a of the exhaust gas inlet pipe 161. The embedded bolts 85 are loosely inserted through the inlet flange 161a of the exhaust gas inlet pipe 161 from below, and nuts 85a are screwed to the upper ends of the embedded bolts 85 so that the exhaust gas inlet pipe 161 is detachably fastened to the housing support 85. The mounting position of the DPF 52 with respect to the exhaust connecting pipe 84 in the fore-and-aft direction is adjustable in a range corresponding to the dimension in which the embedded bolts 85 move forward and rearward in the bolt holes elongated in the fore-and-aft direction in the inlet flange 161a.

That is, the mounting position of the rear section of the gas purification housing 168 in the fore-and-aft direction is adjustable with respect to the exhaust connecting pipe 84 and the inlet side bracket 176 by moving the embedded bolts 85 and the mounting bolts forward and rearward with respect to the fore-and-aft position adjusting bolt holes of each of the relay bracket 179 and the inlet flange 161a. Thus, the mounting position of the DPF 52 with respect to the diesel engine 5 is easily determined, and the mounting accuracy of the DPF 52, which is secured to the diesel engine 5, is improved. Also, deformation force is prevented from being applied to the gas purification housing 168 due to, for example, an error in the coupling position of the exhaust connecting pipe 84, the inlet side bracket 176, and the outlet side bracket 177. That is, even with the configuration in which the DPF 52 is located at a position above the diesel engine 5 where the DPF 52 is likely to be shaken, for example, the machine vibration of the DPF 52 is easily reduced.

The exhaust gas discharge side (exhaust outlet side) of the exhaust connecting pipe 84 that extends upward from the coupling support portion 84a, which is fastened to the exhaust manifold 57, is tilted rightward (toward the cylinder head 55) with respect to the vertical direction (up and down direction). That is, when the exhaust connecting pipe 84 is viewed from the rear, the upward-facing mounting surface 84b of the exhaust connecting pipe 84 is located to the right of a position directly above the coupling portion between the coupling support portion 84a and the exhaust manifold 57. The upward-facing mounting surface 84b of the exhaust connecting pipe 84 is tilted with respect to a horizontal surface such that the right edge is lowered. The exhaust connecting pipe 84 is located such that the upper ends of the embedded bolts 85 are tilted to the right side. Thus, when the inlet flange 161a of the exhaust gas inlet pipe 161 is secured to the upward-facing mounting surface 84b of the exhaust connecting pipe 84, the DPF 52 is lowered from above right to below left with respect to the exhaust connecting pipe 84.

At this time, since the mounting bolts that are screwed to the securing bracket 178 are loosely fitted in the relay bracket 179, the bolt holes of the inlet flange of the exhaust gas inlet pipe 161 are fitted to the embedded bolts 85 of the tilted exhaust connecting pipe 84. As illustrated in FIG. 15, the width Dx of the bracket coupling portion 178b on the upper surface of the securing bracket 178 is greater than the width Dy of the lower end of the relay bracket 179. That is, when the DPF 52 is lowered diagonally downward to couple the exhaust gas inlet pipe 161 to the exhaust connecting pipe 84 so that the DPF 52 is mounted onto the diesel engine 5, the entire surface of the lower end of the relay bracket 179 is reliably received by the bracket coupling portion 178b on the upper surface of the securing bracket 178.

Figure 12:
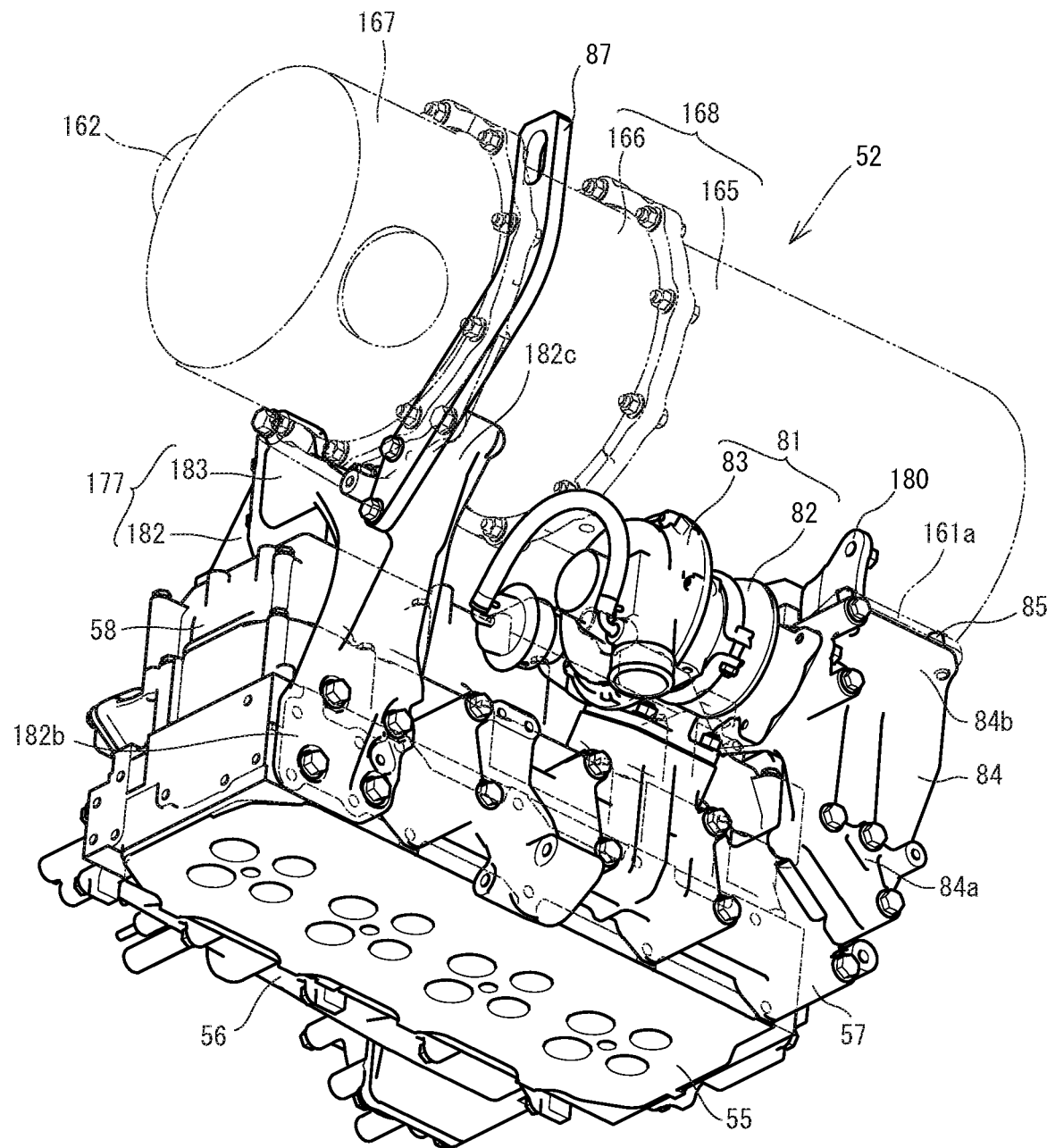
FIG. 12 illustrates the support structure of the DPF.
Figure 14:
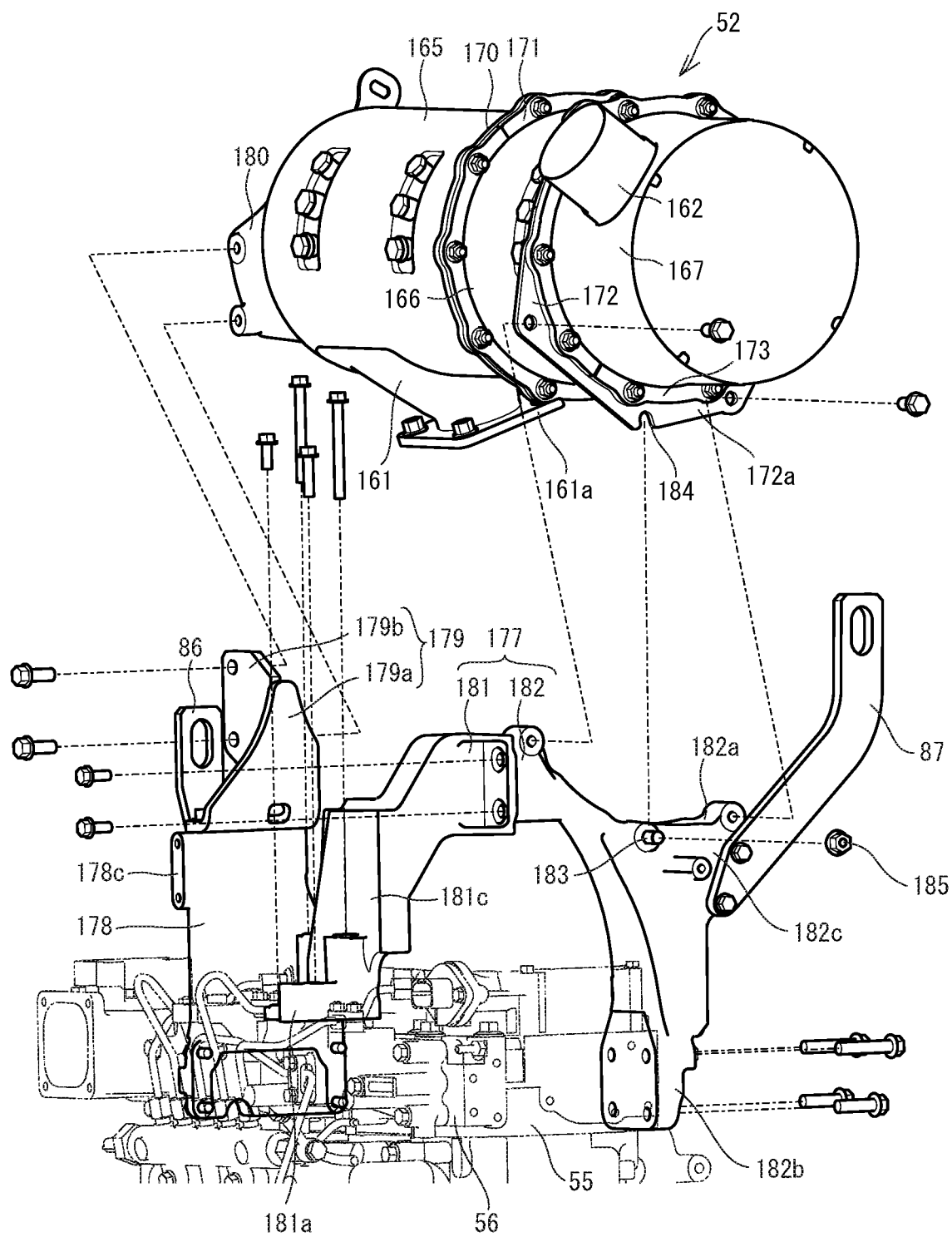
FIG. 14 is an exploded perspective view of the support brackets as viewed from the exhaust outlet side of the DPF.
Figure 16:
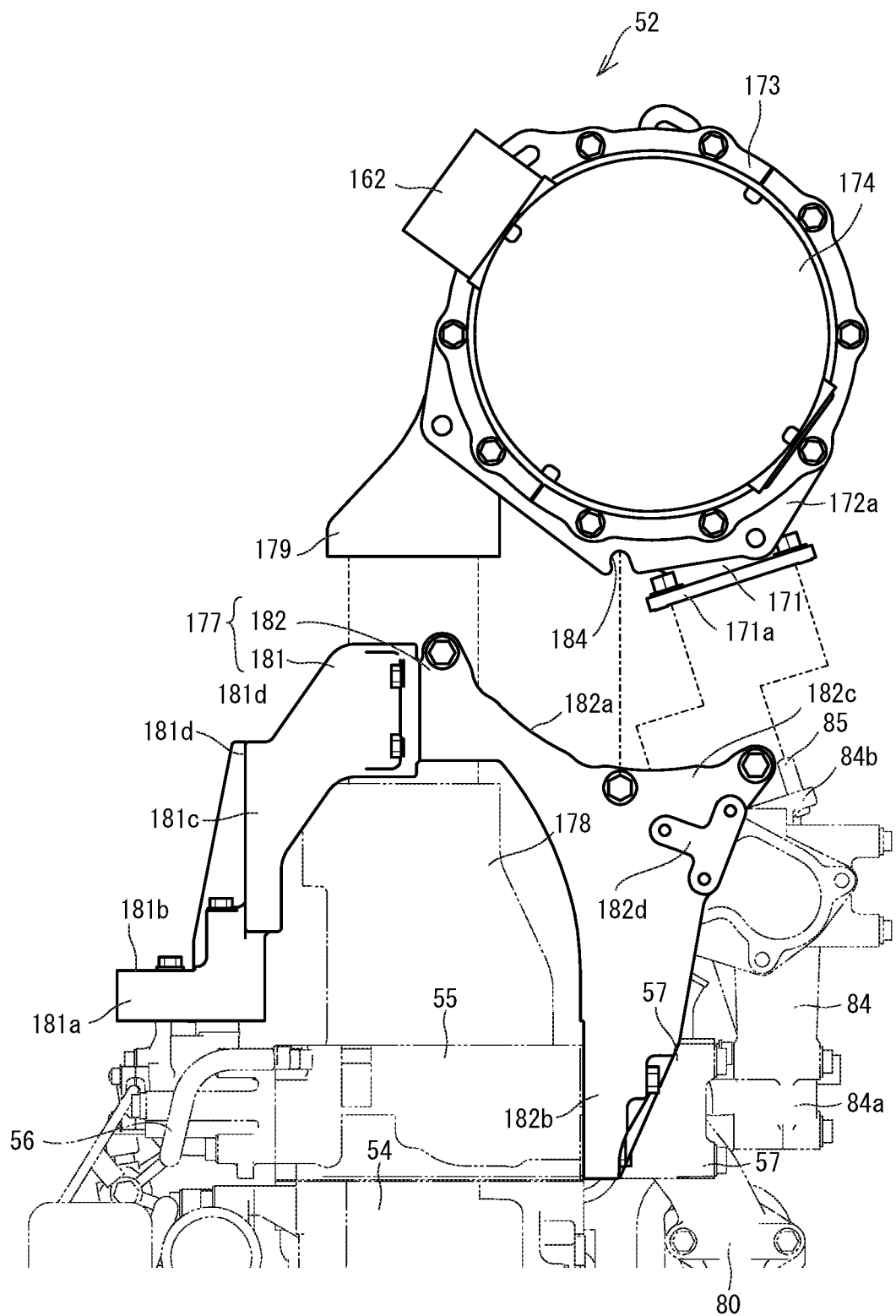
FIG. 16 is a front view of the DPF and one of the support brackets illustrating the relationship between the DPF and the support bracket.

As illustrated in FIGS. 12, 14, and 16, the outlet side first bracket 181 includes a proximal end 181a. The proximal end 181a includes a plurality of vertical through holes. The mounting bolts that are to be screwed to bolt holes provided in the upper surface of the intake manifold 56 are inserted in the through holes. The proximal end 181a of the outlet side first bracket 181 includes, for example, a proximal end component coupling portion (third component coupling portion) 181b. The proximal end component coupling portion 181b secures a component securing bracket (compressor securing bracket) 212 (see FIGS. 28 and 33) for securing an external component such as an air conditioner compressor 211 (see FIGS. 28 and 33). The proximal end component coupling portion 181b includes some of the through holes for receiving the mounting bolts and bolt holes for threadedly receiving mounting bolts to fasten the component securing bracket 212. That is, the component securing bracket 212 is fastened to the outlet side first bracket 181 with the mounting bolts and simultaneously fastened to the intake manifold 56 together with the outlet side first bracket 181 by the mounting bolts screwed to the through holes of the proximal end component coupling portion 181b.

The outlet side first bracket 181 includes a bent portion (middle portion) 181c. The upper surface of the bent portion 181c includes, for example, a middle component coupling portion (fourth component coupling portion) 181d. The middle component coupling portion 181d secures a component securing bracket (warm water pipe securing bracket) 208 (see FIGS. 30, 32, and 33) for securing external components such as air conditioner warm water pipes 203, 204 (see FIGS. 30, 32, and 33). In this embodiment, the bent portion 181c of the outlet side first bracket 181 includes a flat step. The middle component coupling portion 181d is provided on the upper surface of the step. The middle component coupling portion 181d includes bolt holes for threadedly receiving mounting bolts for fastening the component securing bracket 208.

As illustrated in FIGS. 12, 14, and 16, the outlet side second bracket 182 includes a proximal end 182b. The proximal end 182b includes a plurality of through holes extending in the left and right direction for receiving mounting bolts that are to be screwed to the bolt holes provided on the left side of the intake manifold 56. The outlet side second bracket 182 includes a bent portion (middle portion) 182c. The bent portion 182c includes a rear component coupling portion (fifth component coupling portion) 182d. The rear component coupling portion 182d includes bolt holes on the rear surface. A hanging fixture 87 is detachably bolted to the rear component coupling portion 182d. After the diesel engine 5 is mounted on the work vehicle, the hanging fixture 87 is removed. In this case, for example, a component fixture (shield securing bracket) 207 (see FIGS. 26 and 33) for supporting an upstream relay pipe 223 and a shield 206 (see FIGS. 22 and 26), which will be described later, is bolted to the rear component coupling portion 182d. The outlet side second bracket 182 includes the upper end curved surface (U-shaped pressure-receiving surface) 182a at the upper end portion extending from the bent portion 182c toward the right side distal end. The upper end curved surface 182a corresponds to the outline of the gas purification housing 168.

Figure 17:
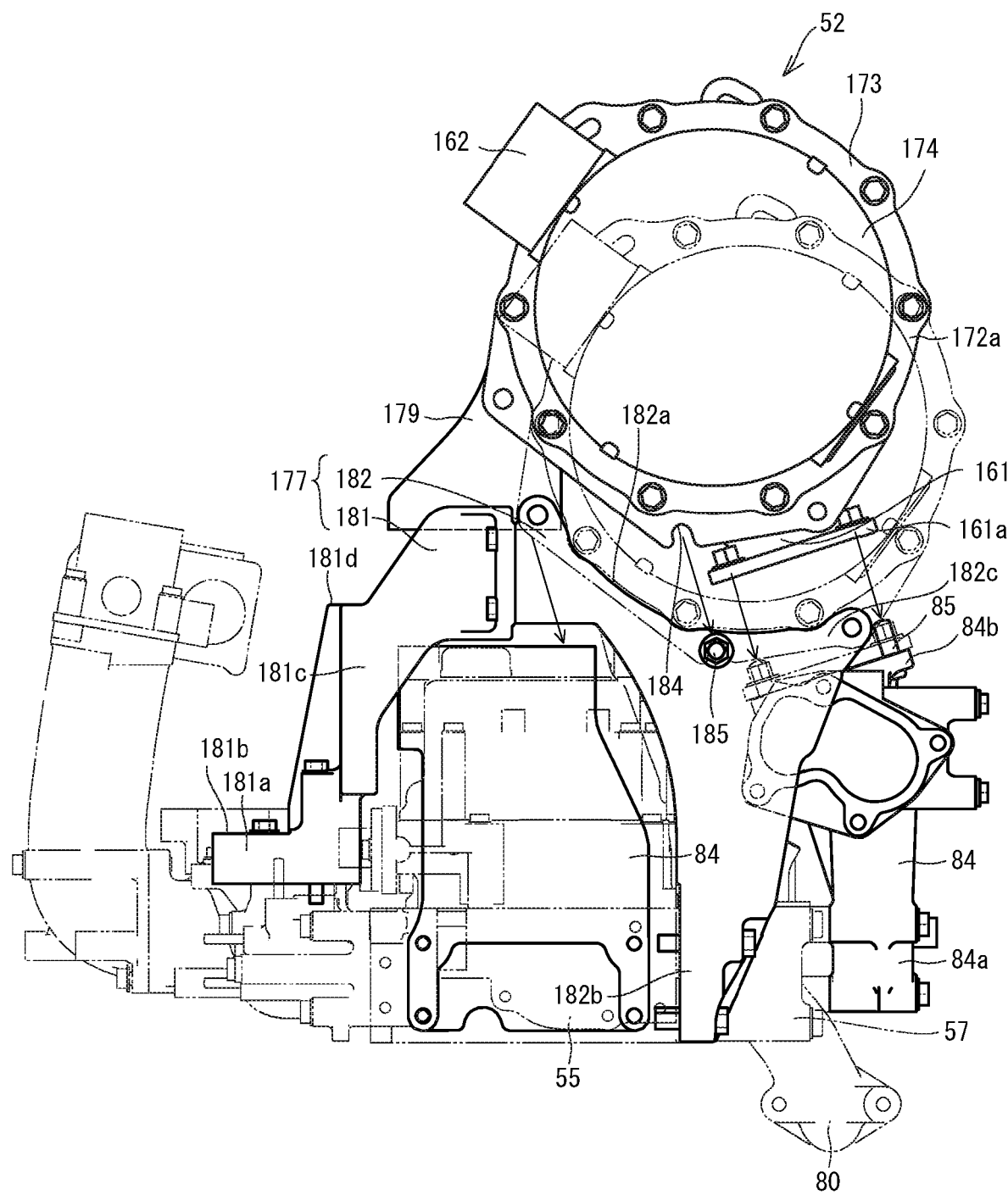
FIG. 17 illustrates how the DPF is secured.
Figure 18:
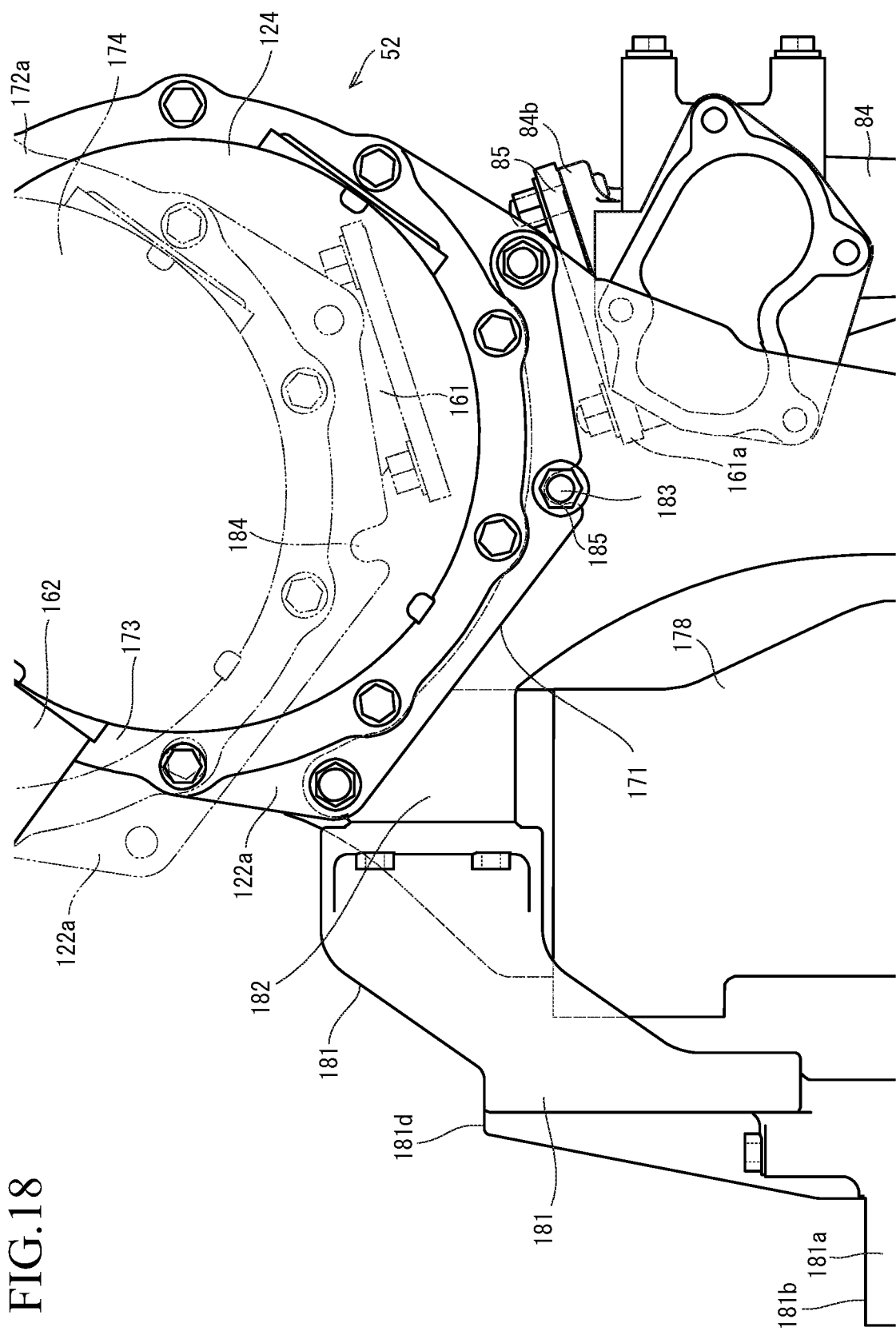
FIG. 18 is an enlarged diagram illustrating how the DPF is secured.

As illustrated in FIGS. 16 to 18, an engagement shaft (projection), which is an embedded bolt 183 in this embodiment, is provided at the upper end central portion of the outlet side second bracket 182. The embedded bolt 183 projects forward from the front surface of the upper end central portion of the outlet side second bracket 182. The bracket fastening portion 172a of the outlet sandwich flange 172 of the gas purification housing 168 includes an engagement shaft (recess), which is a downward-opening bolt insertion notch 184 in this embodiment. That is, a bolt hole for receiving the embedded bolt 183 is notched in the bracket fastening portion 172a of the outlet sandwich flange 172 in such a manner as to open upward. This forms the bolt insertion notch 184.

The embedded bolt 183 of the outlet side second bracket 182 is configured to be engageable with the bolt insertion notch 184 in the bracket fastening portion 172a of the outlet sandwich flange 172. The downstream side of the gas purification housing 168 in the exhaust gas moving direction (exhaust discharge side) is placed on the upper end of the outlet side second bracket 182, and the bolt insertion notch 184 is engaged with the embedded bolt 183 so that the downstream side of the gas purification housing 168 in the exhaust gas moving direction (exhaust discharge side) is supported by the outlet side second bracket 182.

The engagement of the embedded bolt 183 with the bolt insertion notch 184 holds the exhaust discharge side of the gas purification housing 168 at a predetermined position. That is, in addition to placing the relay bracket 179, which is secured to the gas purification housing 168 via the extended bracket 180, on the upper end of the securing bracket 178 and placing the exhaust introduction end of the exhaust gas inlet pipe 161 on the upper end (exhaust discharge end) of the exhaust connecting pipe 84, the bolt insertion notch 184 of the gas purification housing 168 is engaged with the embedded bolt 183 of the outlet side second bracket 182 so that the gas purification housing 168 is temporarily fixed on the inlet side bracket 176 and the outlet side bracket 177.

Thus, the mounting position of the exhaust gas purification device 52 with respect to the diesel engine 5 is easily determined, and an operator who performs a mounting operation can take hands off the exhaust gas purification device 52 in the temporarily fixed state. It is therefore unnecessary to perform the mounting operation such as fastening bolts and a removing operation while supporting the entire weight of the exhaust gas purification device 52. This significantly reduces trouble in mounting and removing the exhaust gas purification device 52 and in assembly and disassembly of the exhaust gas purification device 52.

Subsequently, with the bolt insertion notch 184 engaged with the embedded bolt 183, an engagement nut 185 is screwed to the embedded bolt 183 (perform additional tightening) so that the bracket fastening portion 172a of the outlet sandwich flange 172 of the gas purification housing 168 is coupled to the upper end central portion of the outlet side second bracket 182. Unlike this embodiment, the embedded bolt 183 may be provided on the gas purification housing 168, and the bolt insertion notch 184 may be provided on the outlet side second bracket 182.

Since one of the outlet side bracket 177 and the gas purification housing 168 includes a projection (embedded bolt 183) or a recess (bolt insertion notch 184), and the other one of the outlet side bracket 177 and the gas purification housing 168 includes the recess (bolt insertion notch 184) or the projection (embedded bolt 183), the mounting position of the gas purification housing 168 is easily determined by the engagement of the embedded bolt 183 (projection) and the bolt insertion notch 184 (recess). The projection and the recess are engagement bodies. It is therefore unnecessary to perform the mounting operation such as fastening bolts while supporting the entire weight of the DPF 52, and the operator can take hands off the DPF 52 while performing the mounting operation. This improves workability in assembly and disassembly of the DPF 52.

Furthermore, as illustrated in FIGS. 17 and 18, the opening direction of the bolt insertion notch 184 matches with a direction in which the inlet flange 161a of the exhaust gas inlet pipe 161 of the DPF 52 is mounted onto the upward-facing mounting surface 84b of the exhaust connecting pipe 84. That is, the bolt insertion notch 184 is open in a direction parallel to the inclination direction of the embedded bolts 85, which are provided on the upward-facing mounting surface 84b of the exhaust connecting pipe 84. Thus, when the DPF 52 is secured to the exhaust connecting pipe 84, the inlet side bracket 176, and the outlet side bracket 177 to be supported by the exhaust connecting pipe 84, the inlet side bracket 176, and the outlet side bracket 177, the bolt insertion notch 184 is easily engaged with the embedded bolt 183 while fitting the position adjusting bolt holes of the inlet flange 161a of the exhaust gas inlet pipe 161 to the embedded bolts 85. This further improves workability in assembly and disassembly of the DPF 52.

When the DPF 52 is temporarily supported with the bolt insertion notch 184 being engaged with the embedded bolt 183, the upward-facing mounting surface 84b of the exhaust connecting pipe 84 receives the exhaust gas inlet pipe 61, the bracket coupling portion 178b of the securing bracket 178 receives the relay bracket 179, and the upper end curved surface 182a of the outlet side second bracket 182 receives the outer circumferential surface of the gas purification housing 168. Since the temporarily fixed DPF 52 is temporarily supported by the exhaust connecting pipe 84, the securing bracket 178, and the outlet side second bracket 182 in a stable manner, the operator can take hands off the DPF 52 in this state.

On the exhaust gas inlet side of the DPF 52, the upward-facing mounting surface 84b of the exhaust connecting pipe 84 and the coupling plate 179b of the relay bracket 179 further form a V-shaped pressure-receiving surface. The exhaust gas outlet side of the DPF 52 is placed on the upper end curved surface 182a of the outlet side second bracket 182. Thus, when the DPF 52 is temporarily supported on the exhaust connecting pipe 84, the inlet side bracket 176, and the outlet side bracket 177, the exhaust gas inlet side and the exhaust gas outlet side of the DPF 52 are restricted from moving in a direction intersecting the output shaft 53 of the engine 5 by the V-shaped pressure-receiving surface and the U-shaped pressure surface. This configuration prevents the DPF 52 from falling off.

As illustrated in FIGS. 7 to 11, hanging fixtures 86, 87 are coupled to the inlet side bracket 176 and the outlet side bracket 177. The hanging fixtures 86, 87 are used for attaching, for example, hanging wires. Thus, when the diesel engine 5 is unloaded to the work vehicle, hanging wires respectively inserted in hanging through holes of the hanging fixtures 86, 87 are engaged with, for example, a hook of a chain block to lift the diesel engine 5 so that mounting and removing operation of the diesel engine 5 can be performed.

The hanging fixture 86 is coupled to the securing bracket 178 of the inlet side bracket 176, which is located on the rear right of the diesel engine 5, and the hanging fixture 87 is coupled to the outlet side second bracket 182 of the outlet side bracket 177, which is located on the front left of the diesel engine 5. That is, since the hanging fixtures 86, 87 are arranged diagonally opposite to each other with respect to the diesel engine 5, the diesel engine 5 is hung by, for example, the chain block in a stable position. Furthermore, since the hanging fixtures 86, 87 are attachable and detachable, the hanging fixtures 86, 87 can be removed when the diesel engine 5 is mounted on the work vehicle. This configuration reduces the space occupied by the diesel engine 5 in the engine compartment of the work vehicle.

Next, a configuration in which the diesel engine 5 is mounted on the work vehicle, which is a tractor 1 in this embodiment, will be described with reference to FIGS. 19 to 33. A traveling body 2 of the tractor 1 according to this embodiment is supported by traveling sections, which are a pair of left and right front wheels 3 and a pair of left and right rear wheels 4 in this embodiment. The rear wheels 4 and the front wheels 3 are driven by a power source mounted on the front section of the traveling body 2. The power source is the common rail diesel engine 5 (hereinafter, simply referred to as the engine) in this embodiment. The tractor 1 travels forward and backward by driving the rear wheels 4 and the front wheels 3. The engine 5 is covered with a hood 6. A cabin 7 is provided on the upper surface of the traveling body 2. An operator's seat 8 and a steering wheel (round steering wheel) 9 are located inside the cabin 7. The steering wheel 9 is steered to move the steering direction of the front wheels 3 to left and right. A step 10 is provided on the lower section outside the cabin 7. The step 10 is used by an operator to get on and off. The fuel tank 11, which supplies fuel to the engine 5, is provided below the bottom portion of the cabin 7.

The traveling body 2 includes the engine frames (front frames) 14, which include a front bumper (frame coupling member) 12 and front axle cases 13, and left and right body frames (rear frames) 15. The left and right body frames 15 are detachably secured to the rear portions of the engine frames 14. A front axle 16 rotationally projects outward from the left side of the left front axle case 13 and from the right side of the right front axle case 13. The front wheels 3 are secured to the left side of the left front axle case 13 and the right side of the right front axle case 13 via the front axle 16. A transmission case 17 is coupled to the rear portion of the body frame 15. The transmission case 17 changes speed of rotational power from the engine 5 as required and transmits the rotational power to the four front and rear wheels 3, 3, 4, 4. A tank frame 18 is bolted to the left and right body frames 15 and the bottom surface of the transmission case 17. The tank frame 18 is a rectangular frame plate as viewed from the bottom and bulges outward in the left and right direction. The fuel tank 11 of this embodiment is separated into two left and right parts. The left and right parts of the fuel tank 11 are distributed on the upper surface of the left and right bulging sections of the tank frame 18. Left and right rear axle cases 19 are mounted on the left and right external side surfaces of the transmission case 17 to project outward. Left and right rear axles 20 are rotationally inserted in the left and right rear axle cases 19. The rear wheels 4 are secured to the transmission case 17 via the rear axles 20. The upper sections of the left and right rear wheels 4 are covered with left and right rear fenders 21.

A hydraulic lifting and lowering mechanism 22 is detachably secured to, for example, the rear upper surface of the transmission case 17. The hydraulic lifting and lowering mechanism 22 lifts and lowers a farm implement such as a rotary tiller. The farm implement, such as a rotary tiller, is coupled to the rear portion of the transmission case 17 via a three point link mechanism including a pair of left and right lower links 23 and a top link 24. A power take-off (PTO) shaft 25 projects rearward from the rear side of the transmission case 17. The PTO shaft 25 transmits PTO drive power to the farm implement, such as a rotary tiller.

The flywheel 61 is directly coupled to the engine output shaft 53, which projects rearward from the rear side of the engine 5. A main drive axle 27 and a main transmission input shaft 28 are coupled with each other via a power transmission shaft 29. The main drive axle 27 projects rearward from the flywheel 61. The main transmission input shaft 28 projects forward from the front side of the transmission case 17. The power transmission shaft 29 includes universal couplings on both ends. A hydraulic continuously variable transmission, a steering reverser, a traveling sub-transmission gear mechanism, and a rear wheel differential gear mechanism are located in the transmission case 17. Rotational power of the engine 5 is transmitted through the main drive axle 27 and the power transmission shaft 29 to the main transmission input shaft 28 in the transmission case 17. The rotational speed of the rotational power is changed by the hydraulic continuously variable transmission and the traveling sub-transmission gear mechanism. The speed-changed power is transmitted to the left and right rear wheels 4 via the rear wheel differential gear mechanism.

Front wheel output shafts 30 project forward from the lower part of the front surface of the transmission case 17. A front wheel transmission shaft (not shown) projects rearward from each front axle case 13, which embeds a front wheel differential gear mechanism (not shown). The front wheel transmission shafts are coupled to the front wheel output shafts 30 via front wheel drive shafts 31. The speed-changed power changed by the hydraulic continuously variable transmission and the traveling sub-transmission gear mechanism in the transmission case 17 is transmitted from the front wheel output shafts 30, the front wheel drive shafts 31, and the front wheel transmission shafts via the front wheel differential gear mechanisms in the front axle cases 13 to the left and right front wheels 3.

The turbocharger 81 of the engine 5 includes the compressor case 83, which embeds the blower wheel. The intake-air introduction side of the compressor case 83 is coupled to the intake-air discharge side of the air cleaner 221 via the supply pipe 222, and the intake-air discharge side of the compressor case 83 is coupled to the upstream relay pipe 223. The turbocharger 81 includes the turbine case 82, which embeds the turbine wheel. The exhaust introduction side of the turbine case 82 is coupled to the exhaust gas outlet of the exhaust manifold 57, and the intake-air discharge side of the turbine case 82 is coupled to the exhaust gas inlet of the after-treatment device, which is the exhaust gas purification device 52 in this embodiment.

The EGR cooler 80 and the EGR apparatus 75, which are distributed on both sides of the engine 5, are coupled to each other by the recirculation exhaust gas pipe 78. The recirculation exhaust gas pipe 78 is a circulation passage that detours around the rear surface of the engine 5 (close to the flywheel 61). The EGR apparatus 75 is coupled to the downstream relay pipe 225, which extends forward (toward the cooling fan 59) on the right side of the engine 5. The upstream relay pipe 223 and the downstream relay pipe 225 are distributed on both sides of the engine 5 and extend toward the front upper section of the engine 5 to be coupled to the intercooler 224, which is located on a frame 226 at the front of the engine 5. The air cleaner 221 is located on the upper section of the front surface of the frame 226. The supply pipe 222, which is coupled to the air cleaner 221, extends over the frame 226 toward the rear section on the left side of the engine 5.

With the above-described configuration, dust is removed from the fresh air (external air) taken into the air cleaner 221 to purify the fresh air, and the fresh air is then drawn into the compressor case 83 of the turbocharger 81 via the supply pipe 222. The pressurized fresh air that has been compressed in the compressor case 83 of the turbocharger 81 is supplied to the EGR body case of the EGR apparatus 75 via the relay pipes 223, 225 and the intercooler 224. Some of the exhaust gas (EGR gas) from the exhaust manifold 57 is cooled by the EGR cooler 80, and the cooled EGR gas is then supplied to the EGR body case of the EGR apparatus 85 via the recirculation exhaust gas pipe 78.

The exhaust gas purification device 52 includes the exhaust gas inlet pipe 161 on the case outer circumferential surface at one end (rear end) of the exhaust gas purification device 52 in the longitudinal direction. The exhaust gas inlet pipe 161 communicates with the exhaust gas discharge side of the turbine case 82 in the turbocharger 81 via the exhaust connecting pipe 84. The exhaust gas purification device 52 includes the exhaust gas outlet pipe 162 on the case outer circumferential surface at the other end (front end) of the exhaust gas purification device 52 in the longitudinal direction. The exhaust gas outlet pipe 162 is coupled to the exhaust pipe 227. In the exhaust gas purification device 52, the exhaust gas inlet pipe 161 is open downward to the left, and the exhaust gas outlet pipe 162 is open upward to the right. The exhaust pipe 227 is located to extend over the engine 5 from the front left side toward the rear right side of the diesel engine 5. The exhaust pipe 227 is located between the exhaust gas purification device 52 and the downstream relay pipe 225 to be approximately parallel to the exhaust gas purification device 52 and the downstream relay pipe 225.

The exhaust gas purification device 52 and the exhaust pipe 227 are arranged above the engine 5 next to each other in the left and right direction to be parallel to the output shaft of the engine 5. That is, the exhaust gas purification device 52 and the exhaust pipe 227 are arranged next to each other such that the exhaust gas purification device 52 covers the left section of the upper surface of the engine 5, and the exhaust pipe 227 covers the right section of the upper surface of the diesel engine 5. The downstream relay pipe 225, which connects the intercooler 224 and the intake connecting pipe 84, is located further rightward of the exhaust pipe 227. This configuration prevents the exhaust gas purification device 52 that is heated to a high temperature from thermally affecting the downstream relay pipe 225.

The exhaust pipe 227, which is coupled to the exhaust side of the exhaust gas purification device 52, is inserted in the exhaust gas inlet port of the tailpipe 229 on the rear right side of the diesel engine 5. The tailpipe 229 is located on the front right side of the cabin 7 and extends toward the exhaust gas discharge side from below upward. The tail pipe 229 is bent toward the diesel engine 5 below the cabin 7 so that the tail pipe 229 has a J-shape. The exhaust pipe 227 also includes an umbrella-like upper surface cover 228 on the outer circumferential surface above the section at which the exhaust pipe 227 is inserted in the tailpipe 229. The upper surface cover 228 is secured to the outer circumferential surface of the exhaust pipe 227 to extend in a radial pattern. The upper surface cover 228 covers the exhaust gas inlet port of the tailpipe 229 and prevents dust and rain water from entering the tailpipe 229.

The tailpipe 229 is formed such that the lower bent portion extends over the body frame 15 from the inner side to the outer side. The tailpipe 229 includes an exhaust gas inlet port provided on the inner side of the body frame 15 at an upper section, and the exhaust gas discharge port of the exhaust pipe 227 is inserted in the exhaust gas inlet port. That is, the coupling portion between the tailpipe 229 and the exhaust pipe 227 has a two-layer pipe structure. When exhaust gas flows from the exhaust pipe 227 to the tailpipe 229, outside air is simultaneously allowed to flow into the tailpipe 229 through the space between the exhaust pipe 227 and the tailpipe 229. This configuration cools the exhaust gas that flows in the tailpipe 229. Furthermore, the tailpipe 229 is configured to be covered with a heat insulator 230. Engine covers 232 are located below the hood 6 on the left and right sides to cover the left and right sides of the engine compartment. The engine covers 232 are made of perforated plates.

Next, a configuration of the engine compartment frame below the hood 6 will be described with reference to FIGS. 20 to 24. The hood 6 includes a front grille 231 at the front lower section to cover the front of the engine compartment. The engine covers 232 are formed of perforated plates and are located below the hood 6 on the left and right side to cover the left and right side of the engine compartment. That is, the hood 6 and the engine covers 232 cover the front, the upper section, and the left and right sides of the diesel engine 5.

The front end inner surfaces of the pair of left and right engine frames (front frames) 14 are coupled to the left and right outer surfaces of the frame coupling member 12. The frame coupling member 12 is formed of a rectangular metal casting. The diesel engine 5 is supported on the engine frames 14, which are held by the frame coupling member 12. A frame bottom plate 233 is held by the upper edges of the left and right engine frames 14 and the upper surface of the front bumper 12 to cover the front end upper sections of the engine frames 14. The radiator 235 stands upright on the frame bottom plate 233 to be located in front of the engine 5. A fan shroud 234 is secured to the rear surface of the radiator 235. The fan shroud 234 surrounds the outer circumference of the cooling fan 59 and connects the radiator 235 to the cooling fan 59.

The radiator 235 includes a coolant discharge port at the upper section and a coolant introduction port at the lower section. The coolant discharge port of the radiator 235 communicates with the coolant introduction port of the thermostat case 70 via a coolant supply pipe 201. The coolant introduction port of the radiator 235 communicates with a coolant discharge port of the coolant pump 71 via a coolant return pipe 202. The coolant in the radiator 235 is supplied to the coolant pump 71 via the coolant supply pipe 201 and the thermostat case 70. When the coolant pump 71 is driven, the coolant is supplied to the water-cooling jacket (not shown), which is formed in the cylinder block 54 and the cylinder head 55, to cool the engine 5. The coolant that has contributed to cooling the engine 5 is returned to the radiator 235 via the coolant return pipe 202.

The thermostat case 70 is also coupled to the warm water pipe 203, and the coolant pump 71 is also coupled to the warm water pipe 204. The coolant (warm water) that has contributed to cooling the engine 5 is circulated to an air conditioner (not shown) of the cabin 7. Thus, warm water circulates in the air conditioner (not shown) of the cabin 7, and the air conditioner (not shown) supplies warm air into the cabin 7. This configuration allows an operator to adjust the temperature in the cabin 7 to a desired temperature.

The front end of each of the left and right body frames 15 is coupled to the rear end of the corresponding one of the left and right engine frames 14 via a spacer 297. The left and right body frames 15 are located to sandwich the left and right engine frames 14. The sections of the pair of left and right body frames 15 located below the front section of the floor plate 41 are coupled to each other by a support beam frame 236. The coupling surface (outer side) between each body frame 15 and the support beam frame 236 is flush with the coupling surface (outer side) between each spacer 297 and the associated body frame 15. The support beam frame 236 is bolted to the left and right body frames 15 to hold the left and right body frames 15. An engine support frame 237 is mounted on the upper surface of the support beam frame 236. The lower end surface of the engine support frame 237 is bolted to the upper surface of the support beam frame 236 so that the engine support frame 237 surrounds the flywheel 61 of the diesel engine 5 together with the support beam frame 236.

The engine mount fittings 74, which are provided on left and right lower sides of the diesel engine 5, are coupled to engine support brackets 298 via the engine mounts 238. The engine support brackets 298 are located at the middle of the pair of left and right engine frames 14. The engine mounts 238 each include an anti-vibration rubber 239. Engine mount fittings 60a are provided on the upper section of the flywheel housing 60, which is located on the rear surface of the diesel engine 5. The engine mount fittings 60a are coupled to the upper surface of the engine support frame 237 via an engine mount 240. The engine mount 240 includes anti-vibration rubbers 241.

The engine mounts 238 are bolted to the upper sections of the engine support brackets 298, which are coupled to the outer side at the middle of the pair of left and right engine frames 14, with the anti-vibration rubbers 239 located on the lower side. The diesel engine 5 is sandwiched between the engine frames 14 with the pair of left and right engine mounts 238 so that the front section of the diesel engine 5 is supported. The rear surface of the diesel engine 5 is coupled to the front ends of the pair of left and right body frames 15 via the support beam frame 236, the engine support frame 237, and the engine mount 240 so that the rear section of the diesel engine 5 is supported by the front ends of the body frames 15. The left and right front anti-vibration rubbers 239 and the left and right rear anti-vibration rubbers 241 support the diesel engine 5 on the traveling body 2.

A pair of left and right support column frames 242, 243 extend upright from the upper surface of the engine support frame 237 to sandwich the engine mount 240 from left and right sides. A hood shield 244 covers the rear of the hood 6. The hood shield 244 is coupled to the pair of left and right support column frames 242, 243 such that the lower edge of the hood shield 244 is separate from the upper surface of the engine mount 240. Beam frames 248 are held between the upper sections of the fan shroud 234 and the hood shield 244. Since the fan shroud 234 and the hood shield 244, which are stably supported by the traveling body 2, are coupled to each other by the pair of beam frames 248, which are held between the fan shroud 234 and the hood shield 244, these members integrally configure a sturdy engine compartment frame as a whole.

The exhaust gas purification device 52, which is mounted on the upper section of the engine 5, is located inside the rear section of the hood 6. A heat insulator 250 is located between the hood 6 and the exhaust gas purification device 52. Since the heat insulator 250 is located above the exhaust gas purification device 52, the temperature of the hood 6 is prevented from being increased by exhaust heat generated by the exhaust gas purification device 52 and the diesel engine 5. A space is formed between the hood 6 and the heat insulator 250 to insulate the inside of the engine compartment below the heat insulator 250 from the heat of the outside air. This configuration allows the exhaust gas purification device 52 to be operated under a high-temperature environment.

Furthermore, the hood shield 244, which is located on the rear side of the hood 6 and covers at least the exhaust gas purification device 52 from the rear surface, is provided in addition to the above-described heat insulator 250. Since heat in the engine compartment below the hood 6 is insulated by the hood shield 244 together with the heat insulator 250, the temperature inside the cabin 7 is prevented from being increased by the exhaust heat from the engine compartment. Also, a gap between the hood shield 244 and the heat insulator 250 makes it unlikely that heat is kept in the engine compartment below the hood 6. This inhibits heat damage on, for example, the exhaust gas purification device 52 itself and the hood 6.

Extendable gas springs (hood dampers) 256, 256 are located on the left and right sides of the heat insulator 250 below the hood 6. One end (rear end) of each of the pair of left and right gas springs 256, 256 is pivotally attached to the engine compartment frame, and the other end (front end) of each of the gas springs 256, 256 is pivotally attached to the inner surface of the upper section of the hood 6. The hood 6 is held in an open position by the tension of the gas springs 256. Thus, when the front portion of the hood 6 is lifted to open the hood 6 with the upper end position of the hood shield 244 serving as a shaft fulcrum, the gas springs 256 keep the hood 6 in the open state. In this state, maintenance of the diesel engine 5 can be performed.

Figure 23:
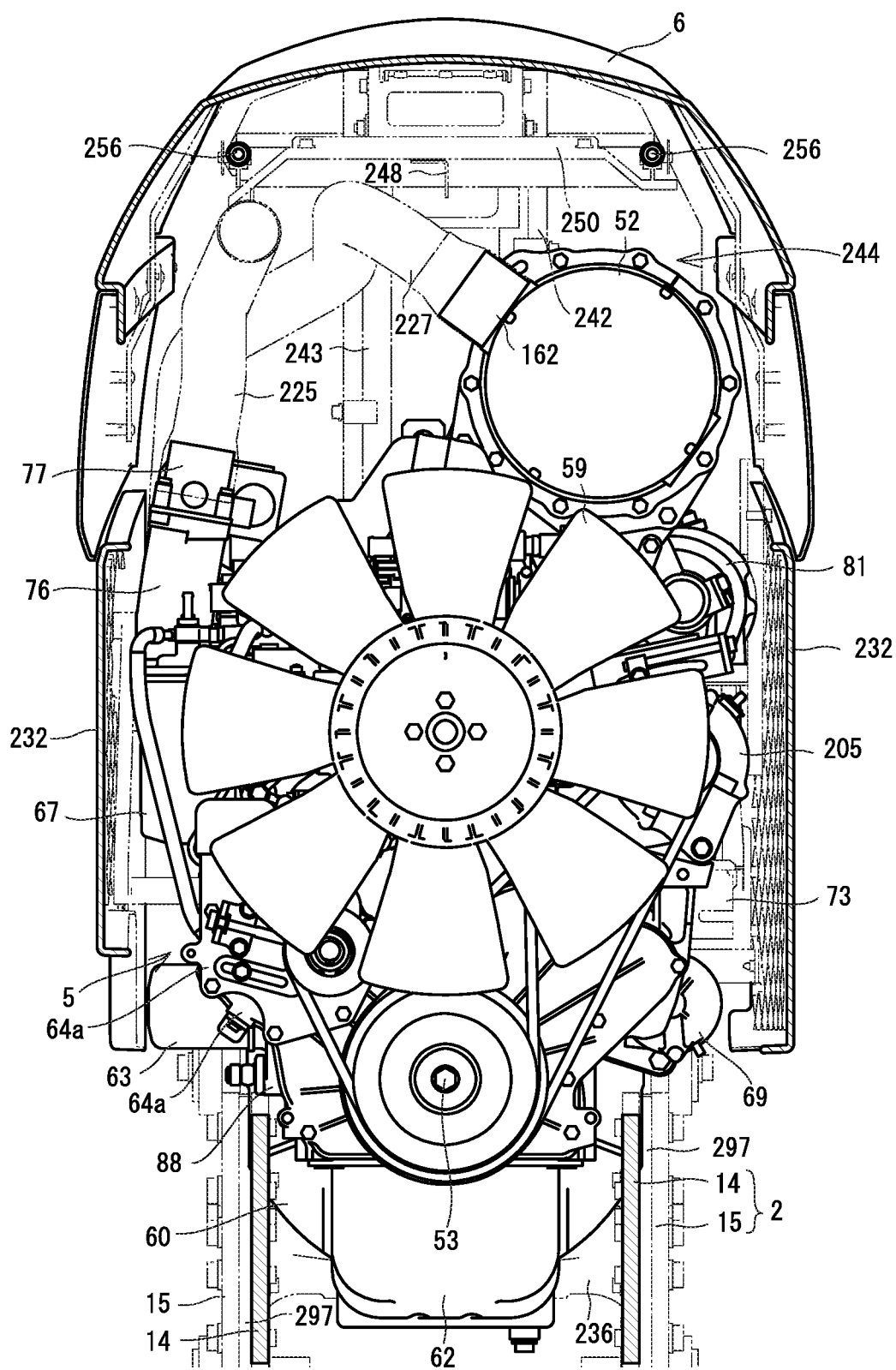
FIG. 23 is a cross-sectional view of the work vehicle illustrating the configuration in the engine compartment as viewed from the front of the engine.
Figure 24:
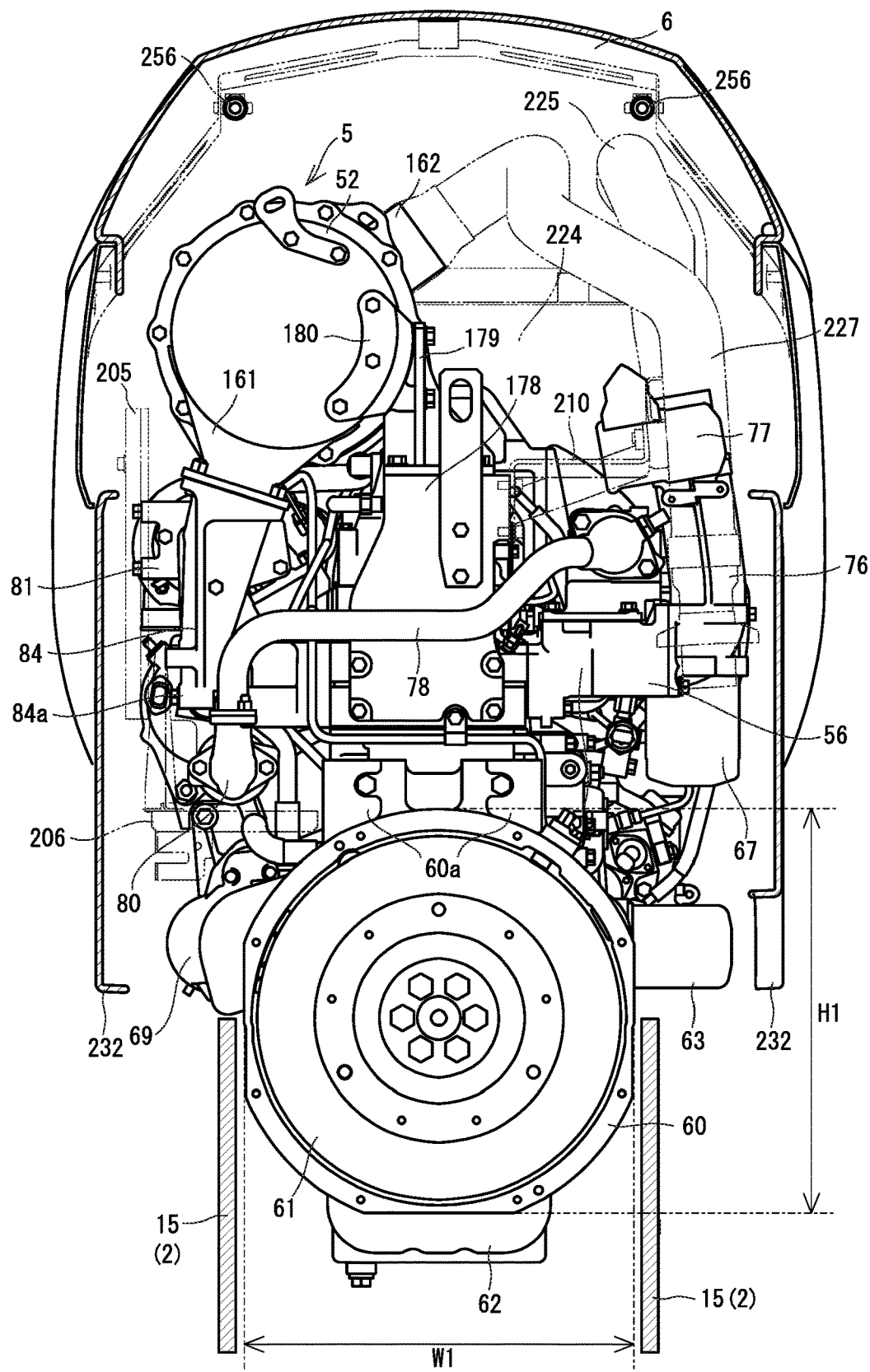
FIG. 24 is a cross-sectional view of the work vehicle illustrating the configuration in the engine compartment as viewed from the rear of the engine.
Figure 25:
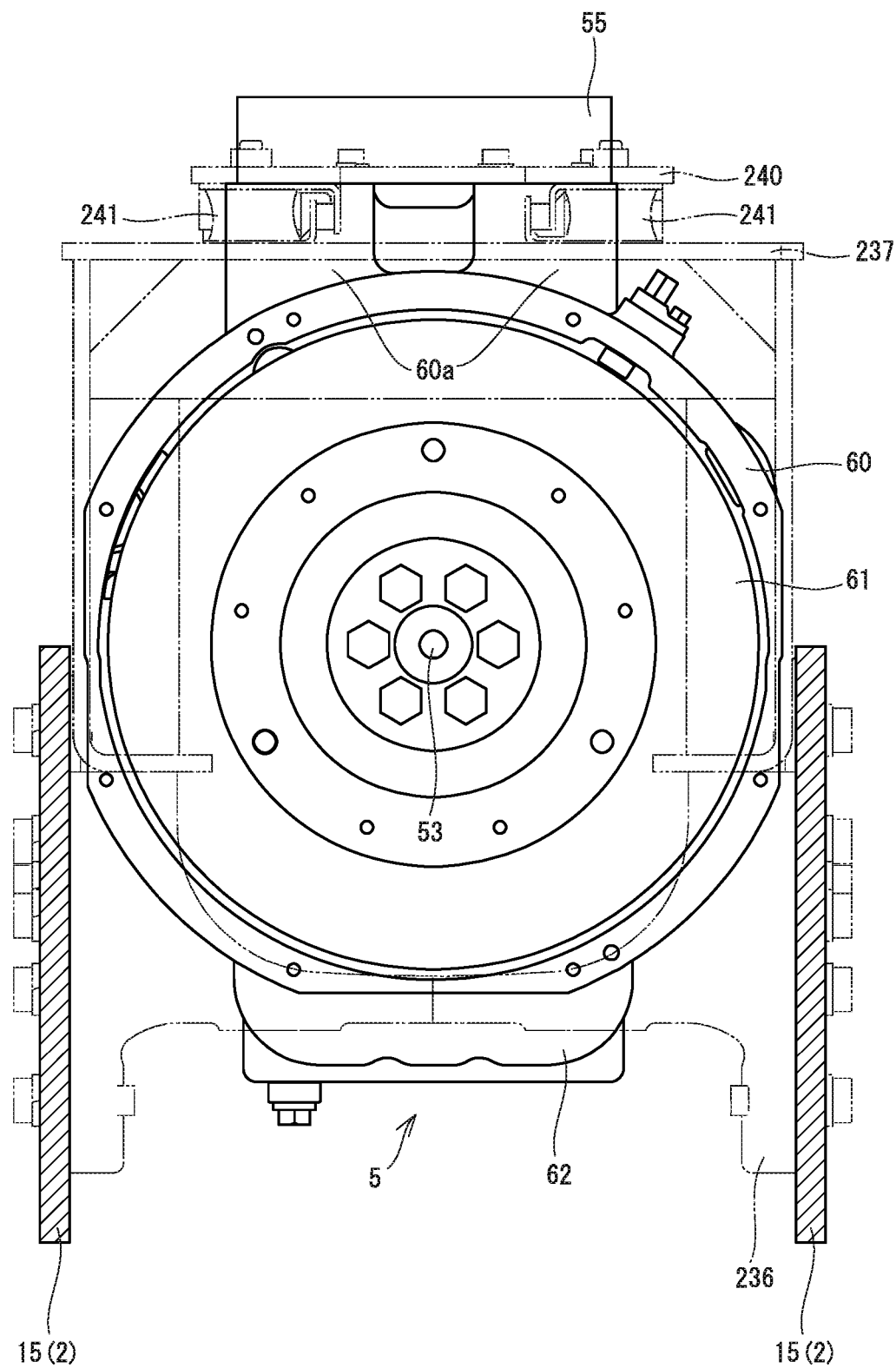
FIG. 25 is a partially enlarged view of the work vehicle illustrating the relationship between the traveling body and the flywheel housing.

As illustrated in FIGS. 23 to 25, the hood 6 of the tractor 1 has an inverted U-shaped cross-section. Since the left and right corners of the hood 6 are chamfered to incline diagonally and outwardly downward to the left and right as viewed from the front, the forward view of the operator seated in the operator's seat 8, in particular, the view ahead of the left and right of the hood 6 is improved. While the exhaust gas purification device (DPF) 52 and the exhaust connecting pipe 84 oppose the left side inner wall of the hood 6, the intake connecting pipe 76 opposes the right side inner wall of the hood 6. While the exhaust connecting pipe 84 is located at a position facing the left side engine cover 232, the exhaust connecting pipe 84 is located at a position facing the right side engine cover 232.

As illustrated in FIGS. 23 and 24, the intake connecting pipe 76, which includes a hollow portion and supplies fresh air to the intake manifold 56, is configured to be tilted toward the cylinder head 55 as the intake connecting pipe 76 extends upward. The intake connecting pipe 76 extends upward from the intake manifold 56. That is, a fresh air introduction port located at the upper end of the intake connecting pipe 76 is offset with respect to a fresh air discharge port located at the lower end of the intake connecting pipe 76 toward the output shaft 53 of the engine 5 (center position of the engine 5). The intake connecting pipe 76 is arranged to be in conformance with the shape of the hood 6 that narrows upward, and the intake throttle member 77 is located closer to the center position of the hood 6 than the intake connecting pipe 76 between the upper section of the engine 5 and the inner surface of the hood 6. This configuration not only reduces the designed length of the downstream relay pipe 225, which connects a fresh air discharge end of the intercooler 224 to the intake throttle member 77, but also allows the downstream relay pipe 225 to be compactly accommodated in the hood 6, which has an upwardly decreasing lateral width.

As illustrated in FIGS. 23 and 24, the exhaust connecting pipe 84, which includes a hollow portion that supplies exhaust gas from the exhaust manifold 57 to the exhaust gas purification device 52, is configured to be tilted toward the cylinder head 55 as the exhaust connecting pipe 84 extends upward. The exhaust connecting pipe 84 is coupled to the exhaust gas inlet pipe 161 of the exhaust gas purification device 52 to support the exhaust gas purification device 52. That is, the exhaust gas discharge port at the upper end of the exhaust connecting pipe 84 is offset toward the output shaft 53 of the engine 5 (center position of the engine 5) with respect to the coupling support portion 84a at the lower end of the exhaust connecting pipe 84. The coupling support portion 84a is coupled to the exhaust manifold 57 at the lower end. The exhaust gas inlet pipe 161 of the exhaust gas purification device 52 is tilted toward the outer side of the engine 5 (toward the inner wall of the hood 6) as the exhaust gas inlet pipe 161 extends downward (toward the inlet flange 161a).

The exhaust gas purification device 52 and the exhaust connecting pipe 84 are arranged to be in conformance with the shape of the hood 6 that narrows upward, and the exhaust gas purification device 52 is supported at a position closer to the center of the engine 5 between the upper section of the engine 5 and the inner surface of the hood 6. Thus, the exhaust gas purification device 52 is compactly accommodated in the hood 6, which has an upwardly decreasing lateral width. Supporting the exhaust gas purification device 52, which is a heavy object, at a position closer to the center of gravity of the engine 5 inhibits increase in, for example, vibration and noise of the engine 5 caused by mounting the exhaust gas purification device 52. This configuration also reduces influence on the shape of the hood 6 caused by mounting the exhaust gas purification device 52 on the engine 5 and prevents the shape of the hood 6 from becoming complicated.

As illustrated in FIGS. 24 and 25, the width W1 of the flywheel housing 60, which covers the flywheel 61 is narrower than the height H1. The flywheel 61 is located on the end surface that intersects the axis of the engine output shaft 53. Since the width of the flywheel housing 60 is narrow, the engine 5 can be mounted on the traveling body 2, which has a narrow lateral width, without interference by the flywheel housing 60. In the traveling body 2, each body frame 15 is provided on the outer side of the associated engine frame 14 via the associated spacer 293. Thus, the width between the left and right body frames 15 is wider than the width between the left and right engine frames 14. The flywheel housing 60 is located at the rear of the engine 5. The main transmission input shaft 28 of the transmission case 17, which is coupled to the body frames 15, is coupled to the flywheel 61. Thus, the flywheel housing 60, which has the greatest lateral width in the engine 5, is sufficiently located between the body frames 15. This prevents the flywheel housing 60 from colliding with the traveling body 2, which has a different vibration system and thus prevents failure or breakage of the engine 5.

The flywheel housing 60 has an outline in which the left and right parts of a circle are cut off and in which the seat-like engine mount fittings 60a project from the upper section. The engine mount fittings 60a at the upper section are coupled to the traveling body 2 via the engine mount 240 at the rear portion. The flywheel housing 60 is not only mountable on the traveling body 2 having a narrow width, but also includes the seat-like engine mount fittings 60a that are capable of being coupled to the traveling body 2. Thus, coupling the flywheel housing 60 having a high rigidity to the traveling body 2 reinforces for the rigidity achieved by the support structure of the engine 5.

More particularly, the inverted U-shaped engine support frame 237 is provided above the support beam frame 236, which is held between the pair of left and right body frames 15. The flywheel housing 60 and the engine support beam frame 237 are arranged next to each other in the fore-and-aft direction. While the rear section of the engine mount 240 is coupled to the upper surface of the engine support frame 237 via the anti-vibration rubbers 241, the front section of the engine mount 240 is coupled to the upper surface of the engine mount fittings 60a on the flywheel housing 60.

As illustrated in FIGS. 24 and 26, a perforated heat insulator 205 is located below the exhaust gas purification device (DPF) 52. The perforated heat insulator 205 covers the left side of the engine 5. Since the heat insulator 205 is configured to cover the exhaust manifold 57, the turbocharger 81, and the exhaust connecting pipe 84, high-heat sources in the engine 5 are covered with the heat insulator 205. Thus, the temperature of the exhaust gas supplied to the DPF 52 is maintained high, and decrease in the regeneration ability of the DPF 52 is prevented. Since the heat insulator 205 is perforated and located to face the similarly perforated left side engine cover 232, some of air heated by the engine 5 is discharged to the outside through the heat insulator 205 and the engine cover 232. This configuration prevents heat retention on the left side of the engine 5 where the temperature is likely to become relatively high.

The heat insulator 205 is bolted to the exhaust gas introduction port side of the exhaust connecting pipe 84 (coupling portion coupled to the turbine case 82 of the turbocharger 81) and coupled to the rear component coupling portion 182d of the outlet side second bracket 182 via the shield securing bracket 207 to be supported by the engine 5. The shield securing bracket 207 is also coupled to the upstream relay pipe 223, which connects the fresh air introduction port of the intercooler 224 to the compressor case 83 of the turbocharger 81, and the upstream relay pipe 223 is also supported by the outlet side second bracket 182 of the engine 5.

As illustrated in FIGS. 24 and 26, the heat insulating member 206, which is coupled to one side of the engine 5, is provided below the exhaust manifold 57, and an engine starter 69 is located below the heat insulator 206. The heat insulating member 206, which is coupled to the left side of the cylinder block 54, extends upright toward the engine cover 232 at a position between the engine starter 69 and the EGR cooler 80. Thus, the heat insulating member 206 covers over the electric device, which is the starter 69 in this embodiment. This reduces thermal influence on the starter 69 caused by heat dissipation from the exhaust manifold 57 that is heated and prevents failure of the electric device, which is the starter 69 in this embodiment.

Figure 27:
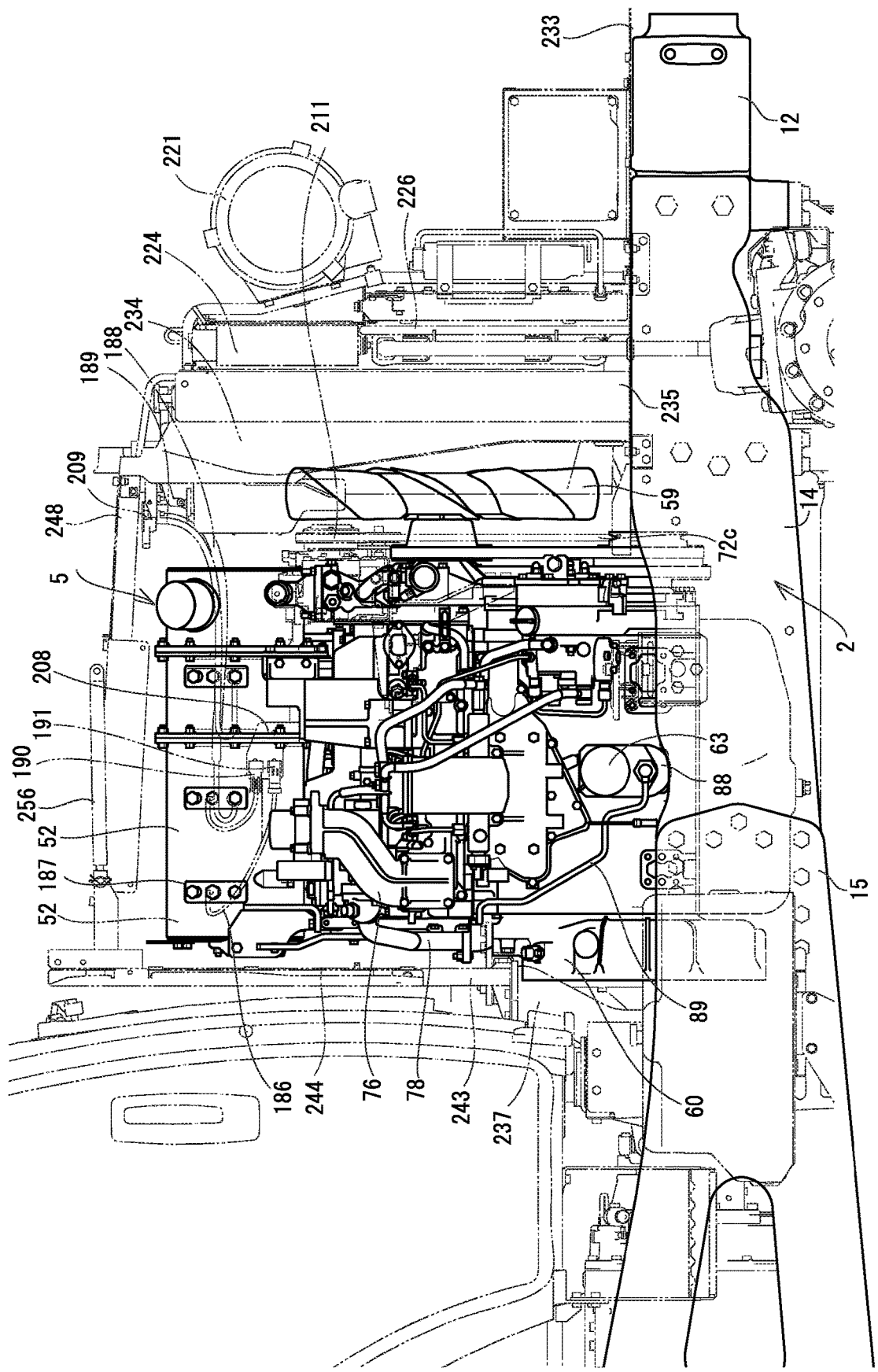
FIG. 27 is a right side enlarged view of the work vehicle illustrating the configuration in the engine compartment.
Figure 28:
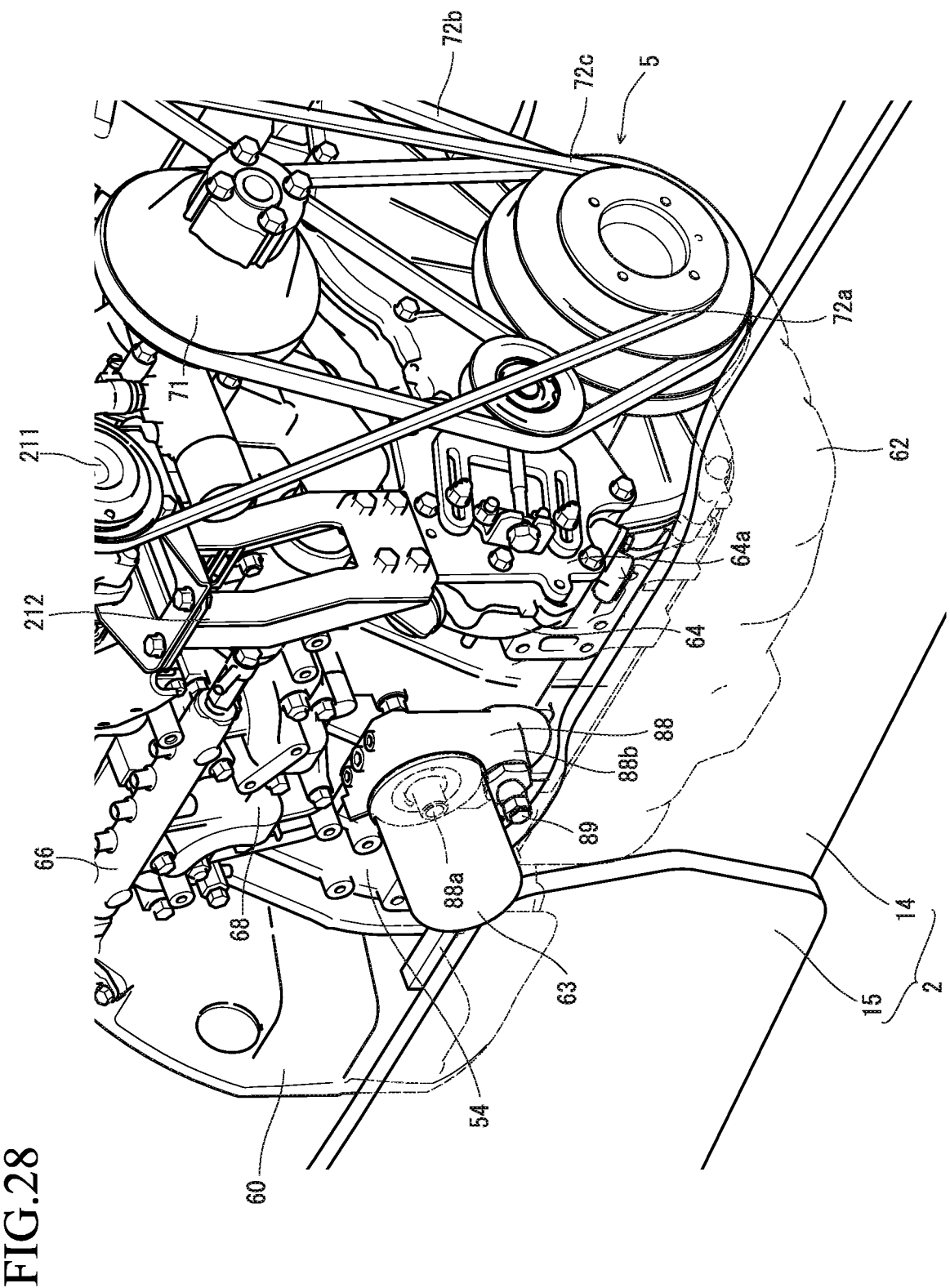
FIG. 28 is a partially enlarged view of the work vehicle illustrating the relationship between the traveling body and the oil filter.
Figure 29:
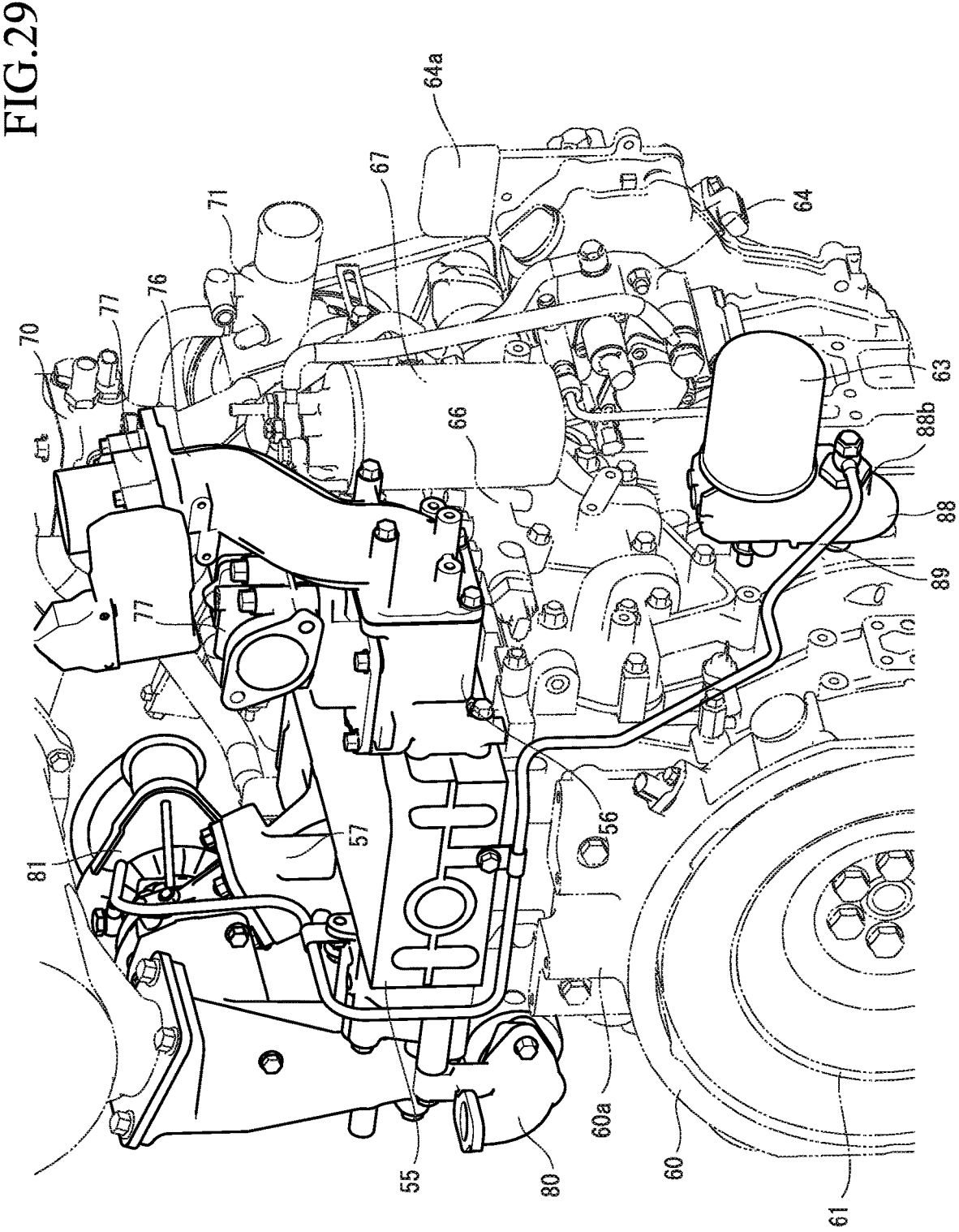
FIG. 29 is a partially enlarged view of the diesel engine according to the invention of the present application illustrating the relationship between the forced induction device and the oil filter.

As illustrated in FIGS. 27 to 29, the oil filter 63, which filters lubricant from the oil pan 62, is located on the lower right side of the cylinder block 54 via the oil filter support member (support bracket) 88, which includes a hollow portion for allowing the lubricant to pass through the oil filter support member 88. An oil pump (not shown) is located on the front side (close to the cooling fan 59) at a section closer to the right side in the cylinder block 54, and an oil passage (not shown) extends rearward from the oil pump (not shown). One side (left side) of the oil filter support member 88 is coupled to the coupling port (oil filter mounting position) that communicates with the above-described oil passage provided in the cylinder block 54. The oil filter 63 is secured to the upper section of the other side (right side) of the oil filter support member 88.

When the oil filter 63 is secured to the cylinder block 54, the oil filter support member 88 is provided in between. Thus, the oil filter 63 is arranged at a position higher than the original mounting position in the cylinder block 54. This prevents the oil filter 63 from interfering with the traveling body 2 even if the engine 5 is mounted on the traveling body 2 having a narrow lateral width. That is, as illustrated in FIGS. 27 and 28, the oil filter 63 is located above the engine frame 14 due to the existence of the oil filter support member 88. Thus, the oil filter 63 is accessible and can be replaced easily.

The engine side coupling portion is provided on one side (left side) of the oil filter support member 88 to be coupled to the coupling port (oil filter mounting position) provided in the cylinder block 54. Also, a filter coupling portion 88a and a lubricant outlet 88b are vertically arranged on the other side (left side) of the oil filter support member 88. The filter coupling portion 88a is coupled to the oil filter 63. The lubricant outlet 88b discharges lubricant to an external component.

The oil filter support member 88 includes an oil passage (not shown) formed in the oil filter support member 88. Lubricant that is drawn in from the oil pan 62 by the oil pump (not shown) is received through the oil passage (not shown) in the cylinder block 54 and supplied to the oil filter 63. The lubricant that has been filtered by the oil filter 63 is circulated to the cylinder block 54 and supplied to the lubrication parts of the engine 5. At this time, some of the lubricant filtered by the oil filter 63 is supplied to the external component through the lubricant outlet 88b via a lubricant supply pipe 89. Since part of a lubricant passage from the oil filter 63 to the external component is formed by the oil passage in the oil filter support member 88, the oil filter support member 88 serves multiple functions. This configuration reduces the number of components of the engine apparatus.

In this embodiment, as illustrated in FIG. 29, the lubricant introduction port of the turbocharger 81 is coupled to the lubricant outlet 88b of the oil filter support member 88 via the lubricant supply pipe 89. The turbocharger 81 includes an oil passage for supplying lubricant to a floating metal bearing. The lubricant supply pipe 89, which communicates with the lubricant outlet 88b of the oil filter support member 88, is located along the right side of the cylinder block 54 and the rear and left surfaces of the cylinder head 55 and is coupled to the oil passage (oil passage for supplying lubricant to the floating metal bearing) provided in the turbocharger 81.

Figure 30:
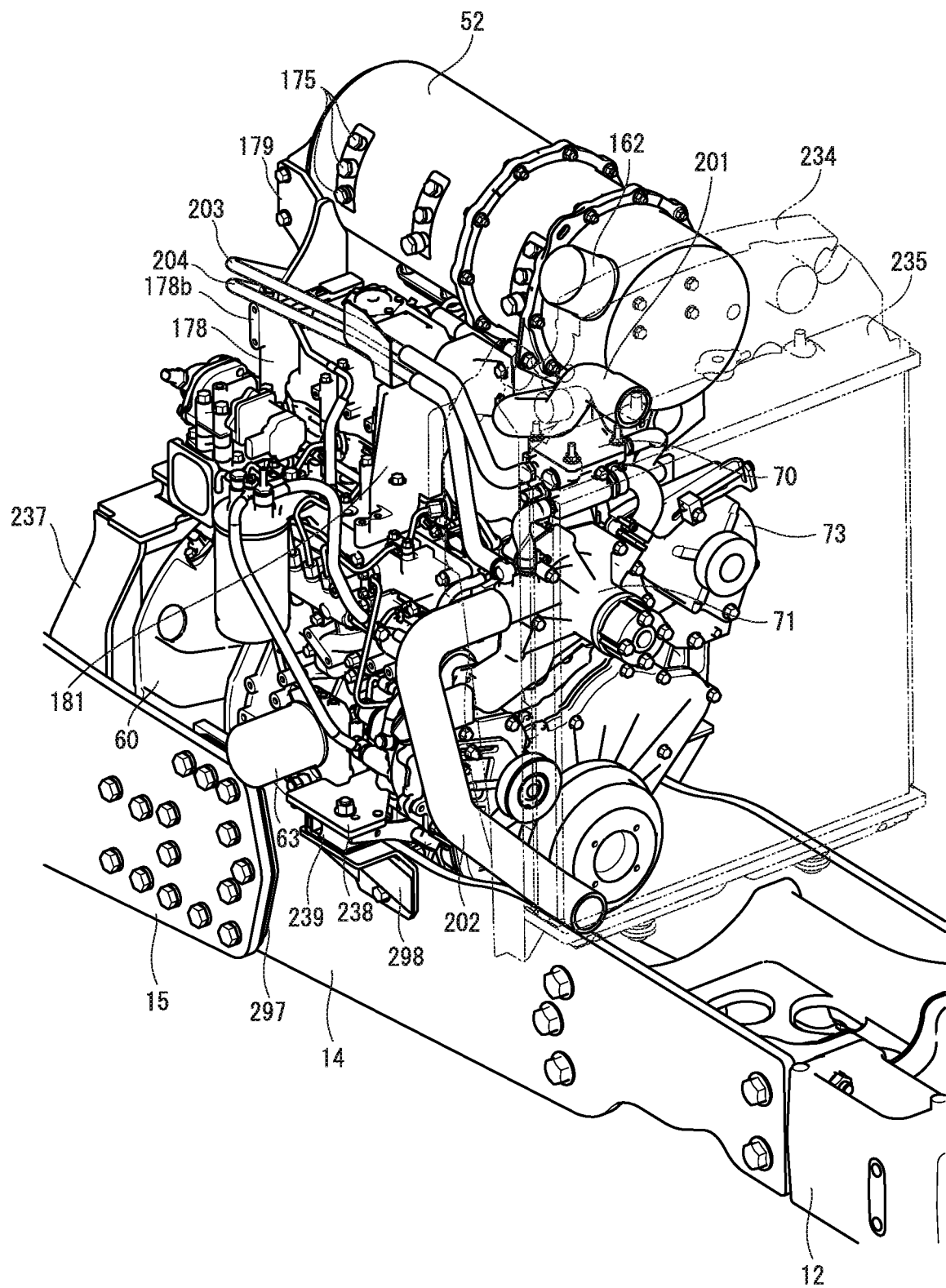
FIG. 30 is a front perspective view of the diesel engine and the radiator illustrating the relationship between the diesel engine and the radiator.

As illustrated in FIG. 30, the engine 5 includes the thermostat case 70, which is located below the exhaust gas outlet side of the exhaust gas purification device 52, and the coolant pump 71, which is located below the thermostat case 70 and between the cooling fan 59 and the cylinder head 55. The coolant inlet (coolant introduction port) of the thermostat case 70, which is above the coolant pump 71, is oriented rightward of the cylinder head 55. The cooling fan 59 is located above the traveling body 2, and the cooling fan 59 and the coolant pump 71 are arranged to be coaxial. Thus, the engine components are compactly arranged, and the size of the engine 5 is reduced. The engine 5 is thus capable of being mounted on a traveling vehicle that has a limited engine compartment shape like the tractor 1 of this embodiment.

The coolant inlet that is bent rightward above the thermostat case 70 communicates with the coolant outlet (coolant discharge port) at the upper section of the radiator 235 via the coolant supply pipe 201. The radiator 235 is located forward of the engine 5 with the fan shroud 234 located in between. Also, the coolant discharge port of the coolant pump 71 projects rightward from the main body of the coolant pump 71 and communicates with the coolant introduction port at the lower section of the radiator 235 via the coolant return pipe 202. The coolant supply pipe 201 and the coolant return pipe 202, which are coupled to the radiator 235, are both arranged on the right side of the engine 5. This configuration not only reduces thermal influence on the coolant caused by exhaust heat from the engine 5, but also improves workability in assembly and disassembly.

As illustrated in FIGS. 30 to 33, the warm water pipes 203, 204, which circulate warm water (coolant) to the air conditioner (not shown), are respectively coupled to the thermostat 70 and the coolant pump 71. The warm water pipes 203, 204 extend rearward on the right side position of the exhaust gas purification device 52 and are coupled to the air conditioner (not shown) in the cabin 7. That is, the warm water pipes 203, 204, which are coupled to the thermostat 70 and the coolant pump 71 on the right side, extend rearward in a bundle located one above the other. The warm water pipes 203, 204 are also arranged to pass above the bent portion (middle portion) 181c of the outlet side first bracket 181. The warm water pipes 203, 204 are coupled to the middle component coupling portion 181d on the bent portion 181c of the outlet side first bracket 181 via the warm water pipe securing bracket 208 to be supported by the engine 5.

The DPF 52 includes the temperature sensors 186, 187, which detect exhaust gas temperature that flows through the gas purification housing 168. The temperature sensors 186, 187 are, for example, thermistor temperature sensors. The temperature sensors 186, 187 are inserted in the gas purification housing 168 and include wiring connectors 190, 191 for outputting measurement signals. The wiring connectors 190, 191 of the temperature sensors 186, 187 are secured to the warm water pipe securing bracket 208. The warm water pipe securing bracket 208 is configured by a plate that is bent into an L-shape and extends upright from the bent portion 181c of the outlet side first bracket 181 to be parallel to the DPF 52.

While the warm water pipes 203, 204 are secured to the left side (side facing the DPF 52) of the warm water pipe securing bracket 208, the wiring connectors 190, 191 are secured to the right side (side further from the DPF 52) of the warm water pipe securing bracket 208. The warm water pipes 203, 204, which supply coolant (warm water) that has contributed to cooling the engine 5 to an external device such as the air conditioner, are provided close to the DPF 52. This prevents decrease in the coolant temperature supplied to the external device. Providing a component to stand on the outer side of the warm water pipe securing bracket 208 insulates the heat of exhaust heat from the DPF 52. The electric components, which are the wiring connectors 190, 191 in this embodiment, are arranged on the further side of the warm water pipe securing bracket 208 from the DPF 52. This reduces influence caused by the exhaust heat from the engine 5 and the DPF 52, prevents failure caused by heat, and simultaneously inhibits noise from being superimposed on the output signal.

Figure 32:
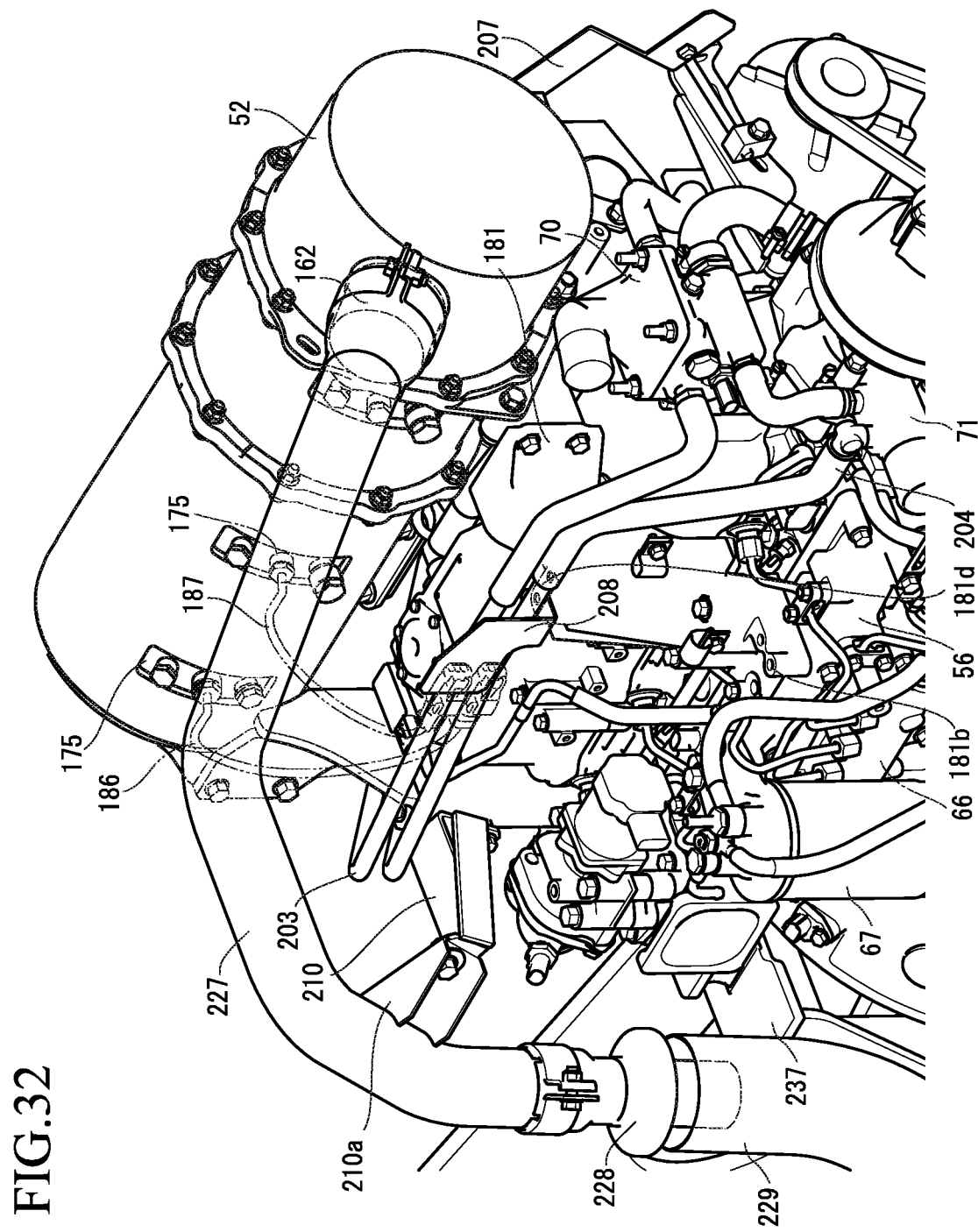
FIG. 32 is an enlarged perspective view of the diesel engine and the tailpipe illustrating how the diesel engine and the tailpipe are coupled to each other.
Figure 33:
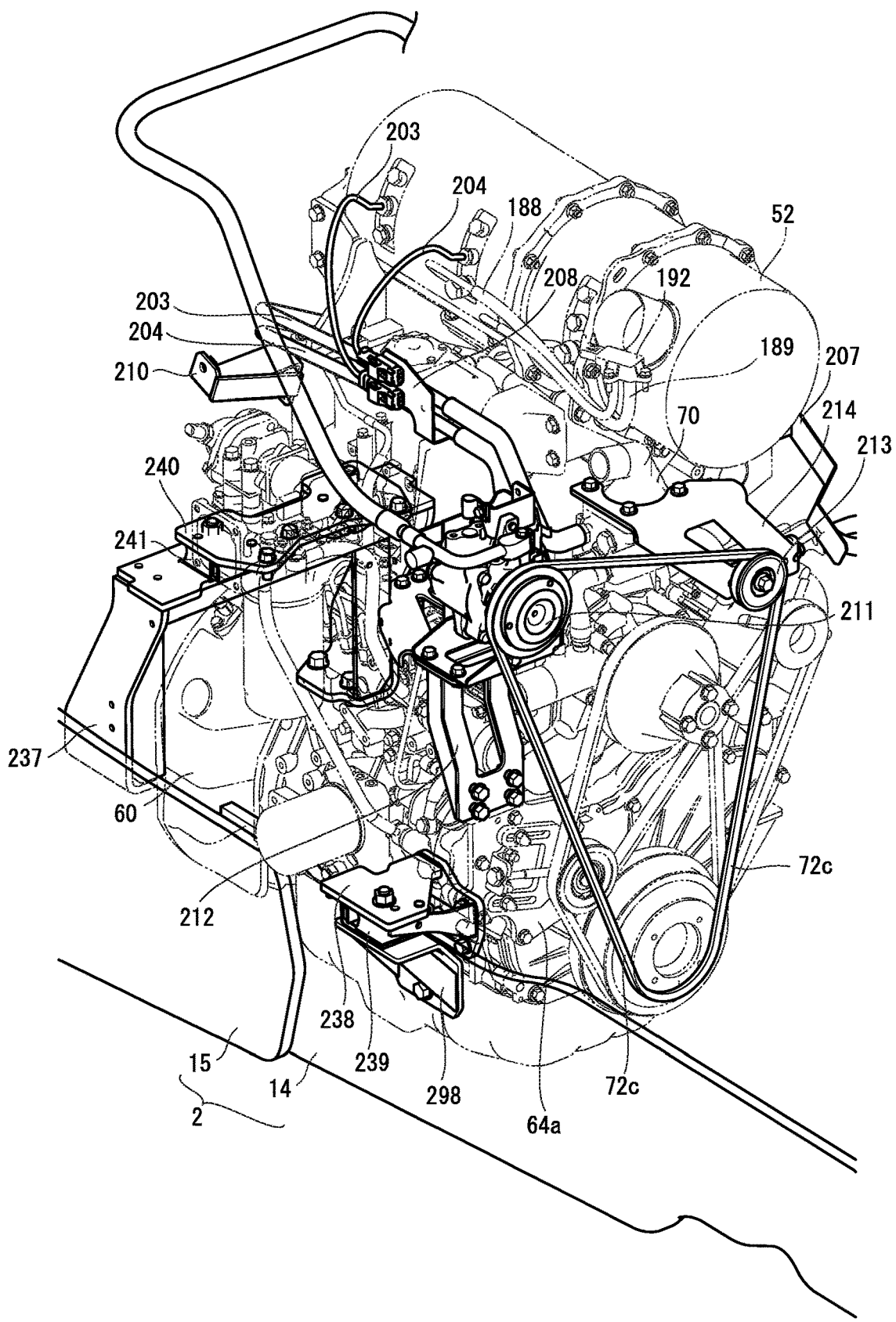
FIG. 33 is a front perspective view of the diesel engine illustrating where external components are arranged.

As illustrated in FIGS. 27, 32, and 33, the DPF 52 includes the sensor pipes 188, 189, which are coupled to positions at the front and rear of the soot filter 164 in the gas purification housing 168 to detect the difference between the pressure of the exhaust gas in the section upstream of the soot filter 164 and the pressure of the exhaust gas in the section downstream of the soot filter 164 with a pressure difference sensor 192. The deposition amount of the particulate matter in the soot filter 164 is converted based on the pressure difference detected by the pressure difference sensor 192 to grasp the state of clogging in the DPF. A sensor bracket 209 is located on the fan shroud 234, which is located in front of the engine 5 and surrounds the cooling fan 59. The pressure difference sensor 192 is secured to the sensor bracket 209.

The sensor bracket 209 projects rearward from the rear surface of the fan shroud 234 and is located at a position higher than the sensor bosses 175, which are coupled to the sensor pipes 188, 189, and rightward of the DPF 52. The pressure difference sensor 192 is secured to the upper surface of the sensor bracket 209, and the sensor pipes 188, 189 are coupled to the sensor bracket 209 from the lower side. In this embodiment, the pressure difference sensor 192, which is secured to the sensor bracket 209, is located at a position higher than the DPF 52.

Since the sensor 192, which measures the internal environment of the DPF 52, is secured to the upper section of the fan shroud 234, the sensor 192 is located at an upstream section in the engine compartment along the flow direction of the cooling air. This configuration reduces influence of exhaust heat from the engine 5 and the DPF 52 and prevents failure of the sensor 192 that might otherwise be caused by the heat. Thus, the internal environment of the DPF 52 is properly grasped to optimally control the engine 5.

The exhaust gas outlet pipe 162 of the DPF 52 is provided close to the cooling fan 59. The pressure difference sensor 192, which measures the pressure difference between the front and rear of the soot filter 164 in the DPF 52, is secured to the upper section of the fan shroud 234. The DPF 52 is located in a direction along the output shaft 53 of the engine 5. The pressure difference sensor 192, which measures the pressure at the front and rear of the soot filter 164 close to the exhaust outlet, is located at the upper section of the fan shroud 234 adjacent to the exhaust outlet. This configuration reduces the length of the sensor pipes 188, 189, which are located between the pressure difference sensor 192 and the DPF 52, and reduces measurement errors caused by the pressure difference sensor 192.

Figure 31:
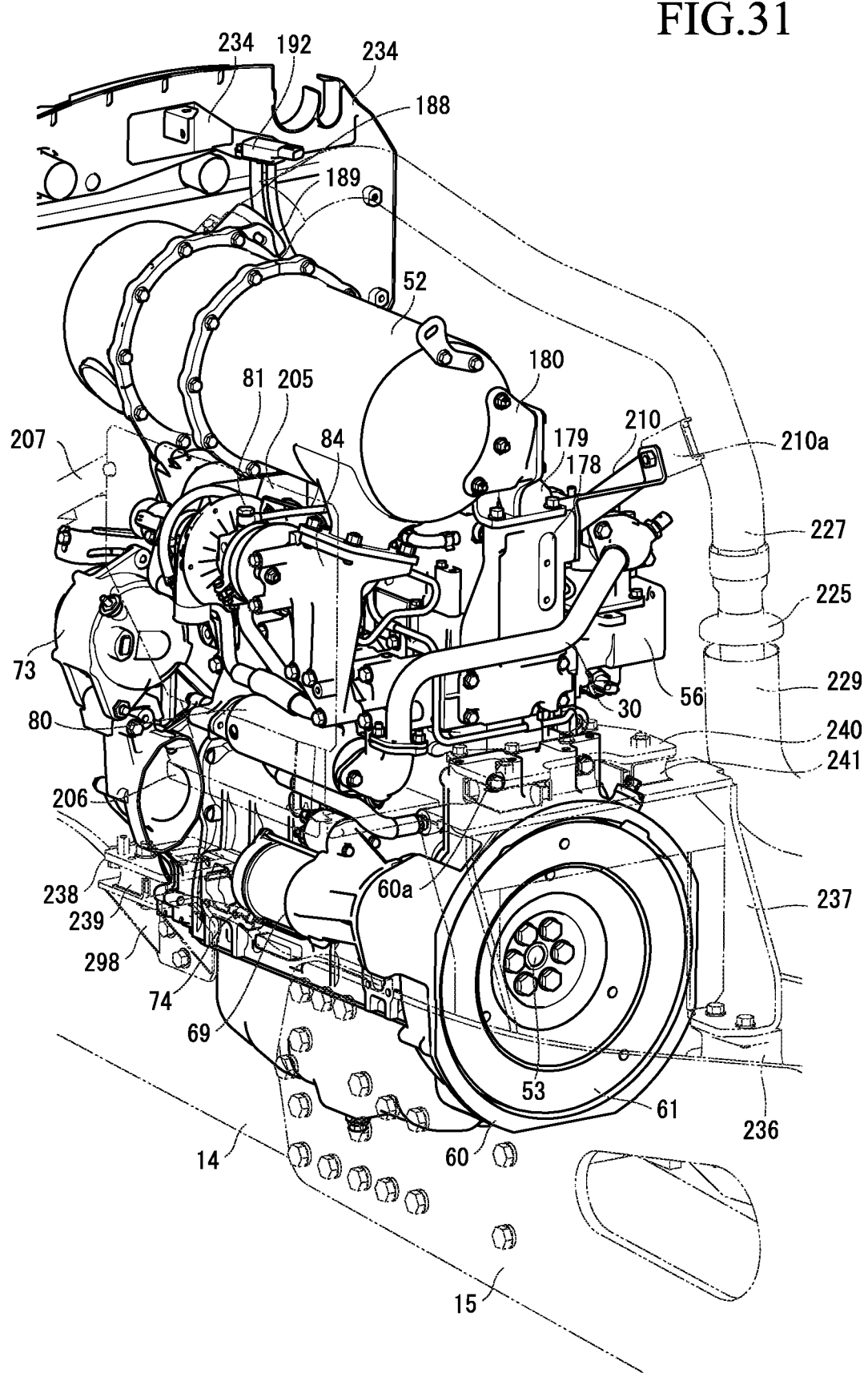
FIG. 31 is a rear perspective view of the diesel engine and an external component illustrating the relationship between the diesel engine and the external component.

As illustrated in FIGS. 31 to 33, the exhaust pipe 227 is coupled to the exhaust gas outlet pipe 162, which is provided on the front right side of the outer circumferential surface of the DPF 52 facing upward. The exhaust pipe 227 is bent rearward along the exhaust gas flow direction and is arranged to be parallel to the DPF 52. The exhaust pipe 227 is bent downward at the downstream section along the exhaust gas flow such that the exhaust gas discharge port faces downward. The exhaust gas discharge port of the exhaust pipe 227 is inserted in the exhaust gas introduction port of the tailpipe 229, which is secured to the cabin 7. A securing coupling member 210a is provided at the middle of the outer circumference of the exhaust pipe 227. The exhaust pipe 227 is supported by the engine 5 by coupling the securing coupling member 210a to the bracket coupling portion 178b of the securing bracket 178 via the exhaust pipe securing bracket 210.

The tractor 1 includes the exhaust pipe (first exhaust pipe) 227, which is coupled to the exhaust gas outlet pipe 162 of the DPF 52 and secured to the engine 5, and the tailpipe (second exhaust pipe) 229, which is provided downstream of the exhaust pipe 227 and secured to the traveling body 2. The inner diameter of the tailpipe 229 is greater than the outer diameter of the exhaust pipe 227, and the exhaust outlet end of the exhaust pipe 227 is inserted in and communicates with the exhaust inlet of the tailpipe 229. The exhaust pipe 227 and the tailpipe 229 are securely coupled to the engine 5, the traveling body 2, and the cabin 7, which have different vibration systems. This configuration prevents damage on the exhaust pipe 227 and the tailpipe 229. Since the exhaust pipe 227 is configured to be inserted in the exhaust inlet of the tailpipe 229, the outside air is introduced into the tailpipe 229 together with the exhaust gas from the exhaust pipe 227. This cools the exhaust gas that is to be discharged outside.

As illustrated in FIG. 33, the tractor 1 of this embodiment includes the air conditioner compressor 211, which compresses refrigerant to be supplied to the air conditioner (not shown) of the cabin 7. The air conditioner compressor 211 receives power transmitted from the front end of the output shaft 53 of the engine 5 via a compressor V-belt 72c to be driven by the engine 5. The air conditioner compressor 211 is located at a position higher than the coolant pump 71 on the front right side of the engine 5. The air conditioner compressor 211 is mounted on the compressor securing bracket 212. One end of the compressor securing bracket 212 is coupled to an extended bracket 64a. The extended bracket 64a is coupled to the front section of the fuel supply pump 64.

The compressor securing bracket 212 is bent into an L-shape, and the air conditioner compressor 211 is secured to and located on the upper surface of the compressor securing bracket 212. The compressor securing bracket 212 is supported by the engine 5 by coupling one end of the compressor securing bracket 212 at the lower end to the extended bracket 64*a* and coupling the other end of the compressor securing bracket 212 at the upper end to the proximal end component coupling portion 181*b* at the proximal end 181*a* of the outlet side first bracket 181. A pulley 213 is located on the front left side of the engine 5. The pulley 213 keeps the compressor V-belt 72*c* in tension. The pulley 213, around which the compressor V-belt 72*c* is wound, is secured to the front edge of a position adjustment bracket 214 to be able to adjust the position. The position adjustment bracket 214 is coupled to the thermostat case 71 and projects forward of the engine 5.

The configurations of the components according to the invention of the present application are not limited to the illustrated embodiment, but may be modified in various forms without departing from the object of this invention.

The embodiments of the invention of the present application relates to an engine apparatus such as a diesel engine, and more specifically, to an engine apparatus that includes an exhaust gas purification device that removes particulate matter (soot, particulates) contained in exhaust gas.

What is claimed is:

1. An engine apparatus comprising:
   an engine comprising:
      a cylinder head comprising a first side;
      an exhaust manifold positioned on the first side of the cylinder head; and
      an output shaft comprising an axis;
   an exhaust gas purification device comprising an exhaust gas inlet side and an exhaust gas outlet side, the exhaust gas purification device configured to be coupled above the cylinder head and to extend along the axis of the output shaft of the engine, the exhaust gas purification device configured to purify exhaust gas from the exhaust manifold;
   an outlet side bracket configured to couple the exhaust gas outlet side of the exhaust gas purification device to the cylinder head; and
   an inlet side bracket assembly configured to couple the exhaust gas inlet side of the exhaust gas purification device to the cylinder head, the inlet side bracket assembly comprising:
      a first bracket configured to be coupled to a surface of the cylinder head intersecting the axis of the output shaft;
      a second bracket comprising a proximal end portion and a distal end portion, the proximal end portion configured to be detachably coupled to an upper end of the first bracket, the distal end portion arranged orthogonal to the proximal end portion; and
      a third bracket configured to be coupled to an end surface of the exhaust gas purification device and to the distal end portion of the second bracket.

2. The engine apparatus according to claim 1, wherein:
   the outlet side bracket comprises a bracket assembly including:
      a fourth bracket comprising a proximal end portion and a distal end portion, the proximal end portion being configured to be coupled to an upper surface of an intake manifold on a second side of the cylinder head, and the distal end portion positioned above the cylinder head and arranged orthogonal to the proximal end portion, and
      a fifth bracket comprising a proximal end portion and a distal end portion, the proximal end portion being configured to be coupled to the first side of the cylinder head, and the distal end portion arranged orthogonal to the proximal end portion and configured to be coupled to the distal end portion of the fourth bracket, and
   the outlet side bracket is configured to be coupled to a coupling flange of the exhaust gas purification device.

3. The engine apparatus according to claim 1, further comprising an exhaust connecting pipe comprising:
   a tube defining a hollow portion configured to supply exhaust gas from the exhaust manifold to the exhaust gas purification device; and
   an exhaust gas outlet at an upper section of the exhaust connecting pipe, the exhaust gas outlet being configured to be coupled to an exhaust gas inlet of the exhaust gas purification device, and the exhaust connecting pipe being configured to be coupled to the exhaust manifold so that the exhaust gas inlet side of the exhaust gas purification device is supported by the engine via the exhaust connecting pipe together with the inlet side bracket assembly.

4. The engine apparatus according to claim 1, further comprising:
   an intake manifold, the intake manifold and the exhaust manifold being disposed on both sides of the cylinder head; and
   an intake connecting pipe comprising a hollow portion configured to supply fresh air to the intake manifold, the intake connecting pipe being configured to tilt toward the cylinder head as the intake connecting pipe extends upward from the intake manifold.

5. The engine apparatus according to claim 1, further comprising an exhaust connecting pipe, wherein the exhaust connecting pipe is configured to be coupled to an exhaust gas inlet of the exhaust gas purification device to support the exhaust gas purification device, and wherein, when coupled to the exhaust gas inlet, the exhaust connecting pipe is angled toward the cylinder head as the exhaust connecting pipe extends upward.

6. The engine apparatus according to claim 1, further comprising:
   a cylinder block comprising end surfaces, the end surfaces of the cylinder block configured to be coupled to a traveling body of a traveling vehicle via a front engine mount;
   a flywheel disposed on one of the end surfaces of the cylinder block intersecting the axis of the output shaft of the engine; and
   a flywheel housing comprising a width and a height and covering the flywheel, the flywheel housing being configured such that the width is narrower than the height.

7. The engine apparatus according to claim 6, wherein the flywheel housing comprises a cross-section having rounded top and bottom portions and straight side portions, wherein a seat projects from an upper section of the housing, and wherein the seat on the upper section is configured to be coupled to the traveling body via a rear engine mount.

8. The engine apparatus according to claim 7, wherein the cylinder head is disposed above the cylinder block, and further comprising:
   a cylinder head disposed above the cylinder block;
   a cooling fan disposed on an end surface of the cylinder head further from the flywheel;

an exhaust gas purification device disposed above the cylinder head to extend along the axis of the output shaft of the engine;

a coolant pump between the cooling fan and the cylinder head; and a thermostat cover above the coolant pump, the thermostat cover comprising a coolant inlet, the coolant inlet facing sideways of the cylinder head below the exhaust gas purification device.

9. The engine apparatus according to claim 7, wherein the engine apparatus is configured to be covered with a hood.

10. The engine apparatus according to claim 6, wherein the cylinder block further comprises a lower surface.

11. The engine apparatus according to claim 10, further comprising:

an oil on the surface of the cylinder block and configured to store lubricant;

a support bracket comprising a first end surface, a second end surface, and a hollow portion configured to permit lubricant to pass through the support bracket; and an oil filter disposed on a side surface of the cylinder block via the support bracket, the oil filter being configured to filter lubricant from the oil pan, while the first end surface of the support bracket is configured to be coupled to the cylinder block at a lower section of the support bracket, the oil filter is configured to be coupled to the second end surface of the support bracket at an upper section of the support bracket so that the oil filter is disposed above the traveling body.

12. The engine apparatus according to claim 11, wherein the support bracket comprises a coupling port coupled to an external pipe configured to circulate lubricant to an external device, and wherein the support bracket is configured to discharge lubricant from the oil filter to an external component.

13. The engine apparatus according to claim 12, wherein the external device is a forced induction device, and wherein the external pipe is a circulation passage configured to circulate lubricant to be supplied to the forced induction device from the support bracket.

14. The engine apparatus according to claim 13, wherein the cylinder block is configured to be covered with a hood.

15. The engine apparatus according to claim 1, wherein the first bracket, the second bracket, and the third bracket are distinct brackets, and wherein the distal end portion of the second bracket is configured to be detachably coupled to a lower end of the third bracket.

16. The engine apparatus according to claim 1, wherein the first bracket comprises a lower end configured to be detachably coupled to the surface of the cylinder head, and wherein the third bracket comprises an upper end configured to be detachably coupled to the end surface of the exhaust gas purification device.

17. The engine apparatus according to claim 1, further comprising a flywheel housing coupled to the engine, the flywheel housing comprising a width and a height and covering a flywheel, wherein the width is narrower than the height.

18. The engine apparatus according to claim 17, wherein the flywheel housing comprises a cross-section having rounded top and bottom portions and straight side portions.

19. The engine apparatus according to claim 17, wherein the flywheel housing further comprises engine mount fittings on an upper section of the flywheel housing, and wherein the engine mount fittings are configured to be coupled to a rear engine mount.

20. The engine apparatus according to claim 17, wherein the engine apparatus is configured to be coupled to a traveling body of a traveling vehicle, and wherein the flywheel housing is positioned beneath of a seat of the traveling body and between body frames of the traveling body.

* * * * *